(12) United States Patent
Kinoshita et al.

(10) Patent No.: US 8,271,277 B2
(45) Date of Patent: Sep. 18, 2012

(54) DEREVERBERATION APPARATUS, DEREVERBERATION METHOD, DEREVERBERATION PROGRAM, AND RECORDING MEDIUM

(75) Inventors: Keisuke Kinoshita, Musashino (JP); Tomohiro Nakatani, Musashino (JP); Masato Miyoshi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 900 days.

(21) Appl. No.: 12/280,101

(22) PCT Filed: Mar. 5, 2007

(86) PCT No.: PCT/JP2007/054205
§ 371 (c)(1),
(2), (4) Date: Dec. 16, 2008

(87) PCT Pub. No.: WO2007/100137
PCT Pub. Date: Sep. 7, 2007

(65) Prior Publication Data
US 2009/0248403 A1 Oct. 1, 2009

(30) Foreign Application Priority Data

Mar. 3, 2006 (JP) ................................. 2006-057235
Sep. 5, 2006 (JP) ................................. 2006-240677

(51) Int. Cl.
*G10L 21/02* (2006.01)
*H04B 3/20* (2006.01)

(52) U.S. Cl. ........................... 704/226; 704/233; 381/66

(58) Field of Classification Search .................. 704/233, 704/266, 219; 381/66
See application file for complete search history.

(56) References Cited

U.S. PATENT DOCUMENTS

| | | | | |
|---|---|---|---|---|
| 3,542,954 A | * | 11/1970 | Flanagan | 381/66 |
| 4,087,633 A | * | 5/1978 | Fitzwilliam | 381/66 |
| 4,131,760 A | * | 12/1978 | Christensen et al. | 381/66 |
| 4,658,426 A | | 4/1987 | Chabries et al. | |

(Continued)

FOREIGN PATENT DOCUMENTS

EP 1 109 154 A2 6/2001

(Continued)

OTHER PUBLICATIONS

Delcroix et al. "Blind dereverberation algorithm for speech signals based on multi-channel linear prediction", Acoust. Sci. & Tech. 26, 5, 2005.*

(Continued)

*Primary Examiner* — Jialong He
(74) *Attorney, Agent, or Firm* — Oblon, Spivak, McClelland, Maier & Neustadt, L.L.P.

(57) ABSTRACT

A model application unit calculates linear prediction coefficients of a multi-step linear prediction model by using discrete acoustic signals. Then, a late reverberation predictor calculates linear prediction values obtained by substituting the linear prediction coefficients and the discrete acoustic signals into linear prediction term of the multi-step linear prediction model, as predicted late reverberations. Next, a frequency domain converter converts the discrete acoustic signals to discrete acoustic signals in the frequency domain and also converts the predicted late reverberations to predicted late reverberations in the frequency domain. A late reverberation eliminator calculates relative values between the amplitude spectra of the discrete acoustic signals expressed in the frequency domain and the amplitude spectra of the predicted late reverberations expressed in the frequency domain, and provides the relative values as predicted amplitude spectra of a dereverberation signal.

23 Claims, 25 Drawing Sheets

U.S. PATENT DOCUMENTS

| | | | |
|---|---|---|---|
| 4,683,590 | A | 7/1987 | Miyoshi et al. |
| 5,574,824 | A * | 11/1996 | Slyh et al. ............ 704/226 |
| 5,761,318 | A * | 6/1998 | Shimauchi et al. ........ 381/66 |
| 5,774,562 | A | 6/1998 | Furuya et al. |
| 5,774,846 | A | 6/1998 | Morii |
| 6,067,518 | A | 5/2000 | Morii |
| 6,167,373 | A | 12/2000 | Morii |
| 6,205,421 | B1 | 3/2001 | Morii |
| 6,363,345 | B1 * | 3/2002 | Marash et al. ............ 704/226 |
| 6,377,637 | B1 * | 4/2002 | Berdugo ................ 375/346 |
| 7,054,451 | B2 * | 5/2006 | Janse et al. ............ 381/83 |
| 2004/0170284 | A1 | 9/2004 | Janse et al. |
| 2005/0010410 | A1 | 1/2005 | Takiguchi et al. |
| 2006/0115095 | A1 * | 6/2006 | Giesbrecht et al. ........ 381/66 |
| 2006/0210089 | A1 * | 9/2006 | Tashev et al. ............ 381/66 |
| 2007/0110254 | A1 * | 5/2007 | Christoph et al. ........ 381/66 |
| 2008/0300869 | A1 * | 12/2008 | Derkx et al. ............ 704/226 |
| 2009/0110207 | A1 * | 4/2009 | Nakatani et al. ........ 381/66 |

FOREIGN PATENT DOCUMENTS

| | | |
|---|---|---|
| EP | 1 109 154 A3 | 6/2001 |
| JP | 62 190935 | 8/1987 |
| JP | 7 66757 | 3/1995 |
| JP | 9 34497 | 2/1997 |
| JP | 9 261133 | 10/1997 |
| JP | 9 321860 | 12/1997 |
| JP | 10 78797 | 3/1998 |
| JP | 2003 188776 | 7/2003 |
| JP | 2004 295039 | 10/2004 |
| JP | 2004 325127 | 11/2004 |
| JP | 2004 347761 | 12/2004 |
| WO | WO 2006/011104 A1 | 2/2006 |

OTHER PUBLICATIONS

Nakatani et al. "One microphone blind dereverberation based on quasi-periodicity of speech signals", Advances in Neural Information processing system (NIPS), 2004.*

B. Yegnanarayana, et al., "Enhancement of Reverberant Speech Using LP Residual", IEEE, Acoustic, Speech and Signal Processing, May 12, 1998, XP010279126, vol. 1, pp. 405-408.

Tashev, Ivan et al., "Revereberation Reduction for Improved Speech Recognition", 2005 Joint Workshop on Hands-Free Speech Communication and Microphone Arrays, HSCMA, Rutgers University, pp. 18-19, (2005).

Miyoshi, Masato et al., "Inverse Filtering of Room Acoustics", IEEE Transactions on Acoustics, Speech, and Signal Processing, vol. 36, No. 2, pp. 145-152, (1988).

Boll, Steven F., "Suppression of Acoustic Noise in Speech Using Spectral Subtraction", IEEE Transactions on Acoustics, Speech, and Signal Processing, vol. Assp-27, No. 2, pp. 113-120, (1979).

Atal, B. S., "Effectiveness of linear prediction characteristics of the speech wave for automatic speaker identification and verification", J. Acoust. Soc. Am., vol. 55, No. 6, pp. 1304-1312, (1974).

Gesbert, David et al., "Robust Blind Channel Identification and Equalization Based on Multi-Step Predictors", IEEE, pp. 3621-3624, (1997).

Kinoshita, Keisuke et al., "Spectral Subtraction Steered by Multi-Step Forward Linear Prediction for Single Channel Speech Dereverberation", IEEE, ICASSP, pp. I-817 to I-820, (2006).

Office Action issued on Aug. 25, 2010, in European Patent Application No. 07 737 780.2-2225.

* cited by examiner

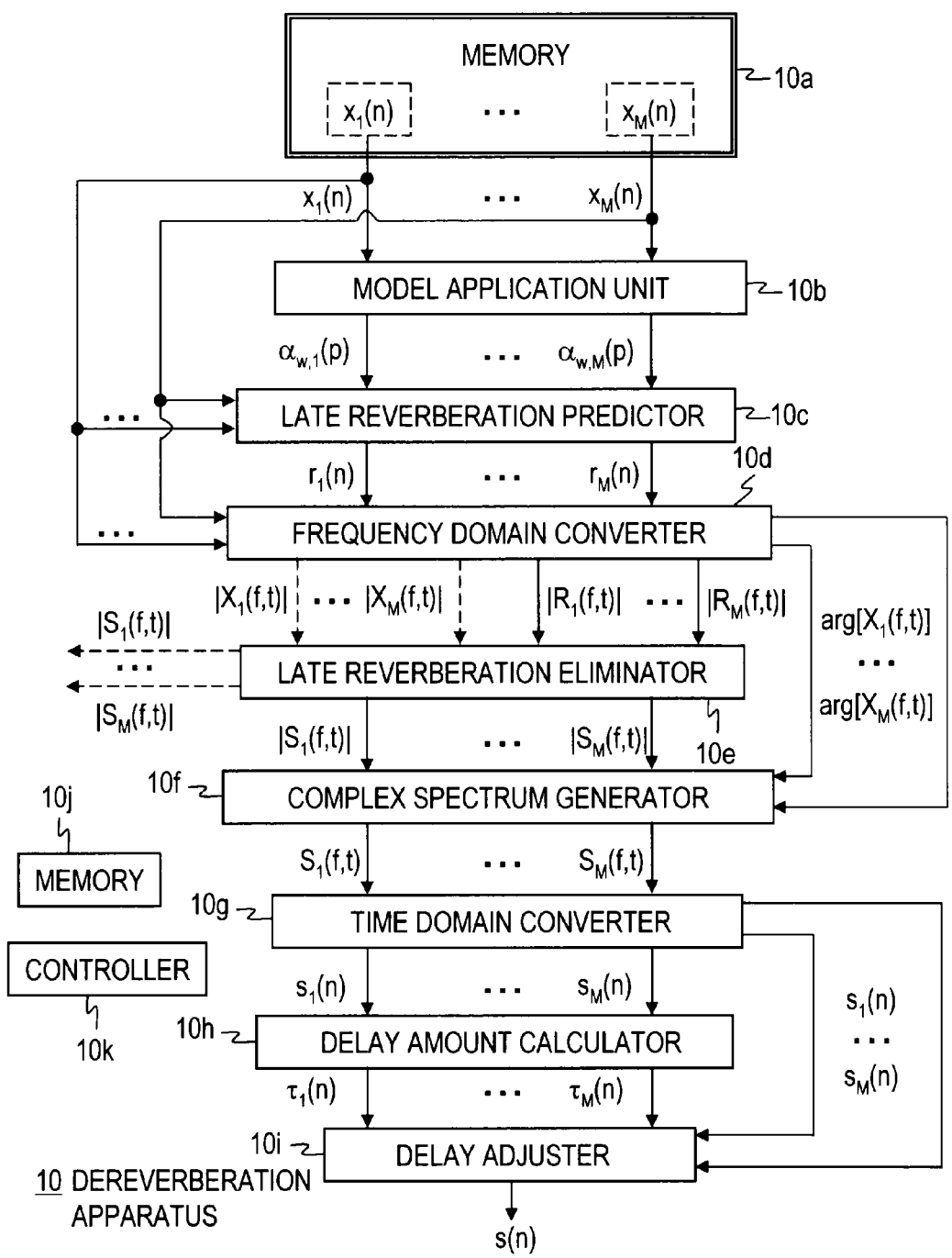

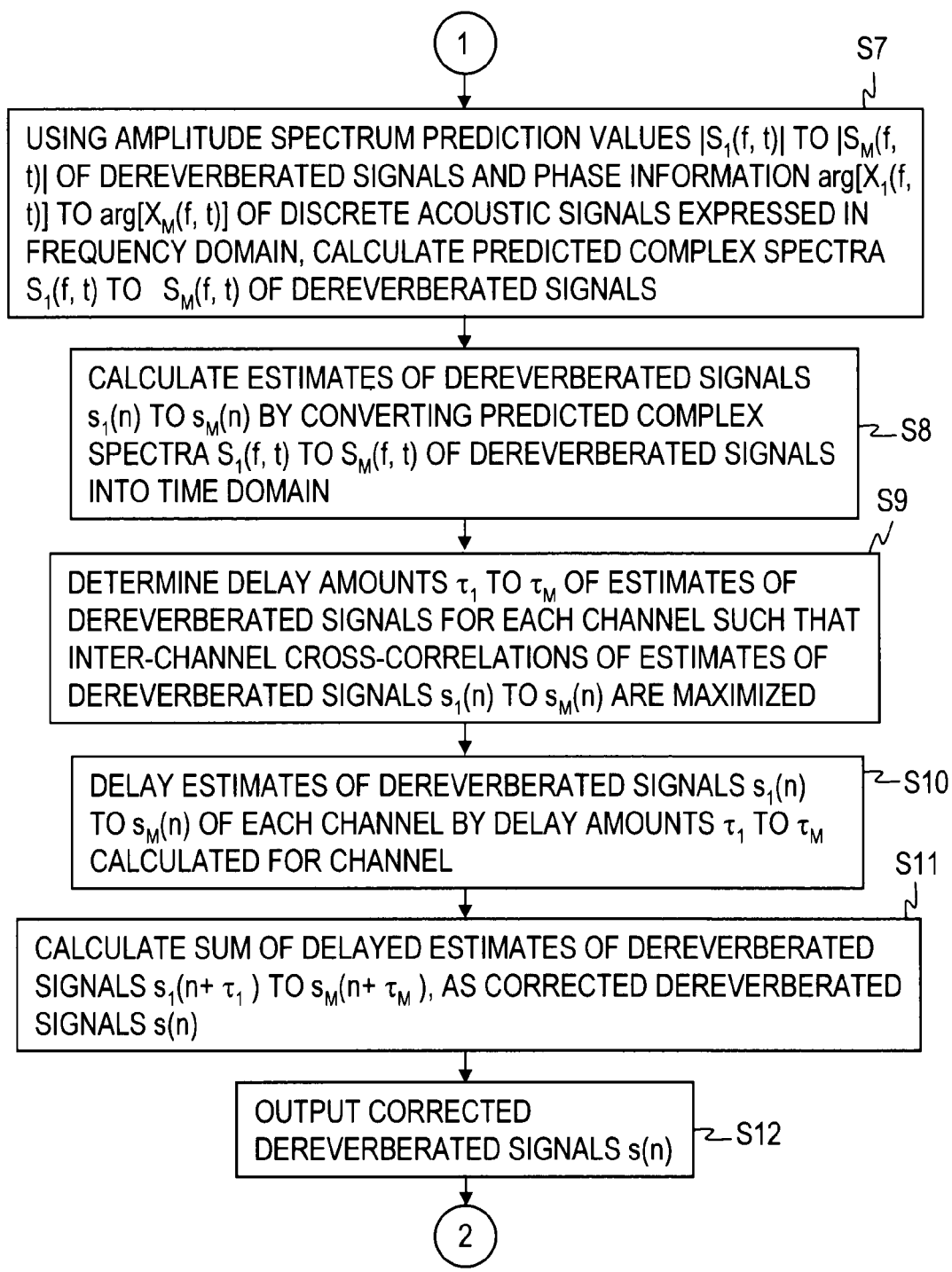

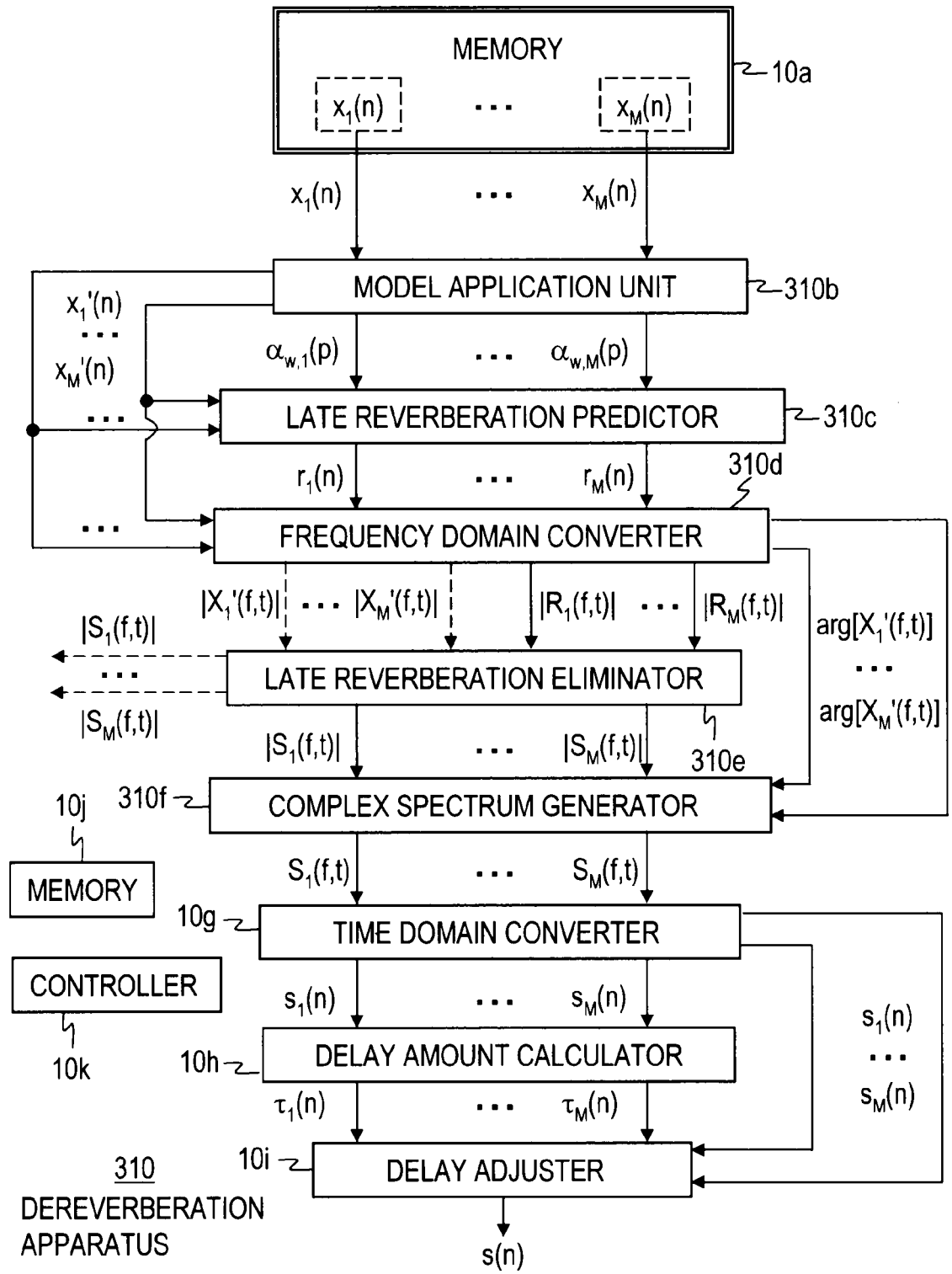

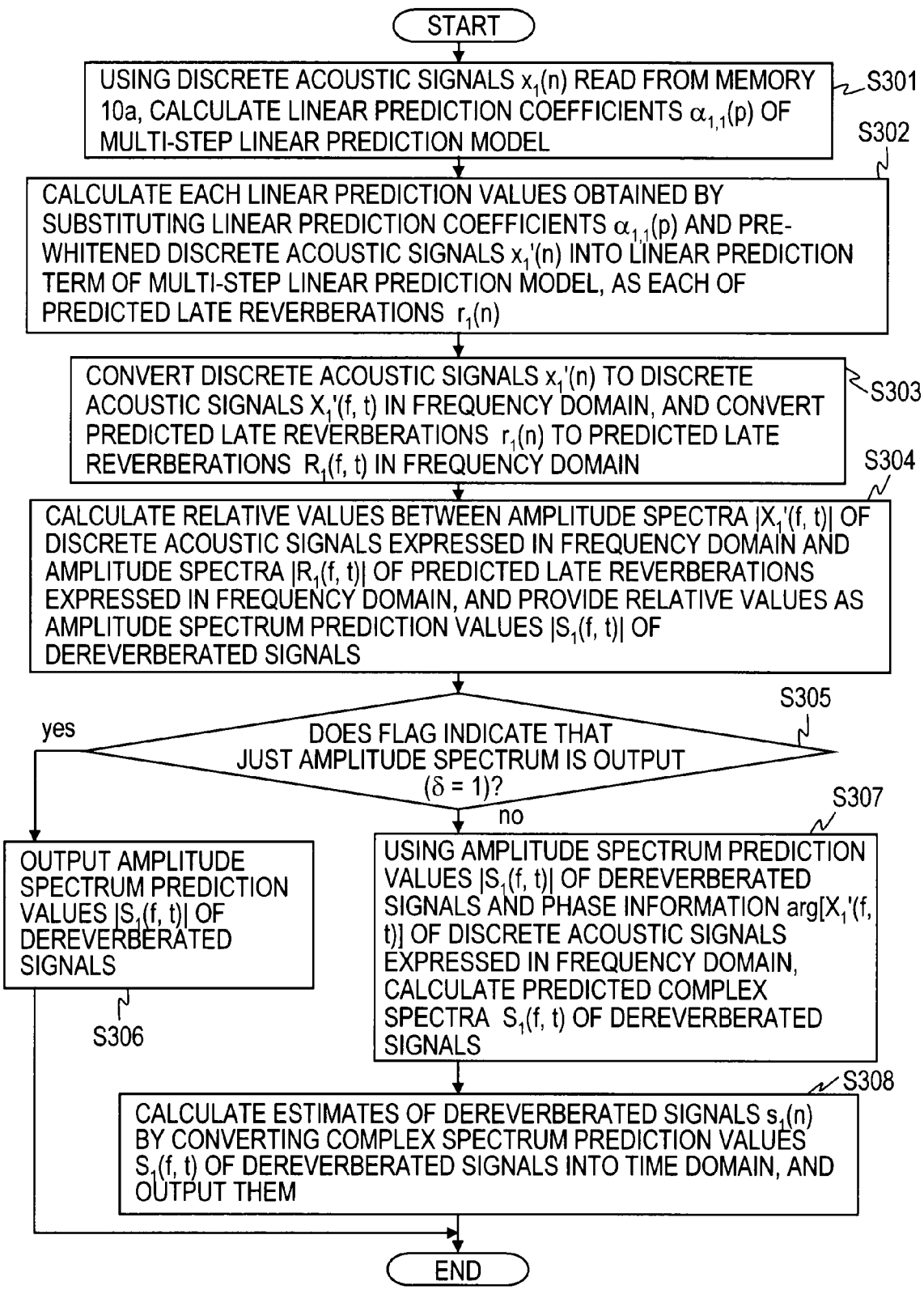

DEREVERBERATION APPARATUS, DEREVERBERATION METHOD, DEREVERBERATION PROGRAM, AND RECORDING MEDIUM

TECHNICAL FIELD

The present invention relates to the technical field of acoustic signal processing, and more specifically, to a technique for eliminating reverberation from an acoustic signal containing reverberation.

BACKGROUND ART

When an acoustic signal is picked up in an environment having reverberation, the original signal is observed with reverberation superimposed thereon. The superimposed reverberation component strongly degrades the clearness of the acoustic signal, making it difficult to extract the original characteristics of the acoustic signal. If an acoustic signal containing reverberation is recognized by an automatic speech recognition (hereinafter called speech recognition) system, for example, the influence of the reverberation significantly lowers the recognition rate of the speech recognition system.

Dereverberation processing is a technique that can eliminate the superimposed reverberation and can restore the original quality of the acoustic signal in such an environment. This makes it possible to restore the clearness of the acoustic signal and improve the speech recognition rate or the like.

Related art of dereverberation processing for eliminating long reverberation includes a method disclosed in Non-patent literature 1.

In the related art, late reverberation is assumed to be attenuated exponentially; an exponential function is used to estimate the energy of late reverberation; and reverberation is eliminated accordingly. More specifically, the observed signal is converted to a frequency-domain signal; the frequency-domain signal is assumed to be the sum of direct sound and late reverberation at each frequency; a model representing reverberation whose energy decreases exponentially (multi-band decay model) is used to estimate model parameters; and late reverberation is eliminated by applying spectral subtraction to both the estimated late reverberation energy and the observed signal energy. An end portion of the sound where just the late reverberation is observed is used to estimate the model parameters.

Non-patent literature 1: I. Tashev and D. Allred, "Reverberation Reduction for Improved Speech Recognition," 2005 Joint Workshop on Hands-Free Speech Communication and Microphone Arrays.

DISCLOSURE OF THE INVENTION

Problems to be Solved by the Invention

The related art described above, however, has a problem in that highly accurate dereverberation cannot be performed automatically in some environments.

In the related art described above, if the exponential function used provides a good model of late reverberation in the observed sound, the late reverberation can be eliminated with high accuracy. However, in general, with an exponential function, it is difficult to accurately approximate late reverberation, which varies greatly depending on the room and the distance between the speaker and the microphone. If the end portion and the other portions of an acoustic signal have different reverberation characteristics, this framework cannot be used. In the related art described above, because late reverberation is modeled by an exponential function, if the model does not agree with the late reverberation in the observed sound or if the end portion and the other portions of the acoustic signal have different reverberation characteristics, accurate dereverberation cannot be performed automatically.

In view of the problem described above, an object of the present invention is to provide a dereverberation technique that allows accurate dereverberation processing to be performed in any environment.

Means to Solve the Problems

According to the present invention, to solve the problems described above, the following steps are executed: a discrete acoustic signal storage step of storing in a memory multiple discrete acoustic signals of each channel m obtained by sampling, at multiple points in time, an acoustic signal observed by each sensor corresponding to the channel m, where m=1 to M, M≧1; a model application step of calculating, by using the discrete acoustic signals, linear prediction coefficients of a multi-step linear prediction model of channel w (w=1 to M) (a linear prediction model representing a discrete acoustic signal of channel w at discrete time n a predetermined period passed after a long-term period by the sum of linear prediction term obtained by linearly combining the discrete acoustic signals for the M channels in the long-term period and a prediction error terms); and a late reverberation prediction step of outputting predicted late reverberations of channel w at discrete times n, each of the predicted late reverberations of channel w at discrete times n being a linear prediction value obtained by substituting the linear prediction coefficients of the multi-step linear prediction model of channel w and the discrete acoustic signals into the linear prediction term of the multi-step linear prediction model of channel w.

The term "model" here means a relational expression representing a physical state. The term "channel" means a series of operations corresponding to each sensor, and the series of operations for acoustic signals observed by the same sensor belongs to the same channel. When M≧2, at least a part of the sensors is disposed in a position differing from the other sensors. In other words, if M≧2, not all the sensors will be disposed at the same place. A multi-step linear prediction model at M≧2 is referred to as a multi-channel multi-step linear prediction model. In other words, the multi-step linear prediction model in the present invention is a concept broader than the multi-channel multi-step linear prediction model.

According to the present invention, predicted late reverberations of an acoustic signal are calculated from the linear prediction term of the multi-step linear prediction model (details will be described later), and the acoustic signal is dereverberated by using the predicted late reverberations.

In the present invention, since the acoustic signal is modeled by the multi-step linear prediction model, more accurate approximation is possible, in comparison with when late reverberation is modeled just by an exponential function. The late reverberation component of the acoustic signal is caused by an acoustic signal at a point in the past and has autocorrelation in a certain time period. Therefore, the multi-step linear prediction model expressing the time-series data at each point in time by linearly combining the time-series data at multiple points in time is suitable for modeling the reverberant signal.

The multi-step linear prediction model of the present invention is a linear prediction model expressing the discrete acoustic signals of channel w at discrete time n a predetermined period passed after a long-term period by the sum of linear prediction term obtained by linearly combining the discrete acoustic signals of M channels (M≧1) in the long-term period and a prediction error term. The late reverberation signal can be estimated accurately by using the linear prediction model expressing the discrete acoustic signals a predetermined period passed after the long-term period, in comparison with using a linear prediction model expressing the discrete acoustic signals immediately after the long-term period (details will be described later). As a result, late reverberation can be eliminated appropriately.

In the present invention, the model parameters of the multi-step linear prediction model are estimated by using not just an end portion of the acoustic signal but the whole of the discrete acoustic signal, so that late reverberation can be eliminated appropriately even if the end portion of the acoustic signal has different reverberation characteristics from the other portion.

According to the present invention, it is preferable that M≧2. By using the multi-channel multi-step linear prediction model, late reverberation can be eliminated accurately even in an environment in which the room transfer function contains many maximum-phase components (details will be described later).

According to the present invention, it is preferable that the model application step include a pre-whitening step of generating pre-whitened discrete acoustic signals by suppressing, in the discrete acoustic signals at each discrete time, autocorrelation (short-term correlation) components having autocorrelation with the discrete acoustic signals in a short-term period immediately preceding the discrete time; and a first linear prediction coefficient calculation step of calculating linear prediction coefficients of the multi-step linear prediction model by using the pre-whitened discrete acoustic signals. The short-term period here is shorter than the long-term period.

The multi-step linear prediction model is a model for estimating the late reverberation components by using linear prediction term thereof. Therefore, it is ideal that the autocorrelation components of the discrete acoustic signals used to calculate the linear prediction coefficients be derived from only the late reverberation components. However, the direct-sound component of the acoustic signal has autocorrelation in a very-short-term period in comparison with the late reverberation components. Pre-whitening is processing for suppressing that type of autocorrelation in the short-term period. Calculating linear prediction coefficients of the multi-step linear prediction model by using the pre-whitened discrete acoustic signal improves the accuracy of dereverberation processing.

According to the present invention, it is preferable that the pre-whitening step include a second linear prediction coefficient calculation step of calculating, by using the discrete acoustic signals, linear prediction coefficients of a short-term linear prediction model of channel m, which is a linear prediction model representing a discrete acoustic signal of channel m at discrete time n immediately after the short-term period, by the sum of linear prediction term obtained by linearly combining discrete acoustic signals of channel m in the short-term period and a prediction error term; and an inverse filtering step of substituting the discrete acoustic signals of channel m into an inverse filter obtained by substituting the linear prediction coefficients calculated in the second linear prediction coefficient calculation step into the short-term linear prediction model of channel m, and outputting a value of the prediction error term of the short-term linear prediction model thereby obtained, as each of the pre-whitened discrete acoustic signals of channel m. With this, auto-correlation of the direct sound component of the observed acoustic signal can be suppressed.

In the above case, it is preferred that M≧2; and the second linear prediction coefficient calculation step include an autocorrelation coefficient calculation step of calculating autocorrelation coefficients of the discrete acoustic signals of each channel; an autocorrelation coefficient averaging step of calculating average autocorrelation coefficients, each of the average autocorrelation coefficients being an average of M autocorrelation coefficients obtained for M channels; and an equation calculation step of calculating the linear prediction coefficients of the short-term linear prediction model by using the average autocorrelation coefficients.

In this manner, when the average autocorrelation coefficients, calculated by averaging out the autocorrelation coefficients obtained for the M channels, is used to calculate the linear prediction coefficients of the short-term linear prediction model, the calculation accuracy of the linear prediction coefficients of the short-term linear prediction model is improved, and the generation accuracy of the pre-whitened discrete acoustic signal is improved. These improvements increase the accuracy of dereverberation processing.

Instead of using the average autocorrelation coefficient, described above, the linear prediction coefficients of the short-term linear prediction model may be calculated by using autocorrelation coefficients of discrete acoustic signals obtained by sampling, at multiple points in time, an acoustic signal observed by one of the M sensors that is closest to a sound source location of the acoustic signal. With this, the linear prediction coefficients of the short-term linear prediction model are accurately calculated, and the generation accuracy of the pre-whitened discrete acoustic signal is improved. This improvement increases the accuracy of dereverberation processing.

In the present invention, it is also preferred that a frequency domain conversion step of converting the discrete acoustic signals of each channel to discrete acoustic signals in the frequency domain for each channel, and the predicted late reverberations to predicted late reverberations in the frequency domain for each channel; and a dereverberation step of calculating relative values of each channel, between amplitude spectra of the discrete acoustic signals expressed in the frequency domain and amplitude spectra of the predicted late reverberations expressed in the frequency domain, and outputting the relative values as predicted amplitude spectra of dereverberated signals of each channel be included. With this, the predicted amplitude spectra of the dereverberated signals are calculated.

In the above case, it is preferred that the late reverberation prediction step calculate the predicted late reverberations of channel w at the discrete times n, each of the predicted late reverberations of channel w at the discrete times n being a linear prediction value obtained by substituting the linear prediction coefficients calculated in the model application step and pre-whitened discrete acoustic signals into the linear prediction term; and the frequency domain conversion step convert the pre-whitened discrete acoustic signals of each channel to the discrete acoustic signals in the frequency domain. With this, the predicted amplitude spectra of the pre-whitened dereverberated signals are calculated. Such prediction values are suitable as values input to a system that requires pre-whitened data.

In the present invention, it is also preferred that a complex spectrum generation step of calculating predicted complex spectra of the dereverberated signals of channel w, by using the predicted amplitude spectra of the dereverberated signals of channel w and phase information of the discrete acoustic signals of channel w expressed in the frequency domain; and a time domain conversion step of calculating estimates of dereverberated signals of channel w, by converting the predicted complex spectra of the dereverberated signals of channel w into the time domain signals be further included. With this, estimated values (estimates of dereverberated signals) for the acoustic signal from which late reverberation has been removed are obtained.

In the above case, it is preferred that the dereverberation method further include a delay amount calculation step of determining a delay amount of each channel such that, when the estimates of dereverberated signals of each channel are delayed by the delay amount, inter-channel correlation among the estimates of dereverberated signals of the channels is maximized after the delay; M≧2; the model application step calculate the linear prediction coefficients for each of the channels; the late reverberation prediction step calculate the predicted late reverberations for each of the channels; the dereverberation step calculate the predicted amplitude spectra of the dereverberated signals for each of the channels; the complex spectrum generation step calculates the predicted complex spectra of the dereverberated signals for each of the channels; and the time domain conversion step calculate the estimates of dereverberated signals for each of the channels. The delay amount is determined to be 0 for estimates of dereverberated signals with no delay. With this, the delay amounts for the estimates of dereverberated signals calculated for the individual channels can be corrected among the channels.

In the above case, the estimates of dereverberated signals of each channel is delayed by the delay amount calculated for the channel, and the sum of the delayed estimates of dereverberated signals (including the estimates of dereverberated signals with no delay) is calculated as a corrected dereverberated signal. With this, the estimation accuracy of the dereverberated signal is improved.

In the present invention, it is preferred that the multi-step linear prediction model be given by $$x_w(n) = \sum_{m=1}^{M} \sum_{p=1}^{[N/M]} \alpha_{w,m}(p) \cdot x_m(n-p-D) + e_w(n)$$

where $x_w(n)$ is the discrete acoustic signal at the discrete time n corresponding to channel w (w=1 to M); $x_m(n)$ is the discrete acoustic signal at the discrete time n corresponding to channel m (m=1 to M); $e_w(n)$ is a prediction error corresponding to channel w and the discrete time n; N is a positive integer; [●] is a Floor function; $\alpha_{w,m}(p)$ is a p-th linear prediction coefficient in a case the linear prediction target (left-hand side of above equation) is $x_w(n)$; and D is a constant representing a step size (delay).

Effects of the Invention

As described above, the present invention can remove reverberation accurately in any environments.

BRIEF DESCRIPTION OF THE DRAWINGS

FIG. 1 is a block diagram showing a functional configuration of a dereverberation apparatus according to a first embodiment;

FIG. 5 is a flow chart for explaining the overall dereverberation processing of the first embodiment;

FIG. 8 is a block diagram showing an example functional configuration of a dereverberation apparatus according to a second embodiment;

FIG. 21 is a flow chart for explaining the overall dereverberation processing of the seventh embodiment;

DESCRIPTION OF REFERENCE NUMERALS

Figure 2A:
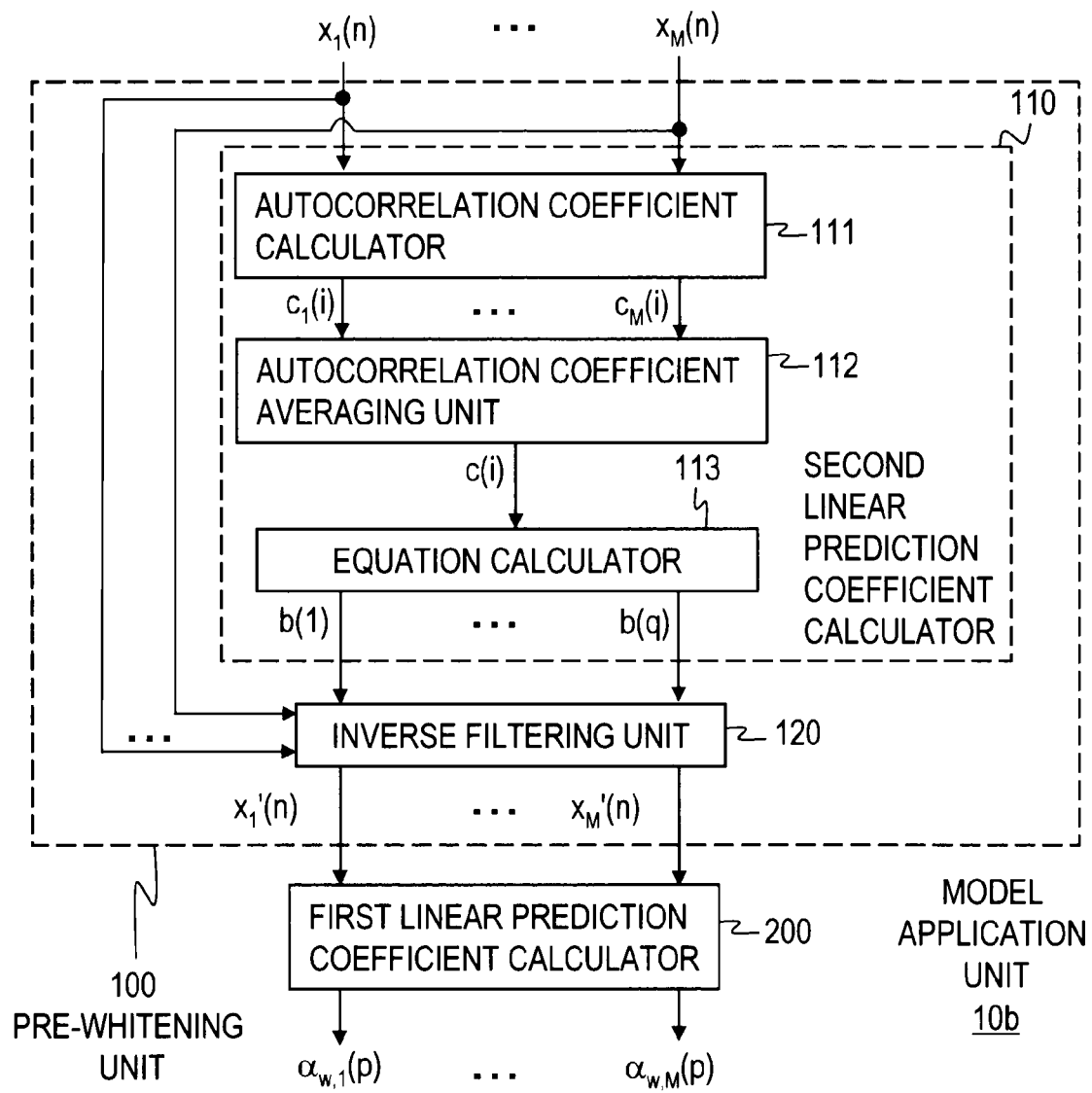
FIG. 2A is a block diagram showing details of the functional configuration of a model application unit.

10, 310, 610, 620, 710: Dereverberation apparatuses

BEST MODES FOR CARRYING OUT THE INVENTION

Now, embodiments of the present invention will be described with reference to the drawings.

[Principle 1]

Principle 1 of the present invention will be described first. Basically, in this description, the z-transform expression will be used (except for Expression (5) below).

An original acoustic signal s(z) is modeled as a product of a white noise u(z) (prediction error term) and a short (low order) autoregressive (AR) model d(z)=1/(1−β(z)), as shown in Expression (1) below. In other words, the original acoustic signal s(z) has short-term autocorrelation depending on d(z).

$$s(z) = u(z)/(1 - \beta(z)) \quad (1)$$
$$= u(z) \cdot d(z)$$

Here, β(z) is an AR polynomial as indicated below, where q is the order of linear prediction, and b(i) is the linear prediction coefficient of the i-th term.

$$\beta(z) = \sum_{i=1}^{q} b(i) \cdot z^{-i}$$

The acoustic signal $x_1(z)$ observed by a sensor (such as a microphone) is expressed as:

$$x_1(z) = u(z) \cdot [d(z) \cdot h(z)] \quad (2)$$
$$= u(z) \cdot g(z)$$

Here, h(z) represents a room transfer function from the source location of the acoustic signal to the sensor, and g(z) satisfies:

$$g(z) = d(z) \cdot h(z) \quad (3)$$

Here, g(z) is called a composite transfer function.

If the short-term autocorrelation depending on d(z) in the original acoustic signal s(z) can be ignored (if the original acoustic signal s(z) can be assumed to be a white noise), Expression (2) can be approximated as follows.

$$x_1(z) \approx u(z) \cdot h(z) \quad (4)$$

In other words, if d(z) can be assumed to be 1, the acoustic signal x(z) observed by the sensor can be modeled as a product of a white noise u(z) and an autoregressive model having a higher order than d(z).

Modeling as given by Expression (4) becomes more appropriate as d(z) approaches 1. In Principle 1, the short-term autocorrelation of the acoustic signal x(z) observed by the sensor is suppressed by pre-whitening processing. Accordingly, d(z) in the acoustic signal x(z) observed by the sensor is brought closer to 1, making the model given by Expression (4) to be more appropriate. If the original acoustic signal s(z) having not very strong autocorrelation depending on d(z) is processed, the model given by Expression (4) becomes appropriate to some extent, even without performing pre-whitening processing.

In that case, the observed acoustic signal can be approximated with a multi-step linear prediction model with N (number of sensor) of 1 (linear prediction model expressing a discrete acoustic signal at point a predetermined time passed after a long-term period by the sum of linear prediction term formed by linearly combining discrete acoustic signals in the long-term period and a prediction error term). In other words, the observed acoustic signal can be modeled as given by Expression (5) below, where n represents discrete time; $x_1(n)$ represents an acoustic signal corresponding to discrete time n (whose short-term correlation should be removed, if necessary); $\alpha_{1,1}(p)$ represents linear prediction coefficients; N represents the number of linear prediction coefficients; D represents a step size (delay); and $e_1(n)$ represents a prediction error corresponding to discrete time n. In a case given by Expression (5), a period of time between (n−N−D) and (n−1−D) corresponds to the "long-term period" in the definition of the multi-step linear prediction model, and $x_1(n)$ corresponds to the "discrete acoustic signal at point the predetermined time passed after the long-term period".

$$x_1(n) = \sum_{p=1}^{N} \alpha_{1,1}(p) \cdot x_1(n - p - D) + e_1(n) \quad (5)$$

By expressing a direct sound component and a late reverberation component of g(z) in Expression (2) as $g_d(z)$ and $g_r(z)$, respectively, the following Expression (6) can be assumed.

$$g(z) = g_d(z) + z^{-D} \cdot g_r(z) \quad (6)$$

Then, α(z) obtained by performing z transform of the linear prediction coefficients $\alpha_{1,1}(p)$ in Expression (5) can be given by Expression (7) below.

$$\alpha(z) = \frac{z^{-D} g_r(z)}{\hat{g}(z)} \quad (7)$$

In the expression, the following are assumed.

$$g(z) := g_{min}(z) \cdot g_{max}(z) \quad (8)$$

$$\hat{g}(z) := g_{min}(z) \cdot \min[g_{max}(z)] \quad (9)$$

The meanings of $g_{min}(z)$ and $g_{max}(z)$ are a minimum phase component (component corresponding to the zero in the unit circle in the Z plane) and a maximum phase component (component corresponding to the zero outside the unit circle in the Z plane) of g(z), respectively. As has been described earlier, g(z) is approximated to the room transfer function h(z)

through the pre-whitening processing. Generally, the room transfer function h(z) is a non-minimum phase system (it has both a minimum phase component and a maximum phase component). Therefore, it is appropriate to assume $g(z)=g_{min}(z) \cdot g_{max}(z)$. In addition, $\min[g_{max}(z)]$ is obtained when $g_{max}(z)$ is converted to a minimum phase system and represents points which are conjugate inverse of all the zeros of $g_{max}(z)$, in the unit circle in the Z plane.

The observed signal $x'(z)=u(z) \cdot g(z)$ after pre-whitening processing is then multiplied by the linear prediction coefficients $\alpha(z)$ of Expression (7), and Expressions (7) to (9) are substituted, yielding Expression (10) below.

$$u(z \cdot [g(z \cdot \alpha(z)] = u\left(z \cdot \left[\frac{g(z) \cdot z^{-D} g_r(z)}{\hat{g}(z)}\right]\right) \quad (10)$$
$$= u\left(z \cdot \left[\frac{g_{max}(z)}{\min[g_{max}(z)]} \cdot z^{-D} g_r(r)\right]\right)$$
$$= \hat{u}(z \cdot z^{-D} g_r(z)$$

Here, $g_{max}(z)/\min[g_{max}(z)]$ becomes an all-pass filter (a function which maintains the amplitude of the multiplied signal and allows the phase to be changed). Accordingly, it becomes clear that $\hat{u}(z)$ is a white noise having the same variance as $u(z)$. As given by Expression (6), $z^{-D} \cdot g_r(z)$ is a component derived from the late reverberation component. Because the acoustic signal is given by Expression (2), the amplitude spectrum of Expression (10) approximates to the amplitude spectrum of the late reverberation component of the acoustic signal. In other words, a signal having an amplitude spectrum approximating to that of the late reverberation component can be obtained by calculating linear prediction coefficients through numerical optimization of the multi-step linear prediction model of Expression (5) based on an acoustic signal with short-term correlation eliminated by pre-whitening processing, and multiplying the linear prediction coefficients with the observed signal. By subtracting the estimated amplitude spectrum from the amplitude spectrum of the observed acoustic signal x(z), an amplitude spectrum without late reverberation can be obtained.

[Principle 2]

The method of Principle 1, however, cannot eliminate late reverberation accurately in some cases. The reason will be described below.

Expression (10) given above is a relational expression that holds if the analysis frame length is infinite. If the analysis frame unit has a finite length, Expression (10) does not necessarily hold. The response of the all-pass filter $g_{max}(z)/\min[g_{max}(z)]$ on the right side of Expression (10) becomes longer as the maximum phase component in the room transfer function h(z) increases. Therefore, if the analysis frame has a finite length, the maximum phase component in the room transfer function h(z) increases, and as the response of the all-pass filter $g_{max}(z)/\min[g_{max}(z)]$ becomes longer, the divergence between the left side and the right side of Expression (10) increases.

The method of Principle 1 is generally executed in units of analysis frames having a finite length. If the room transfer function h(z) contains a small number of maximum phase components, Expression (10) in the analysis frame unit shows a comparatively good approximation, and the method of Principle 1 can eliminate late reverberation accurately. In general, however, as the distance between the signal source location and the sensor increases, the number of maximum phase components in the room transfer function h(z) increases. In that case, Expression (10) does not hold within the analysis frame, then the accuracy of dereverberation decreases, since the method of Principle 1 is based on the assumption that Expression (10) holds.

If the room transfer function from the signal source to the sensor contains a maximum phase component, a perfect inverse filter cannot be formed by using a signal-channel acoustic signal observed by a single sensor. Here, the fact that an inverse filter can be formed is equivalent to the fact that the linear prediction coefficients can be calculated. This is disclosed in M. Miyoshi and Y. Kaneda, "Inverse Filtering of Room Acoustics," IEEE Trans. on Acoustics, Speech and Signal Processing, 36(2), pp. 145-152, 1998 (hereafter referred to as reference literature 1), for example. Reference literature 1 also discloses that an inverse filter can be formed by using multi-channel acoustic signals observed by multiple sensors if the room transfer functions from the signal source location to the sensors contains a maximum phase components.

In Principle 2, the multi-channel multi-step linear prediction model (multi-step linear prediction model when the number of sensors M is greater than or equal to 2) described above is used as the linear prediction model, and acoustic signals of multiple channels observed by multiple sensors are used to obtain linear prediction coefficients. This enables dereverberation processing using the linear prediction model. The fact that the linear prediction filter can be obtained by the method of Principle 2 does not depend on the number of the maximum phase components in the room transfer function. Principle 2 will be described below.

An acoustic signal $x_m(z)$ observed by a sensor m (m= 1, . . . , M) can be modeled as given below. The composite transfer function $g_m(z)$ satisfies $g_m(z)=d(z) \cdot h_m(z)$, and $h_m(z)$ is a room transfer function from the source of the acoustic signal to the sensor m.

$$x_m(z) = u(z) \cdot (d(z) \cdot h_m(z)) \quad (11)$$
$$= u(z) \cdot g_m(z)$$

If the short-term autocorrelation depending on d(z) in the original acoustic signal s(z) can be ignored (if the original acoustic signal s(z) can be considered as a white noise), Expression (11) can be approximated as given below.

$$x_m(z) \approx u(z) \cdot h_m(z) \quad (12)$$

If d(z) can be regarded as 1, the acoustic signal $x_m(z)$ observed by the sensor m can be modeled as a product of the white noise u(z) and an autoregressive model having a higher order than d(z) has been applied.

Modeling as given by Expression (12) becomes more appropriate as d(z) is brought closer to 1. In Principle 2, the short-term autocorrelation of the acoustic signal $x_m(z)$ observed by the sensor m is suppressed by pre-whitening processing. This brings d(z) of the acoustic signal $x_m(z)$ observed by the sensor m closer to 1, making it appropriate to apply Expression (12) to the model. However, we process the original acoustic signal s(z) having not very strong autocorrelation depending on d(z), it is appropriate to some degree to use the model given by Expression (12), without performing pre-whitening processing.

The room transfer function $h_m(z)$ contains a maximum phase component. As Reference literature 1 discloses, if the room transfer function $h_m(z)$ contains maximum phase components, an inverse filter cannot be formed just by using a signal-channel acoustic signal observed by a single sensor;

rather, an inverse filter can be formed only by using multi-channel acoustic signals. If this principle is applied to the model of Expression (12), it can be said that correct linear prediction coefficients can be obtained and an accurate late reverberation signal can be predicted and eliminated only when the model of Expression (12) is formed with multi-channel acoustic signals. Accordingly, in Principle 2, the model of Expression (12) is formed by a multi-channel multi-step linear prediction model (a linear prediction model expressing a discrete acoustic signal at discrete time a predetermined period passed after a long-term period by the sum of linear prediction term formed by linearly combining discrete acoustic signals of M (M≧2) channels in the long-term period and a prediction error term). An example of the multi-channel multi-step linear prediction model is given by Expression (13) below. Expression (13) gives a multi-channel multi-step linear prediction model in the time domain.

$$x_w(n) = \sum_{m=1}^{M} \sum_{p=1}^{[N/M]} \alpha_{w,m}(p) \cdot x_m(n-p-D) + e_w(n) \quad (13)$$

Here, n represents discrete time index; $x_w(n)$ represents the discrete acoustic signal of channel w observed by the sensor w (w=1, ..., M) and sampled at discrete time n, or corresponds to a discrete acoustic signal obtained by pre-whitening the signal; $x_m(n)$ is a discrete acoustic signal observed by the sensor m and sampled at discrete time n, or a discrete acoustic signal obtained by pre-whitening the signal; $e_w(n)$ is a prediction error corresponding to the sensor w and discrete time n, and the terms other than the prediction error term on the right side of Expression (13) are linear prediction term; M represents the total number of sensors; N−1 represents the filter length (order of linear prediction); the brackets [●] are a Floor function representing the maximum integer not exceeding ●; $\alpha_{w,m}(p)$ is the p-th linear prediction coefficient in a case the linear prediction target (left-hand side of above equation) is, $x_w(n)$; and D represents a step size (delay). In Expression (13), a period of time between (n−[N/M]−D) and (n−1−D) corresponds to the "long-term period" indicated in the definition of the multi-channel multi-step linear prediction model, and $x_w(n)$ corresponds to the "discrete acoustic signal at the point predetermined time passed after the long-term period."

In Principle 2, discrete acoustic signals of channels or pre-whitened signals thereof are used, and the linear prediction coefficients $\alpha_{w,m}(p)$ of the multi-channel multi-step linear prediction model are calculated to obtain the values of the linear prediction term of the multi-channel multi-step linear prediction model. The predicted values of the late reverberation component (predicted late reverberations) are calculated from the value of the linear prediction term. Then, the relative values of the amplitude spectrum of the discrete acoustic signal and the amplitude spectrum of the predicted late reverberations are obtained in the frequency domain, and these relative values are used as the predicted amplitude spectra of the dereverberation signal (for example, refer to S. F. Boll, "Suppression of acoustic noise in speech using spectral subtraction," IEEE Trans. on Acoustics, Speech and Signal Processing, 27(2), pp. 113-120, 1979). Such a method makes it possible to accurately extract the amplitude spectrum of the direct sound component, which is important in processing such as speech recognition processing.

[Principles 1 and 2 Explained from a Different Viewpoint]

Principles 1 and 2 will be described from a different viewpoint.

[Problem]

An original acoustic signal s(n) corresponding to discrete time n in the time domain is expressed as follows, by using a Vth-order FIR filter d(k) and a white noise u(n).

$$s(n) = \sum_{k=0}^{V} d(k) \cdot u(n-k) \quad (14)$$

By using this, the acoustic signal $x_m(n)$ observed by the sensor m can be modeled as follows.

$$x_m(n) = \sum_t h_m(t) \cdot s(n-t) \quad (15)$$
$$= \sum_{L=0}^{T-1} g_m(L) \cdot u(n-L)$$

where $$g_m(L) = \sum_{k=0}^{V} h_m(L-k) \cdot d(k) \quad (16)$$

Here, $h_m(n)$ represents an impulse response between the sensor m and the sound source location.

Expression (15) can be rewritten in a matrix, as follows.

$$X_m(n) = G_m \cdot U(n) \quad (17)$$

where
$U(n) = [u(n), u(n-1), \ldots, u(n-T-N+1)]^T$
$X_m(n) = [x_m(n), x_m(n-1), \ldots, x_m(n-N)]^T$
$g_m = [g_m(0), g_m(1), \ldots, g_m(T-1)]$ $$G_m = \begin{bmatrix} g_m & 0 & \cdots & \cdots & 0 \\ 0 & g_m & \ddots & & \vdots \\ \vdots & \ddots & g_m & \ddots & \vdots \\ \vdots & & \ddots & \ddots & 0 \\ 0 & \cdots & \cdots & 0 & g_m \end{bmatrix}$$

Here, $[●]^T$ represents the transpose of a matrix [●].

[Estimation of Late Reverberation when M=1 (Principle 1)]

As described above, Principle 1 models an observed acoustic signal as given by Expression (5), for instance. In Expression (5), obtaining linear prediction coefficients $\alpha_{1,1}(p)$ that minimize the energy of the prediction error component $e_1(n)$ is equivalent to solving the following normal-equation.

$$(E\{x_1(n-1-D) \cdot x_1^T(n-1-D)\}) \cdot A = E\{x_1(n-1-D) \cdot x_1(n)\} \quad (18)$$

Here, E{●} represents the time average of ●, and A represents the matrix $A = [\alpha_{1,1}(1), \alpha_{1,1}(2), \ldots, \alpha_{1,1}(N-1)]^T$ of the linear prediction coefficients $\alpha_{1,1}(p)$ in Expression (5).

Therefore, A can be obtained as follows.

$$A = (E\{x_1(n-1-D) \cdot x_1^T(n-1-D)\})^{-1} \cdot E\{x_1(n-1-D) \cdot x_1(n)\} \quad (19)$$

The inside of the $(\bullet)^{-1}$ in Expression (19) can be expanded as follows.

$$E\{x_1(n-1-D) \cdot x_1^T(n-1-D)\} = \qquad (20)$$
$$G_1 \cdot E\{U(n-1-D) \cdot U^T(n-1-D)\} \cdot G_1^T = \sigma_u^2 \cdot G_1 \cdot G_1^T$$

The following autocorrelation matrix of the white noise u(n) is assumed.

$$E\{U(n-1-D) \cdot U^T(n-1-D)\} = \sigma_u^2 \cdot I$$

Here, $\sigma_u^2$ represents the variance of u(n), and I represents a unit matrix.

$E\{x_1(n-1-D) \cdot x_1(n)\}$ in Expression (19) can be expanded as follows.

$$E\{x_1(n-1-D) \cdot x_1(n)\} = G_1 \cdot E\{U(n-1-D) \cdot U^T(n)\} \cdot g_1^T = \sigma_u^2 G_1 \cdot g_{late,1}^T \qquad (21)$$

In the expression,
$g_{late,1} = [g(D), g(D+1), \ldots, g(T-1), 0, \ldots, 0]^T$
where $g_{late,1}$ represents the D-th and subsequent elements of g(n) and corresponds to late reverberation.

By using Expressions (20) and (21), A in Expression (19) can be rewritten as follows. Here, $(\bullet)^{-1}$ represents an inverse matrix of $\bullet$.

$$A = (G_1 \cdot G_1^T)^{-1} \cdot G_1 \cdot g_{late,1} \qquad (22)$$

Now, the matrix $X_1(n)$ of the acoustic signal is multiplied by the matrix A of the linear prediction coefficients of Expression (5), and its mean square is obtained as given below.

$$E\{(X_1^T(n) \cdot A)^2\} = \|A^T \cdot G_1 \cdot E\{U(n) \cdot U^T(n)\} \cdot G_1^T \cdot A\| \qquad (23)$$
$$= \|\sigma_u^2 \cdot A^T \cdot G_1 \cdot G_1^T \cdot A\|$$
$$= \|\sigma_u^2 \cdot g_{late,1}^T \cdot G_1^T \cdot (G_1 \cdot G_1^T)^{-1} \cdot G_1 \cdot g_{late,1}^T\|$$
$$\leq \|\sigma_u^2 \cdot g_{late,1}^T\| \cdot \|G_1^T \cdot (G_1 \cdot G_1^T)^{-1} \cdot G_1\| \cdot \qquad (24)$$
$$\|g_{late,1}^T\|$$
$$= \|\sigma_u^2 \cdot g_{late,1}^T\|^2 \qquad (25)$$

Here, $\|\bullet\|$ represents the $L_2$ norm of the matrix $\bullet$. To derive Expression (23), the autocorrelation matrix of the white noise u(n) is assumed to be expanded as:

$$E\{U(n) \cdot U^T(n)\} = \sigma_u^2 \cdot I$$

This factorization holds with respect to a sufficiently long acoustic signal. Expression (24) is derived by using Expression (22) and the Cauchy-Schwarz inequality. Expression (25) is derived by using the fact that $\|G_1^T \cdot (G_1 \cdot G_1^T)^{-1} \cdot G_1\|$ is a projection matrix and that the norm thereof is 1.

In the expression, $\sigma_u^2$ represents the variance of the white noise u(n), and $g_{late,1}$ is a component corresponding to late reverberation. Therefore, $\|\sigma_u^2 \cdot g_{late,1}^T\|^2$ in Expression (25) represents the power of the late reverberation component. Consequently, a value obtained as the mean square of the product of the acoustic signal, the matrix $X_1(n)$, and the linear prediction coefficients of Expression (5), the matrix A of Expression (5) may not always be an accurately estimated value of the power of the late reverberation component, but may not overestimate the power of the late reverberation component.

[Estimation of Late Reverberation when M≧2 (Principle 2)]

The multi-channel multi-step linear prediction model can be formulated by Expression (13) given above. Replacing [N/M] with L in Expression (13) changes Expression (13) as follows.

$$x_w(n) = \sum_{m=1}^{M} \sum_{p=1}^{L} \alpha_{w,m}(p) \cdot x_m(n-p-D) + e_w(n) \qquad (26)$$

In Expression (26), obtaining the linear prediction coefficients $\alpha_{w,m}(p)$ that minimize the energy of the prediction error component $e_w(n)$ is equivalent to solving the following normal equation:

$$(E\{X(n-1-D) \cdot X^T(n-1-D)\}) \cdot A_w = E\{X(n-1-D) \cdot X(n)\} \qquad (27)$$

where
$X(n) = [X_1^T(n), X_2^T(n), \ldots, X_M^T(n)]^T$
and $A_w$ is the matrix of the linear prediction coefficients $\alpha_{w,m}(p)$ in Expression (26), and
$A_w = [\alpha_{w,1}(1), \ldots, \alpha_{w,1}(L), \alpha_{w,2}(1), \ldots, \alpha_{w,M}(L)]^T$ Therefore, $A_w$ can be obtained as follows. In the expression, $(\bullet)^+$ represents the Moore-Penrose generalized inverse matrix of the matrix $(\bullet)$.

$$A_w = (E\{X(n-1-D) \cdot X^T(n-1-D)\})^+ \cdot E\{X(n-1-D) \cdot X(n)\} \qquad (28)$$

As in the estimation with M=1, by expanding Expression (28), $A_w$ can be transformed as follows.

$$A_w = (G \cdot G^T)^+ \cdot G \cdot g_{late,w} \qquad (29)$$
$$= (G^T)^+ \cdot g_{late,w}$$

where
$G = [G_1^T, G_2^T, \ldots, G_M^T]^T$
and
$g_{late,w} = [g_w(D), g_w(D+1), \ldots, g_w(T-1), 0, \ldots, 0]^T$
In addition, G is a full column rank matrix.

Next, late reverberation is estimated from multi-channel acoustic signals observed by multiple sensors, by using the matrix $A_w$ of the estimated linear prediction coefficients $\alpha_{w,m}(p)$. For that purpose, a transposition of the vector X(n) is multiplied by the matrix $A_w$ of the linear prediction coefficients $\alpha_{w,m}(p)$ in Expression (26), as follows.

$$X^T(n) \cdot A_w = U^T(n) \cdot G^T \cdot A_w$$
$$= U^T(n) \cdot G^T \cdot (G^T)^+ \cdot g_{late,w} \qquad (30)$$
$$= U^T(n) \cdot G^T \cdot G \cdot (G^T \cdot G)^{-1} \cdot g_{late,w} \qquad (31)$$
$$= U^T(n) \cdot g_{late,w} \qquad (32)$$

Expression (29) is used to derive Expression (30), and the definition of the Moore-Penrose generalized inverse matrix is used to derive Expression (31). Here, $U^T(n) \cdot g_{late,w}$ means the late reverberation component of the acoustic signal. It indicates that the late reverberation component of the acoustic signal can be correctly estimated by multiplying the matrix $A_w$ of the linear prediction coefficients $\alpha_{w,m}(p)$ in Expression (26) by the transposition of the vector of Expression (28). In other words, it can be understood that an accurate late reverberation component can always be estimated by using a multi-channel multi-step linear model.

[Value of D of the Multi-Step Linear Prediction Model and Short-Term Correlation of the Acoustic Signal]

The relationship between the value of D of the multi-step linear prediction model and the short-term correlation of the acoustic signal will be described next.

The methods of Principles 1 and 2 are based on the assumption that the approximations of Expressions (4) and (12) hold. In other words, with the methods of Principles 1 and 2, late reverberation can be eliminated accurately when the difference ($\|h_m(n)\|-\|g_m(n)\|$) ($m \geq 1$) between the room transfer function $h_m(n)$ and the composite transfer function $g_m(n)$, shown in Expression (15), is sufficiently small.

Figure 23A:
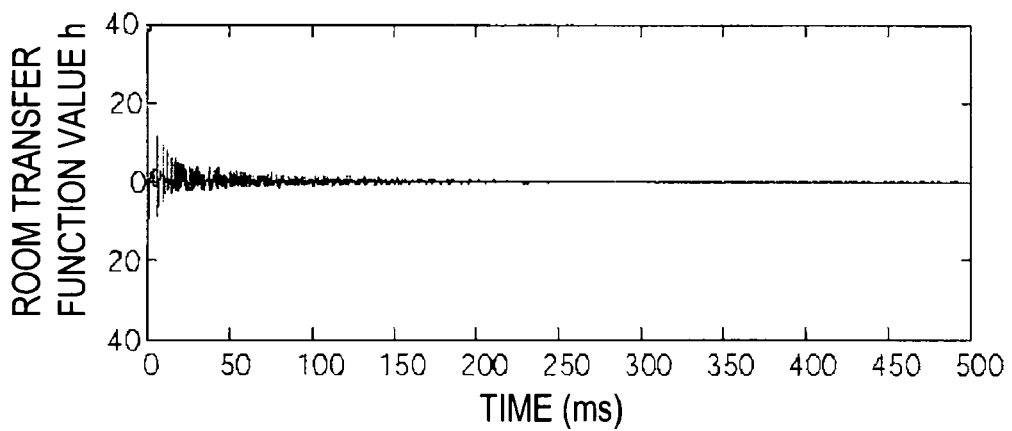
FIG. 23A is a graph in which the vertical axis represents a room transfer function value h and the horizontal axis represents time (ms)
Figure 23B:
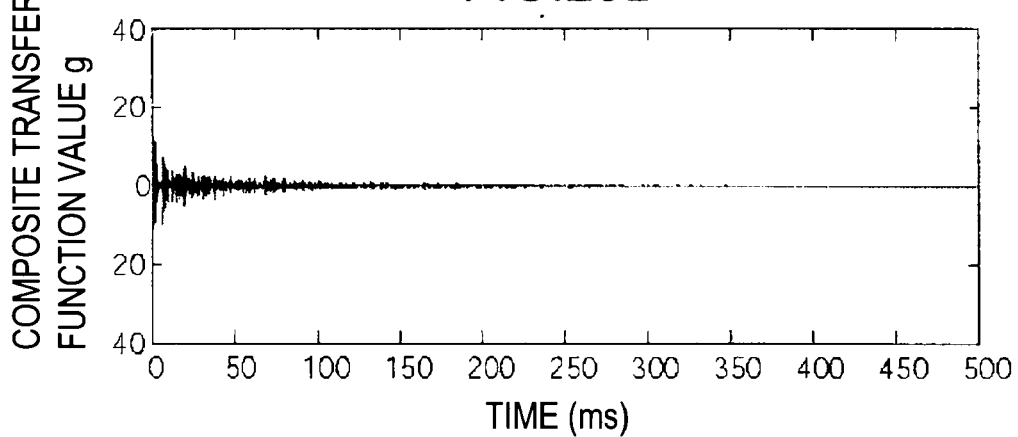
FIG. 23B is a graph in which the vertical axis represents a composite transfer function value g and the horizontal axis represents time (ms)
Figure 23C:
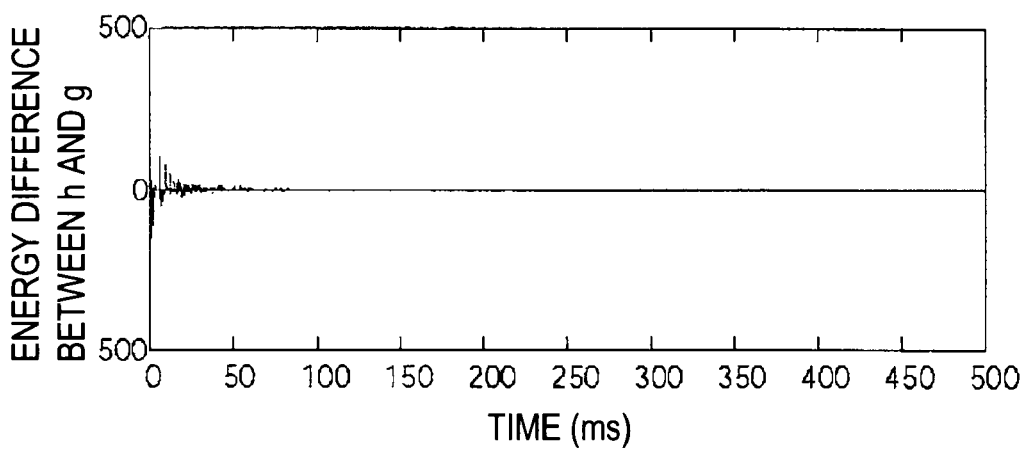
FIG. 23C is a graph in which the vertical axis represents the energy difference between the room transfer function h and the composite transfer function g and the horizontal axis represents time (ms)
Figure 24A:
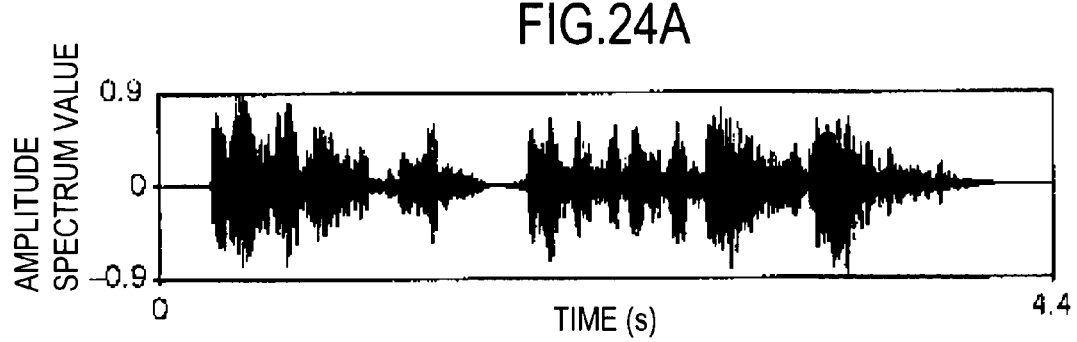
FIGS. 24A and 24B are views showing an amplitude spectrum value and a speech waveform before dereverberation, respectively.
Figure 24B:
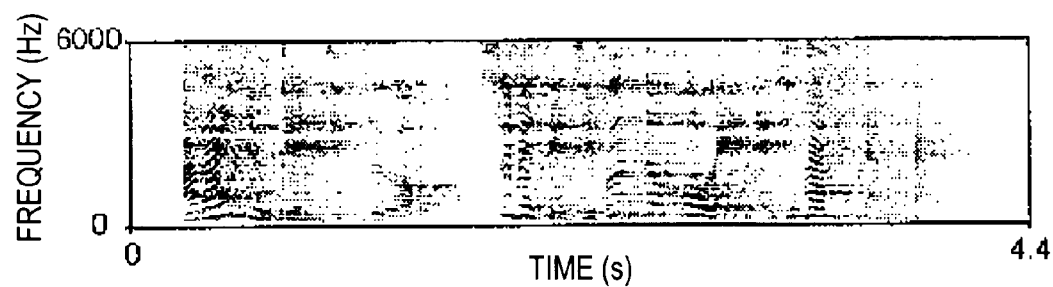
Figure 24C:
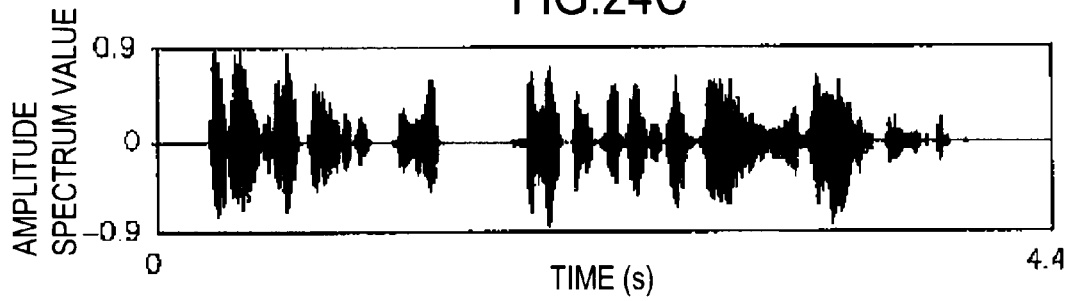
FIGS. 24C and 24D are views showing an amplitude spectrum value and a speech waveform after dereverberation according to the present invention (M=1), respectively.
Figure 24D:
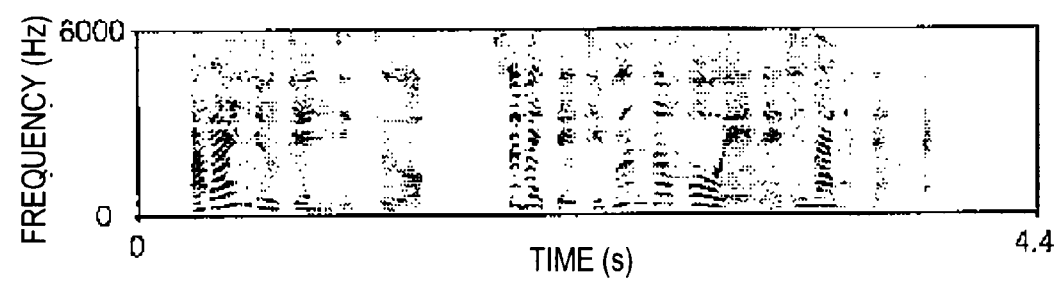

FIG. 23A shows a graph in which the vertical axis represents the room transfer function value h and the horizontal axis represents time (ms). FIG. 23B shows a graph in which the vertical axis represents the composite transfer function value g and the horizontal axis represents time (ms). FIG. 23C shows a graph in which the vertical axis represents the energy difference between the room transfer function h and the composite transfer function g and the horizontal axis represents time (ms).

As shown in FIG. 23A, the room transfer function value h attenuates exponentially with the passage of time. As shown in FIG. 23B, the composite transfer function value g also attenuates exponentially with the passage of time. As shown in FIG. 23C, when the room transfer function value h or the composite transfer function value g is large, the energy difference between them is also large. When the room transfer function value h and the composite transfer function value g are small, the energy difference between them is also small. In other words, the energy difference between the room transfer function h and the composite transfer function g decreases with the passage of time. Then, after a "certain period," the energy difference becomes so small (falls below a predetermined threshold level) that it can be ignored with respect to the energy of the entire sound signal. This means that it is preferable that a value greater than or equal to the "certain period" be set as D of the multi-step linear prediction model of Expressions (5) and (13). However, d(z) and the energy ratio between the room transfer function h and the composite transfer function g are unknown, and the "certain period" is uncertain. Therefore, the "certain period" is generally estimated by a rule of thumb, and the value of D of the multi-step linear prediction model is set on the basis of the estimate of the "certain period". It is more preferable that the d(z) component be suppressed by pre-whitening, on the assumption that it is difficult to estimate the "certain period." This extends the possible setting range of D, where the energy difference between the room transfer function h and the composite transfer function g can be ignored and late reverberation can be eliminated accurately. The lower limit of D is generally 1, but if the d(z) component can be suppressed sufficiently by pre-whitening, D can be 0.

The upper limit of D of the multi-step linear prediction model can be such a value that the reverberation component at discrete time n+1+D derived from $x_m(n)$ at discrete time n becomes greater than or equal to a predetermined value (such as a value 60 dB lower than $x_m(n)$ at discrete time n).

First Embodiment

A first embodiment of the present invention will be described next. In the first embodiment, the number of sensors M is greater than or equal to 2, i.e., $M \geq 2$.

<Hardware Configuration>

Figure 3:
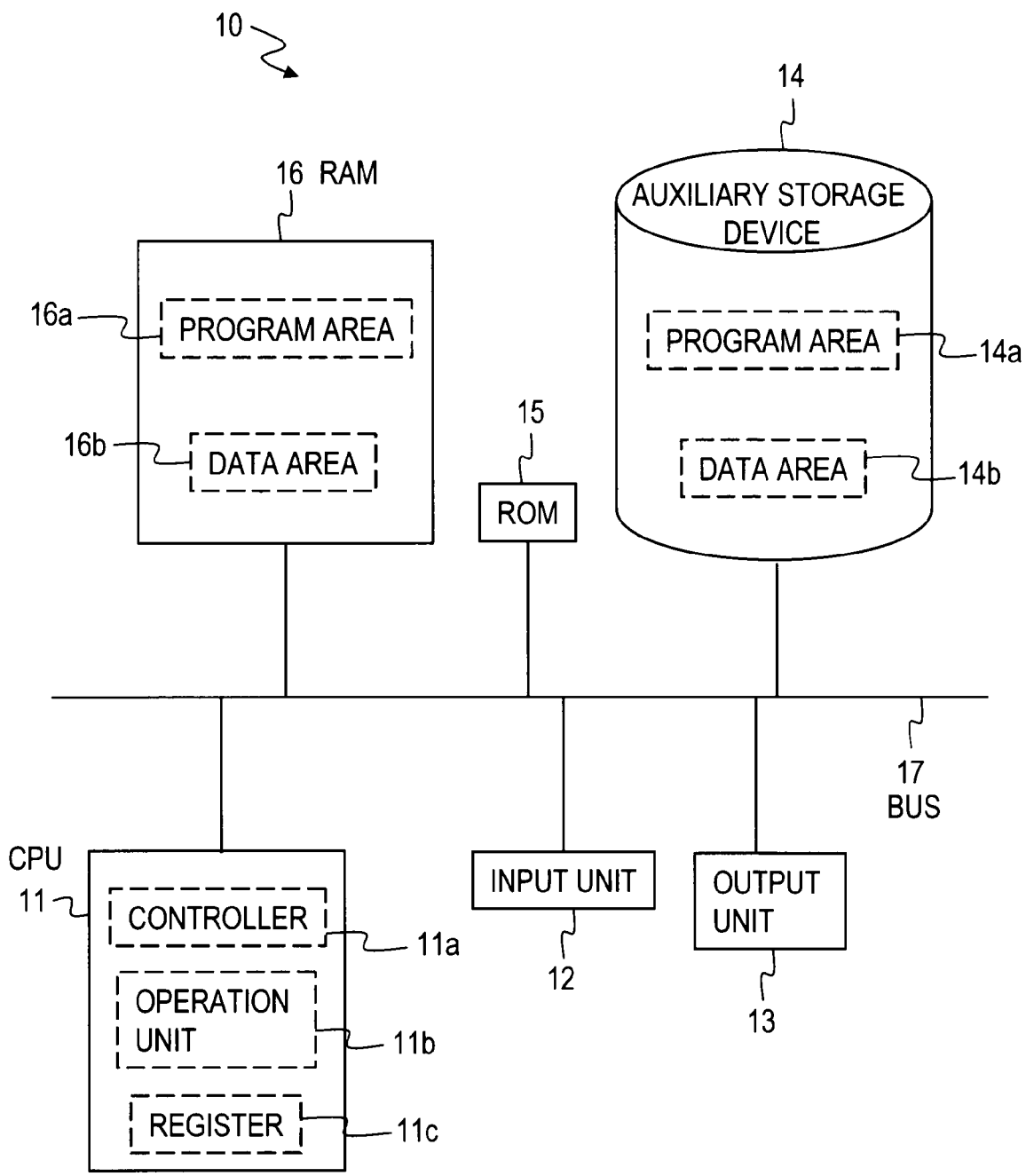
FIG. 3 is a block diagram showing a hardware structure of the dereverberation apparatus 10 of the first embodiment.

FIG. 3 is a block diagram showing the hardware structure of a dereverberation apparatus 10 of the first embodiment.

As shown in FIG. 3, the dereverberation apparatus 10 shown as an example includes a central processing unit (CPU) 11, an input unit 12, an output unit 13, an auxiliary storage device 14, a read-only memory (ROM) 15, a random access memory (RAM) 16, and a bus 17.

The CPU 11 shown includes a controller 11a, an operation unit 11b, and a register 11c, and performs a variety of operations in accordance with programs read into the register 11c. The input unit 12 is an input interface to which data is input, such as a keyboard or a mouse, and the output unit 13 is an output interface from which data is output. The auxiliary storage device 14 is a hard disk drive, a magneto-optical disc (MO), a semiconductor memory, or the like, and has a program area 14a where a program for operating a computer, serving as the dereverberation apparatus 10, is stored and a data area 14b where data is stored. The RAM 16 is a static random access memory (SRAM), a dynamic random access memory (DRAM), or the like, and has a program area 16a where the program is stored and a data area 16b where data is stored. The bus 17 connects the CPU 11, the input unit 12, the output unit 13, the auxiliary storage device 14, the ROM 15, and the RAM 16 in such a manner that they can communicate with one another.

Examples of the hardware include a personal computer, a server apparatus, a workstation, or the like.

<Program Configuration>

As has been described above, the program areas 14a and 16a store a dereverberation program for executing the processing of the dereverberation apparatus 10 of the first embodiment. Each program forming the dereverberation program may be written as a single program string, and at least a part of the program may be stored as a separate module in a library. Each program may implement a function by itself, and each program may also read a different library to implement a function.

<Collaboration Between Hardware and Program>

The CPU 11 (FIG. 3) writes the program stored in the program area 14a of the auxiliary storage device 14 into the program area 16a of the RAM 16, in accordance with the read program of the operating system (OS). In the same way, the CPU 11 writes the data stored in the data area 14b of the auxiliary storage device 14 into the data area 16b of the RAM 16. Addresses where the program and data are written in the RAM 16 are stored in the register 11c of the CPU 11. The controller 11a of the CPU 11 successively reads the addresses stored in the register 11c, reads the program and data from the areas in the RAM 16 indicated by the read addresses, causes the operation unit 11b to execute the operation indicated by the program successively, and stores the results of operations in the register 11c.

Figure 2B:
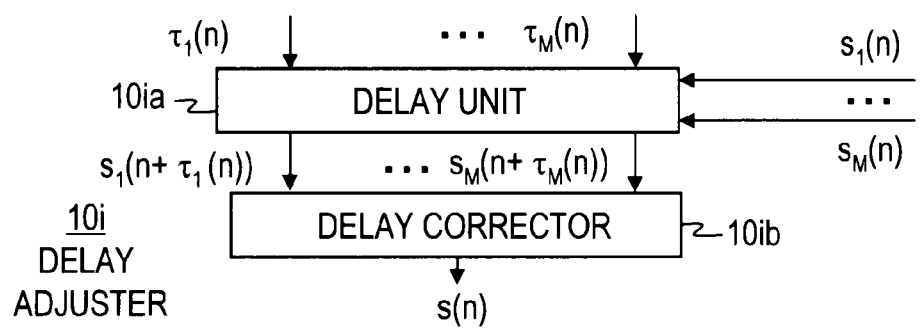
FIG. 2B is a block diagram showing details of the functional configuration of a delay adjuster.

FIG. 1 is a block diagram showing the functional configuration of the dereverberation apparatus 10 implemented by executing the programs read into the CPU 11. FIG. 2A is a block diagram showing details of the functional configuration of a model application unit 10b. FIG. 2B is a block diagram showing details of the functional configuration of a delay adjuster 10i.

As shown in FIG. 1, the dereverberation apparatus 10 includes a memory 10a, the model application unit 10b, a late reverberation predictor 10c, a frequency domain converter 10d, a late reverberation eliminator 10e, a complex spectrum generator 10f, a time domain converter 10g, a delay amount calculator 10h, the delay adjuster 10i, a memory 10j, and a controller 10k.

As shown in FIG. 2A, the model application unit 10b includes a pre-whitening unit 100 and a first linear prediction coefficient calculator 200. The pre-whitening unit 100 includes a second linear prediction coefficient calculator 110 and an inverse filtering unit 120. The second linear prediction coefficient calculator 110 includes an autocorrelation coefficient calculator 111, an autocorrelation coefficient averaging unit 112, and an equation calculator 113. As shown in FIG. 2B, the delay adjuster 10*i* includes a delay unit 10*ia* and a delay corrector 10*ib*.

The memory 10*a* and the memory 10*j* correspond to the auxiliary storage device 14, the RAM 16, the register 11*c*, any other memory such as a buffer memory or cache memory, or a storage area using some of these components. The model application unit 10*b*, the late reverberation predictor 10*c*, the frequency domain converter 10*d*, the late reverberation eliminator 10*e*, the complex spectrum generator 10*f*, the time domain converter 10*g*, the delay amount calculator 10*h*, the delay adjuster 10*i*, and the controller 10*k* are implemented by executing the dereverberation program in the CPU 11.

The dereverberation apparatus 10 of the first embodiment executes processing under the control of the controller 10*k*. Unless otherwise specified, all data in the process of calculation are stored in or read from the memory 10*j* while the operation processing is proceeding. Data such as $x_1(n)$ and $\alpha_{1,2}(p)$ are stored in the memory 10*a* and the memory 10*j* in association with the data attributes, the values of the subscripts (such as the subscript 1 in data $x_1(n)$), and the values in parentheses (●) (such as n in data $x_1(n)$), and necessary data can be extracted by specifying those elements.

<Dereverberation Processing>

Dereverberation processing of the first embodiment will be described next.

Figure 4:
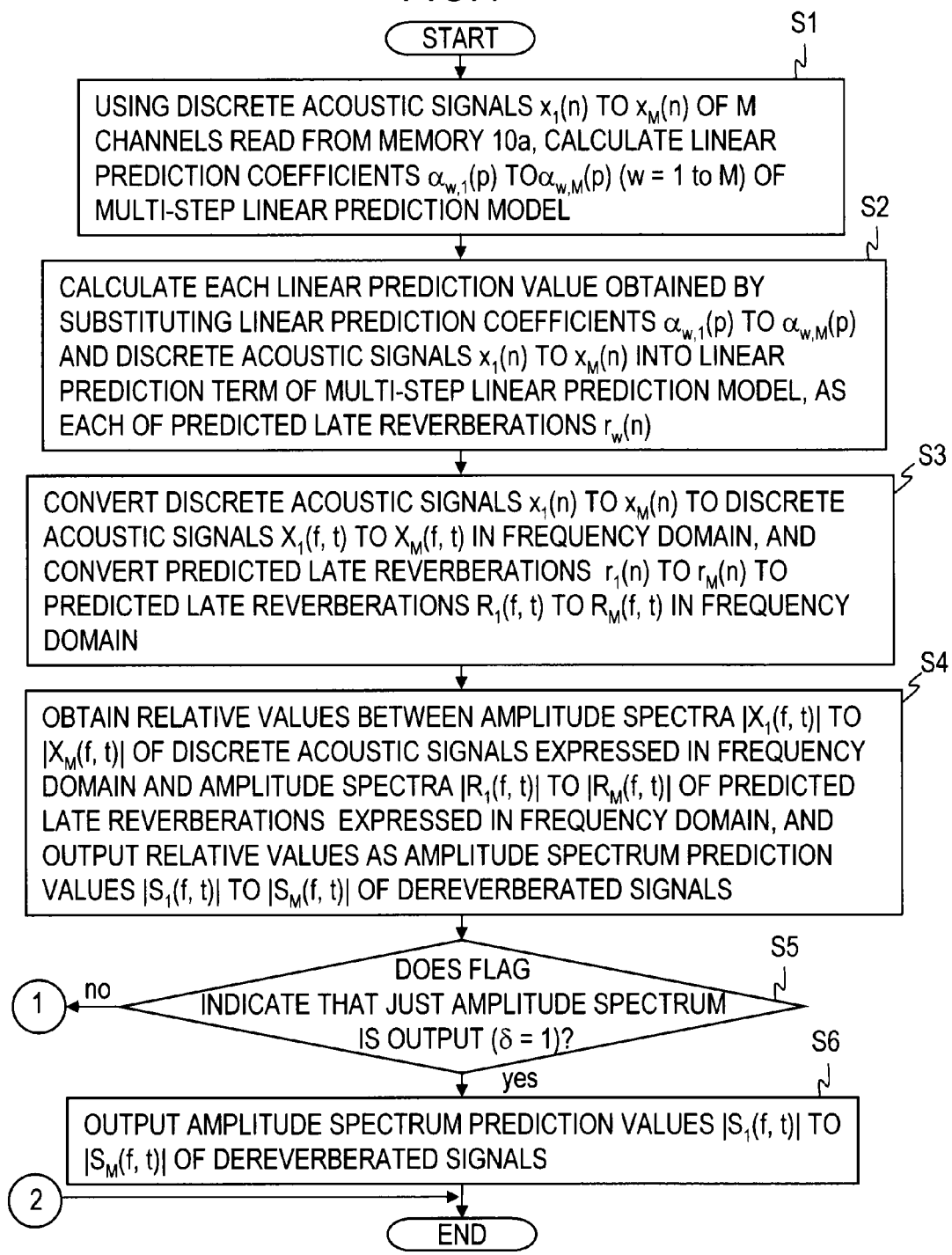
FIG. 4 is a flow chart for explaining the overall dereverberation processing of the first embodiment.
Figure 6A:
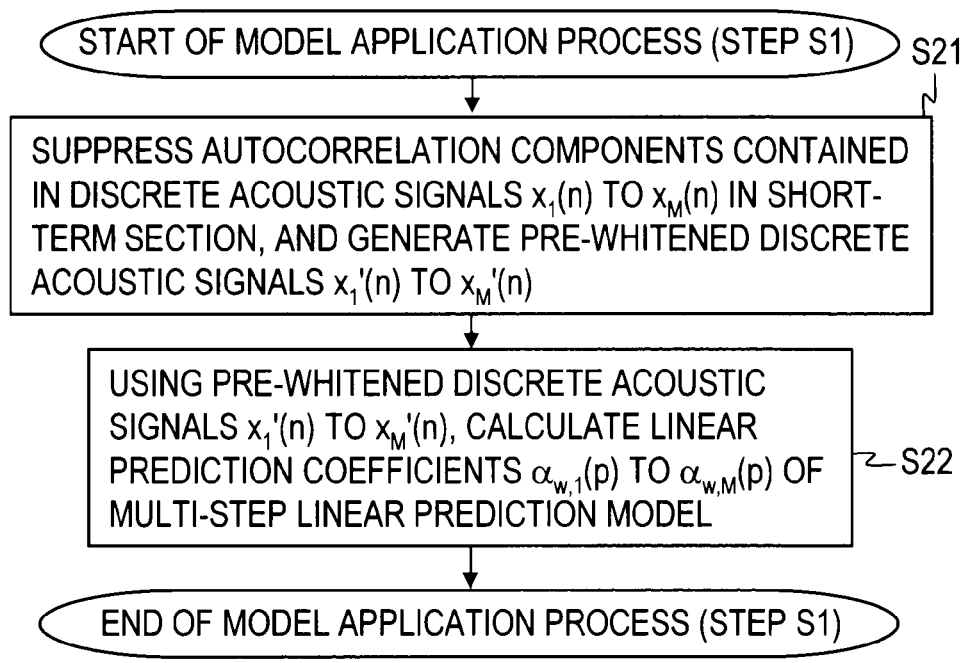
FIG. 6A is a flow chart for explaining details of step S1 (model application process) in FIG. 4.
Figure 6B:
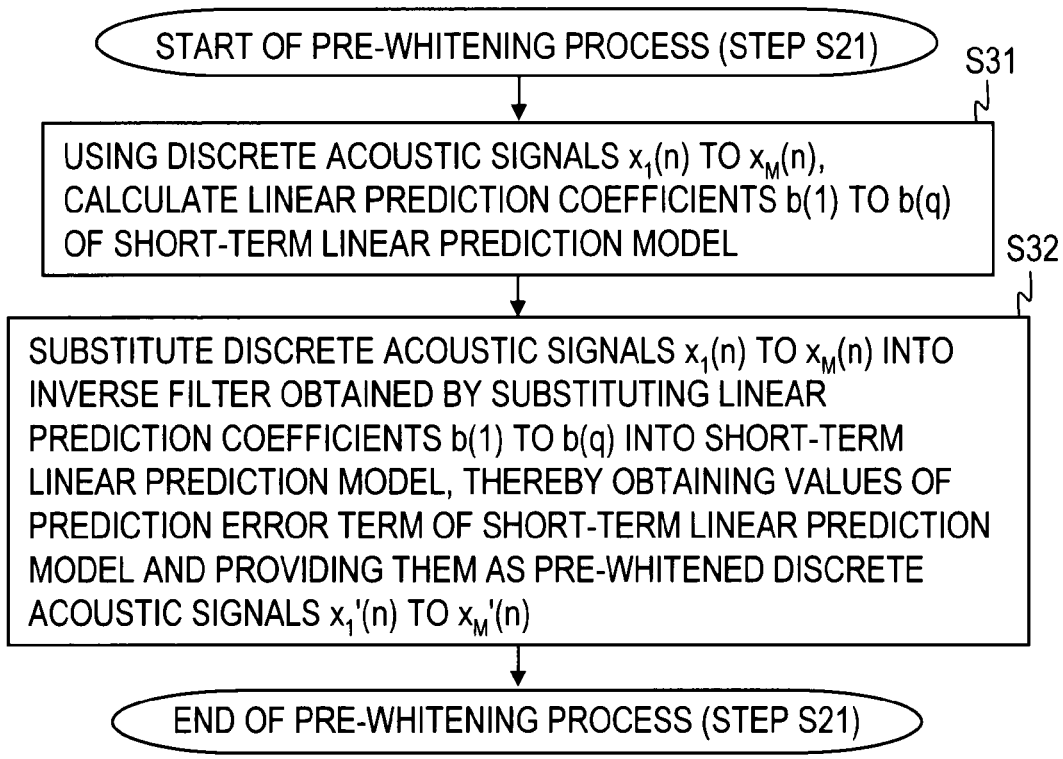
FIG. 6B is a flow chart for explaining details of step S21 (pre-whitening process) in FIG. 6A.
Figure 7A:
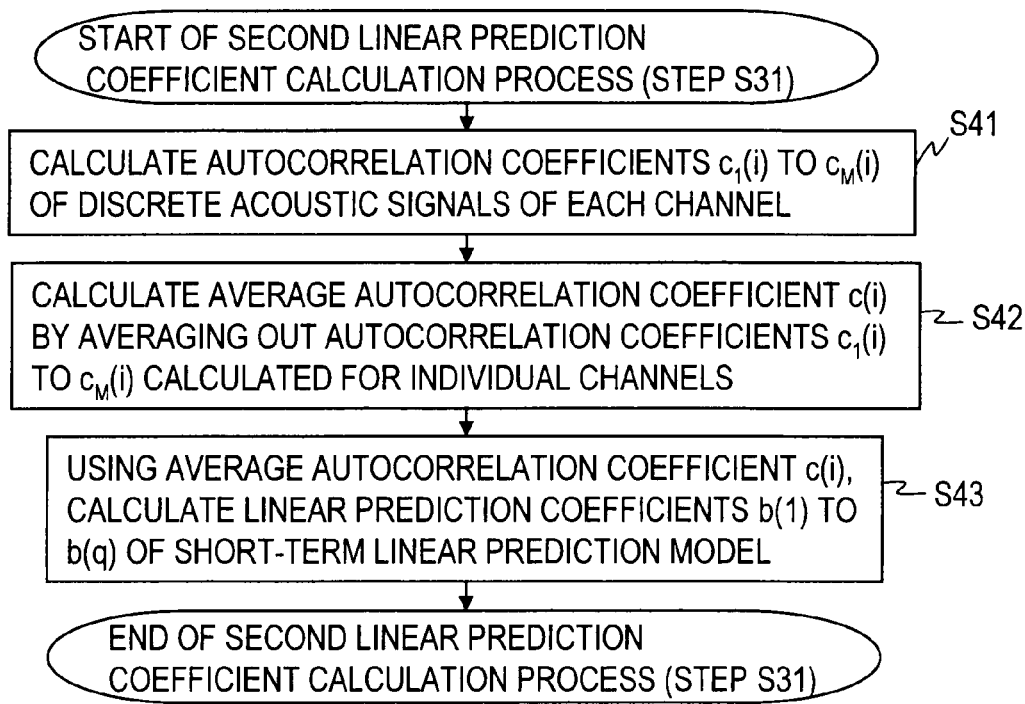
FIG. 7A is a flow chart for explaining details of step S31 (second linear prediction coefficient calculation process) in FIG. 6B.
Figure 7B:
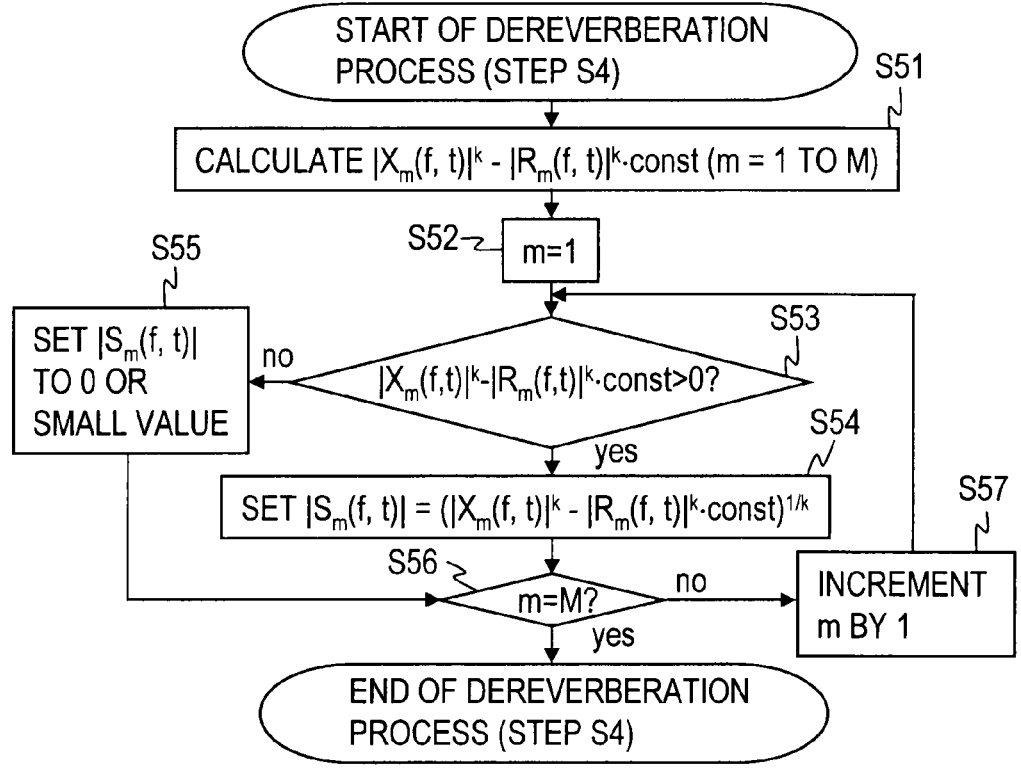
FIG. 7B is a flow chart for explaining details of step S4 in FIG. 4.

FIGS. 4 and 5 are flow charts for explaining the overall dereverberation processing of the first embodiment. FIG. 6A is a flow chart for explaining details of step S1 (model application process) in FIG. 4, and FIG. 6B is a flow chart for explaining details of step S21 (pre-whitening process) in FIG. 6A. FIG. 7A is a flow chart for explaining details of step S31 (second linear prediction coefficient calculation process) in FIG. 6B, and FIG. 7B is a flow chart for explaining details of step S4 in FIG. 4. The dereverberation processing of the first embodiment will be described with reference to those figures.

[Pre-Processing]

First, acoustic signals of M channels w (w=1, . . . , M) observed separately by M sensors (M≧2) are sampled at a predetermined sampling frequency, and discrete acoustic signals $x_1(n)$ to $x_M(n)$ are generated in the individual channels. Here, n represents discrete time. The generated discrete acoustic signals $x_1(n)$ to $x_M(n)$ of the channels are stored in the memory 10*a*. In the first embodiment, the discrete acoustic signals $x_1(n)$ to $x_M(n)$ of the entire time period to be dereverberated are obtained in advance and stored in the memory 10*a*, and the following operations are executed in each analysis frame. However, the following operations may be executed while the discrete acoustic signals $x_1(n)$ to $x_M(n)$ are obtained in real time.

Information indicating whether the information finally output by the dereverberation apparatus 10 is just the amplitude spectrum of the dereverberation signal or the acoustic signal also containing the phase component is stored in the memory 10*j*. In the first embodiment, a flag (data) δ is stored in the memory 10*j*. If the output information is just the amplitude spectrum of the direct sound, δ is set to 1. If the acoustic signal also containing the phase component is output, δ is set to 0. The final output information of the dereverberation apparatus 10 can be just the amplitude spectrum of the dereverberation signal, for instance, when the final output information of the dereverberation apparatus 10 is used as information input to a speech recognition system.

The dereverberation processing of the first embodiment will be described below. The processing in a single analysis frame will be described below, but in reality the same processing is performed for multiple analysis frames. The analysis frame means a period of time containing multiple discrete times n.

[Model Application Process (Step S1)]

In a model application process, the model application unit 10*b* calculates the linear prediction coefficients $\alpha_{w,1}(p)$ to $\alpha_{w,M}(p)$ of the multi-step linear prediction model given by Expression (13) by using the discrete acoustic signals $x_1(n)$ to $x_M(n)$ of M channels of a single analysis frame read from the memory 10*a* (step S1). Details of the processing will be described below in a hierarchical manner.

[Details of Model Application Process (Step 1) (FIG. 6A)]

As shown in FIG. 6A, in the model application process, the pre-whitening unit 100 (FIG. 2A) suppresses the autocorrelation components in the short-term period contained in the input discrete acoustic signals $x_1(n)$ to $x_M(n)$ to generate and output pre-whitened discrete acoustic signals $x_1'(n)$ to $x_M'(n)$ (pre-whitening process, step S21). In other words, pre-whitened discrete acoustic signals $x_1'(n)$ to $x_M'(n)$ are generated from the discrete acoustic signals $x_1(n)$ to $x_M(n)$ of discrete time n, by suppressing an autocorrelation component having autocorrelation with each discrete acoustic signal in a short-term period immediately preceding discrete time n.

As has been described above, the multi-step linear prediction model agrees well with the discrete acoustic signal in which short-term autocorrelation (autocorrelation component in the short-term period) depending on d(z) is suppressed. Accordingly, in terms of accurate estimation of late reverberation, it is preferable to suppress the short-term autocorrelation from the discrete acoustic signals $x_1(n)$ to $x_M(n)$.

Then, the pre-whitened discrete acoustic signals $x_1'(n)$ to $x_M'(n)$ are input to the first linear prediction coefficient calculator 200 (FIG. 2A), and the first linear prediction coefficient calculator 200 calculates linear prediction coefficients $\alpha_{w,1}(p)$ to $\alpha_{w,M}(p)$ of the multi-step linear prediction model given by Expression (13) by using the pre-whitened discrete acoustic signals $x_1'(n)$ to $x_M'(n)$ and outputs them (first linear prediction coefficient calculation process, step S22). For example, the delay D in Expression (13) is set to 30 ms (equivalent to 360 taps at a sampling frequency of 12,000 Hz), and N is set to around 3000. Methods for calculating $\alpha_{w,1}(p)$ to $\alpha_{w,M}(p)$ by using $x_1'(n)$ to $x_M'(n)$ include the correlation method and the covariance method. This processing can also be performed by using MATLAB (registered trademark) or the like.

[Details of Pre-Whitening Process (Step S21) (FIG. 6B)]

Details of the pre-whitening process (step S21) will be described next. In the first embodiment, pre-whitening is performed by linear prediction, for instance. As shown in FIG. 6B, the second linear prediction coefficient calculator 110 calculates linear prediction coefficients b(1) to b(q) of a short-term linear prediction model by using the input discrete acoustic signals $x_1(n)$ to $x_M(n)$, and outputs the coefficients (second linear prediction coefficient calculation process, step S31). The short-term linear prediction model means a linear prediction model expressing the discrete acoustic signal of channel w at discrete time n immediately after short-term periods, by the sum of linear prediction term linearly combining the discrete acoustic signals of channel w in the short term periods and a prediction error term. The "short-term period" here is shorter than the "long-term period" indicated in the definition of the multi-step linear prediction model. In the first embodiment, the short-term linear prediction model indicated below is used.

$$x_m(n) = \sum_{i=1}^{q} b(i) \cdot x_m(n-i) + x'_m(n) \tag{33}$$

In Expression (33), the term $x_m'(n)$ corresponds to the prediction error term, and the other terms on the right side are the linear prediction term. In addition, b(i) means the i-th linear prediction coefficient of the linear prediction term. The short-term period in Expression (33) can be specified appropriately according to the sequence length and power of the short-term correlation components of the discrete acoustic signals $x_1(n)$ to $x_M(n)$. For example, the short-term period can be set to around 30 ms (q=360 at a sampling frequency of 12,000 Hz). In this case, the direct sound component and the initial reflected sound component having autocorrelation within a short-term period of 30 ms can be suppressed in step S32.

$$x'_m(n) = x_m(n) - \sum_{i=1}^{q} b(i) \cdot x_m(n-i) \tag{34}$$

The values of the prediction error terms of the short-term linear prediction model are calculated and output as prewhitened discrete acoustic signals $x_1'(n)$ to $x_M'(n)$ (inverse filtering process, step S32).

[Details of Second Linear Prediction Coefficient Calculation Process (Step S31) (FIG. 7A)]

Details of the calculation process of the second linear prediction coefficient (step S31) will be described next. In the first embodiment, calculation of the second linear prediction coefficient is executed by using the correlation method. However, the covariance method and any other known linear prediction coefficient calculation method may be used to execute the second linear prediction coefficient calculation.

As shown in FIG. 7A, the autocorrelation coefficient calculator 111 (FIG. 2A) uses the input discrete acoustic signals $x_1(n)$ to $x_M(n)$ to calculate the autocorrelation coefficients $c_1(i)$ to $c_M(i)$ of the discrete acoustic signals $x_1(n)$ to $x_M(n)$ for each channel and outputs the coefficients (autocorrelation coefficient calculation process, step S41). To be more specific, the autocorrelation coefficient calculator 111 calculates the autocorrelation coefficients $c_1(i)$ to $c_M(i)$ in accordance with Expression (35) given below and outputs them. In the expression, T is a natural number greater than q (Expressions (33) and (34)) and smaller than the number of samples included in a single analysis frame. The following calculation is performed, for instance, after the discrete acoustic signals $x_1(n)$ to $x_M(n)$ are multiplied by a window (Hamming window or the like) having a finite length which becomes 0 in the ranges n<0 and n≧T. In addition, i=0, 1, . . . q.

$$c_m(i) = \sum_{n=0}^{T-1-i} x_m(n) \cdot x_m(n+i) \tag{35}$$

Next, the autocorrelation coefficients $c_1(i)$ to $c_M(i)$ of the channels are input to the autocorrelation coefficient averaging unit 112 (FIG. 2A). The autocorrelation coefficient averaging unit 112 obtains an average autocorrelation coefficient c(i) by averaging out the autocorrelation coefficients $c_1(i)$ to $c_M(i)$ of the channels and outputs it (autocorrelation coefficient averaging process, step S42). The average autocorrelation coefficient c(i) is calculated, for example, according to Expression (36) below.

$$c(i) = \frac{1}{M} \sum_{m=1}^{M} c_m(i) \tag{36}$$

The average autocorrelation coefficient c(i) obtained as described above is input to the equation calculator 113. By using the average autocorrelation coefficient c(i), the equation calculator 113 solves the Yule-Walker equation (normal-equation) in a way described below, thereby calculating the linear prediction coefficients b(1) to b(q) of the short-term linear prediction model and outputting them (equation calculation process, step S43).

$$\begin{pmatrix} b(1) \\ b(2) \\ \vdots \\ b(q) \end{pmatrix} = \begin{pmatrix} c(0) & c(1) & \cdots & c(q-1) \\ c(1) & c(0) & & \\ \vdots & & \ddots & \\ & & & c(1) \\ c(q-1) & \cdots & c(1) & c(0) \end{pmatrix}^{-1} \begin{pmatrix} c(1) \\ c(2) \\ \vdots \\ c(q) \end{pmatrix} \tag{37}$$

Because the linear prediction coefficients b(1) to b(q) are calculated by using the average autocorrelation coefficient c(i) obtained by averaging the autocorrelation coefficients $c_1(i)$ to $c_M(i)$ generated for the individual channels, as described above, the accuracy of calculation of the linear prediction coefficients b(1) to b(q) is improved compared with when autocorrelation coefficients generated for one channel are used. Accordingly, the short-term autocorrelation depending on d(z) provided for the discrete acoustic signals $x_1(n)$ to $x_M(n)$ can be suppressed more effectively. This will improve the accuracy of dereverberation, as has been described earlier. (End of detailed explanation of the model application process (step S1))

[Late Reverberation Prediction Process (Step S2)]

After the model application process (step S1), the discrete acoustic signals $x_1(n)$ to $x_M(n)$ read from the memory 10a and the linear prediction coefficients $\alpha_{w,1}(p)$ to $\alpha_{w,M}(p)$ calculated in the model application process (step S1) are input to the late reverberation predictor 10c. The late reverberation predictor 10c substitutes the linear prediction coefficients $\alpha_{w,1}(p)$ to $\alpha_{w,M}(p)$ and the discrete acoustic signals $x_1(n)$ to $x_M(n)$ into the linear prediction term of the multi-step linear prediction model to calculate each linear prediction value and outputs it as each of predicted late reverberations $r_w(n)$ (w= 1, . . . , M) (step S2). Because the multi-step linear prediction model of Expression (13) is used in the first embodiment, the late reverberation predictor 10c calculates each of the predicted late reverberations $r_w(n)$ according to Expression (38) below and outputs it.

$$r_w(n) = \sum_{m=1}^{M} \sum_{p=1}^{[N/M]} \alpha_{w,m}(p) \cdot x_m(n - p - D) \tag{38}$$

[Frequency Domain Conversion Process (Step S3)]

The discrete acoustic signals $x_1(n)$ to $x_M(n)$ read from memory 10a and the predicted late reverberations $r_1(n)$ to $r_M(n)$ calculated in the late reverberation prediction process (step S2) are input to the frequency domain converter 10d. The frequency domain converter 10d converts the input discrete acoustic signals $x_1(n)$ to $x_M(n)$ to discrete acoustic signals $X_1(f, t)$ to $X_M(f, t)$ in the frequency domain and the predicted late reverberations $r_1(n)$ to $r_M(n)$ to predicted late reverberations $R_1(f, t)$ to $R_M(f, t)$ in the frequency domain (step S3). In the first embodiment, a window function having a finite length, such as a Hanning window having a window length of 30 ms, is used, and conversion to the frequency domain is performed by a short-term Fourier transform (discrete Fourier transform, DFT) or the like. Through this processing, the frequency domain converter 10d extracts the amplitude spectra $|X_1(f, t)|$ to $|X_M(f, t)|$ and phase information $\arg[X_1(f, t)]$ to $\arg[X_M(f, t)]$ of the discrete acoustic signals $X_1(f, t)$ to $X_M(f, t)$ in the frequency domain and the amplitude spectra $|R_1(f, t)|$ to $|R_M(f, t)|$ and phase information $\arg[R_1(f, t)]$ to $\arg[R_M(f, t)]$ of the predicted late reverberations $R_1(f, t)$ to $R_M(f, t)$ in the frequency domain, and outputs them. Here, arg[●] represents the argument of ●.

[Dereverberation Process (Step S4)]

Next, the amplitude spectra $|X_1(f, t)|$ to $|X_M(f, t)|$ of the discrete acoustic signals in the frequency domain and the amplitude spectra $|R_1(f, t)|$ to $|R_M(f, t)|$ of the predicted late reverberations in the frequency domain are input to the late reverberation eliminator 10e. The late reverberation eliminator 10e calculates the relative value for each sensor between the amplitude spectra $|X_1(f, t)|$ to $|X_M(f, t)|$ of the discrete acoustic signals in the frequency domain and the amplitude spectra $|R_1(f, t)|$ to $|R_M(f, t)|$ of the predicted late reverberations in the frequency domain, and outputs the relative values as the predicted amplitude spectra $|S_1(f, t)|$ to $|S_M(f, t)|$ of signal dereverberated signals (step S4). Details of the processing will be given below.

[Details of Dereverberation Process (Step S4) (FIG. 7B)]

As shown in FIG. 7B, by using the amplitude spectra $|X_1(f, t)|$ to $|X_M(f, t)|$ and the amplitude spectra $|R_1(f, t)|$ to $|R_M(f, t)|$ of the predicted late reverberations in the frequency domain, the late reverberation eliminator 10e performs the following calculation on each m (m=1, . . . , M).

$$|X_m(f,t)|^k - |R_m(f,t)|^k \cdot \text{const} \quad (39)$$

The results are stored in the memory 10j (step S51). Here, const represents a constant, and k represents a natural number. In the first embodiment, const=1.0 and k=2.

The controller 10k next assigns 1 to the variable m and stores this variable m in the memory 10j (step S52). The controller 10k then judges whether the results of calculation of Expression (39) stored in the memory 10j satisfy the following relationship (step S53).

$$|X_m(f,t)|^k - |R_m(f,t)|^k \cdot \text{const} > 0 \quad (40)$$

If it is judged that the relationship of Expression (40) is satisfied, the controller 10k gives an instruction to the late reverberation eliminator 10e to calculate $|S_m(f, t)|$ corresponding to the variable m, as given below, and outputs it (step S54).

$$|S_m(f,t)| = (|X_m(f,t)|^k - |R_m(f,t)|^k \cdot \text{const})^{1/k} \quad (41)$$

If it is judged that the relationship of Expression (40) is not satisfied, the controller 10k gives an instruction to the late reverberation eliminator 10e to output 0 or a sufficiently small value as $|S_m(f, t)|$ corresponding to the variable m (step S55). The processing of steps S53 to S55 corresponds to half-wave rectification. The half-wave rectification may be performed by a method other than that shown in steps S53 to S55.

After the half-wave rectification, the controller 10k refers to the memory 10j to judge whether the variable m equals M (step S56). If the variable m does not equal M, the controller 10k stores m+1 as a new value of the variable m in the memory 10j (step S57) and returns to the processing in step S53. If the variable m equals M, the controller 10k terminates the processing of step S4. (End of detailed explanation of the dereverberation process (step S4))

[Flag Assessment Process (Steps S5 and S6)]

After step S4, the controller 10k reads the flag 6 stored in the memory 10j to check whether the flag δ indicates that just the amplitude spectra are to be output, that is, whether δ=1 (step S5). If δ is 1, the controller 10k outputs the predicted amplitude spectra $|S_1(f, t)|$ to $|S_M(f, t)|$ of the dereverberated signals generated by the late reverberation eliminator 10e in the dereverberation process (step S4) as the final output information of the dereverberation apparatus 10 (step S6) and ends the processing of the analysis frame. The output predicted amplitude spectra $|S_1(f, t)|$ to $|S_M(f, t)|$ are passed to an application such as a speech recognition system, for instance, following the dereverberation apparatus 10, and are converted to feature quantities.

If δ is 0, the controller 10k executes the processing of step S7 and subsequent steps, which will be described below.

[Complex Spectrum Generation Process (Step S7)]

In the complex spectrum generation process, the predicted amplitude spectra $|S_1(f, t)|$ to $|S_M(f, t)|$ of the dereverberated signals, output from the late reverberation eliminator 10e (step S4) and the phase information $\arg[X_1(f, t)]$ to $\arg[X_M(f, t)]$ of the discrete acoustic signals in the frequency domain, output from the frequency domain converter 10d (step S3), are input to the complex spectrum generator 10f. Using this information, the complex spectrum generator 10f calculates predicted complex spectra $S_1(f, t)$ to $S_M(f, t)$ of the dereverberated signals in accordance with Expression (42) given below and outputs them (step S7). Here, exp(●) is an exponential function having Napier's Number as its base, and j is the imaginary unit.

$$S_m(f,t) = |S_m(f,t)| \cdot \exp(j \cdot \arg[X_m(f,t)]) \quad (42)$$

[Time Domain Conversion Process (Step S8)]

After step S7, the predicted complex spectra $S_1(f, t)$ to $S_M(f, t)$ of the dereverberated signals are input to the time domain converter 10g. The time domain converter 10g calculates the estimates of dereverberated signals $s_1(n)$ to $s_M(n)$ obtained by converting the predicted complex spectra $S_1(f, t)$ to $S_M(f, t)$ of the dereverberated signals into the time domain signals and outputs them (step S8). Conversion to the time domain is performed by an inverse Fourier transform, for instance.

[Delay Amount Calculation Process (Step S9)]

After step S8, the estimates of dereverberated signals $s_1(n)$ to $s_M(n)$ are input to the delay amount calculator 10h. The delay amount calculator 10h determines delay amounts $\tau_1$ to $\tau_M$ of the estimates of dereverberated signals for the individual channels such that the cross-correlation between the channels of the estimates of dereverberated signals $s_1(n)$ to $s_M(n)$ is maximized (step S9). An example is shown below.

[Example of Delay Amount Calculation Process (Step S9)]

The delay amount calculator 10h calculates function values of an inter-channel correlation function $A_m(\tau)$ as given by Expression (43) below, with respect to the input estimates of dereverberated signals $s_1(n)$ to $s_M(n)$ in the analysis frame. Here, E{●} is an average operator.

$$A_m(\tau) = E\{s_1(n) \cdot s_m(n+\tau)\} \quad (43)$$

The delay amount calculator 10h next calculates τ that local maximizes (maximizes, for instance) the inter-channel correlation function $A_m(\tau)$ for each m as $\tau_m$. If τ that maximizes the inter-channel correlation function $A_m(\tau)$ is obtained as $\tau_m$, the delay amount calculator 10h calculates and outputs the following:

$$\tau_m = \max\{A_m(\tau)\} \quad (44)$$

Here, max {●} means the detected maximum value of ●, and $\tau_m$ is a delay amount of the estimate of dereververated signal of the channel m; the delay amount includes $\tau_m=0$. (End of explanation of an example of the delay amount calculation process (step S9))

[Delay Adjustment Process (Steps S10 and S11)]

After step S9, the delay amounts $\tau_1$ to $\tau_M$ and the estimates of dereverberated signals $s_1(n)$ to $s_M(n)$ are input to the delay adjuster 10i (FIG. 1). The delay unit 10ia (FIG. 2B) of the delay adjuster 10i calculates $s_1(n+\tau_1)$ to $s_M(n+\tau_M)$ by delaying the estimates of dereverberated signals $s_1(n)$ to $s_M(n)$ for the individual channels by the corresponding delay amounts $\tau_1$ to $\tau_M$, and outputs them (step S10).

Then, $s_1(n+\tau_1)$ to $s_M(n+\tau_M)$ are input to the delay corrector 10ib (FIG. 2B), and the delay corrector 10ib calculates the sum of $s_1(n+\tau_1)$ to $s_M(n+\tau_M)$ according to Expression (45) below (step S11), outputs the sum as the corrected dereverberated signal s(n) (step S12), and terminates the processing of the analysis frame. If an error component included in the late reverberation signal of each channel is assumed to be statistically independent, the error can be suppressed by this operation.

$$s(n) = \sum_{m=1}^{M} s_m(n + \tau_m) \quad (45)$$

Second Embodiment

A second embodiment of the present invention will be described next. The second embodiment is a modification of the first embodiment.

In the late reverberation prediction process (step 2) of the first embodiment, each linear prediction value obtained by substituting the linear prediction coefficients $\alpha_{w,1}(p)$ to $\alpha_{w,M}(p)$ and the non-pre-whitened discrete acoustic signals $x_1(n)$ to $x_M(n)$ into the linear prediction term of the multi-step linear prediction model is calculated as each of the predicted late reverberations $r_w(n)$ (w=1 to M). In the dereverberation process (step S4), the relative values of the individual sensors, between the amplitude spectra $|X_1(F, t)|$ to $|X_M(f, t)|$ of the non-pre-whitened discrete acoustic signals in the frequency domain and the amplitude spectra $|R_1(f, t)|$ to $|R_M(f, t)|$ of the predicted late reverberations in the frequency domain, are obtained, and the relative values are provided as the predicted amplitude spectra $|S_1(f, t)|$ to $|S_M(f, t)|$ of the dereverberated signals.

In contrast, in the late reverberation prediction process of the second embodiment, each linear prediction value obtained by substituting the linear prediction coefficients $\alpha_{w,1}(p)$ to $\alpha_{w,M}(p)$ and the pre-whitened discrete acoustic signals $x_1'(n)$ to $x_M'(n)$ into the linear prediction term of the multi-step linear prediction model is calculated as each of the predicted late reverberations $r_w(n)$ (w=1 to M). In the dereverberation process of the second embodiment, the relative values of the individual sensors, between the amplitude spectra $|X_1'(f, t)|$ to $|X_M'(f, t)|$ of the pre-whitened discrete acoustic signals in the frequency domain and the amplitude spectra $|R_1(f, t)|$ to $|R_M(f, t)|$ of the predicted late reverberations in the frequency domain, are obtained, and the relative values are provided as the predicted amplitude spectra $|S_1(F, t)|$ to $|S_M(f, t)|$ of the dereverberated signals. In these predicted amplitude spectra $|S_1(f, t)|$ to $|S_M(f, t)|$ of the dereverberated signals, the short-term correlation components have been suppressed (pre-whitened). Accordingly, these predicted amplitude spectra $|S_1(f, t)|$ to $|S_M(f, t)|$ are suitable for input to systems that require pre-whitened data, such as a speech recognition system. This eliminates the need for performing pre-whitening as pre-processing in those systems.

The difference between the first embodiment and the second embodiment is as described above. In the following, mainly the difference from the first embodiment will be described, and a description of items common to both embodiments will be omitted.

<Hardware Configuration>

The hardware configuration is the same as that described in the first embodiment.

<Collaboration Between Hardware and Program>

Figure 9:
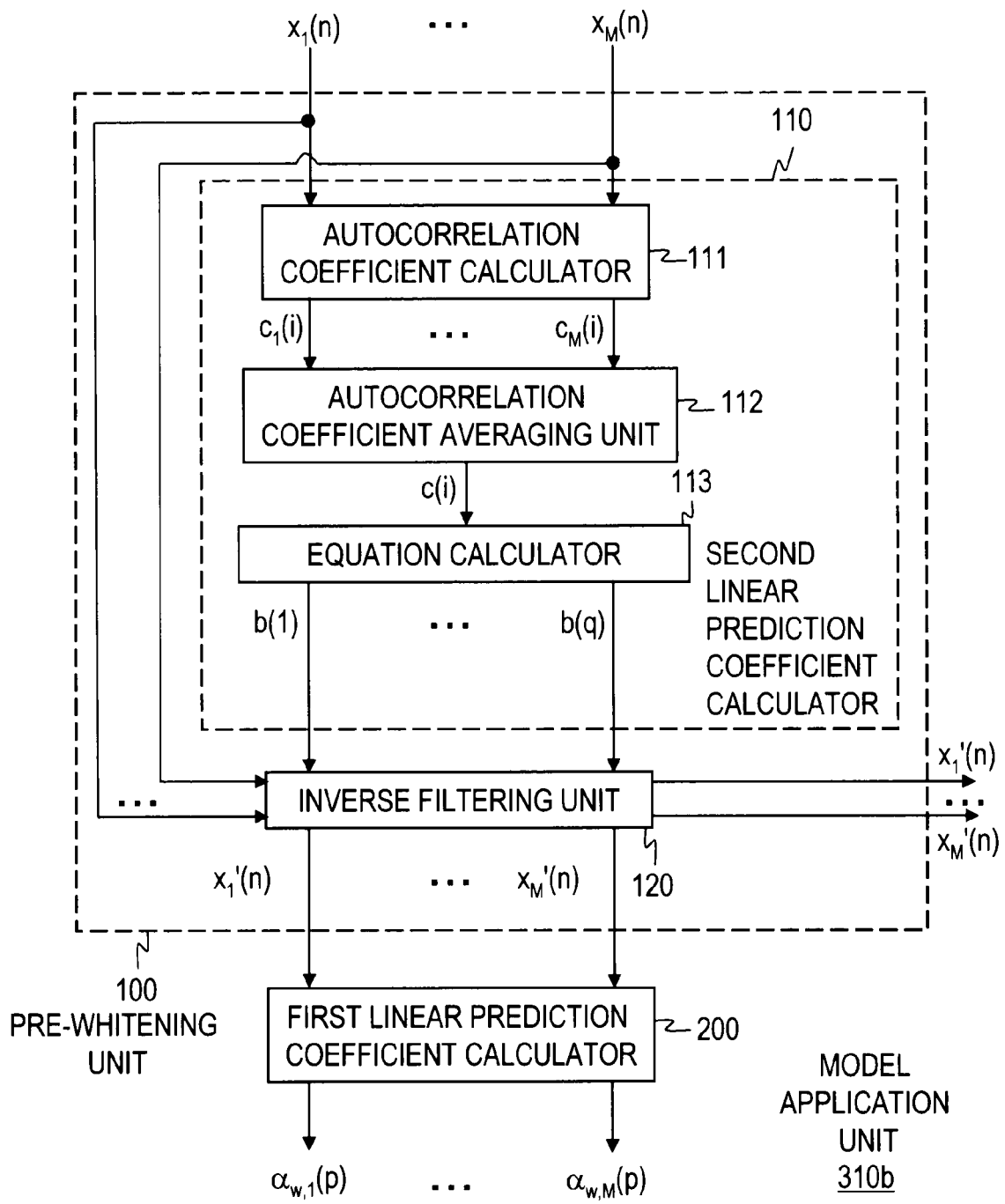
FIG. 9 is a block diagram showing example details of the functional configuration of a model application unit.

A dereverberation apparatus 310 of the second embodiment is also implemented when a computer reads and executes a predetermined program. FIG. 8 is a block diagram showing a functional configuration of the dereverberation apparatus 310 of the second embodiment. FIG. 9 is a block diagram showing details of the functional configuration of a model application unit 310b. In FIGS. 8 and 9, components identical to those in the first embodiment are denoted by the same reference symbols as used in the first embodiment.

As shown in FIG. 8, the dereverberation apparatus 310 includes a memory 10a, the model application unit 310b, a late reverberation predictor 310c, a frequency domain converter 310d, a late reverberation eliminator 310e, a complex spectrum generator 310f, a time domain converter 10g, a delay amount calculator 10h, a delay adjuster 10i, a memory 10j, and a controller 10k.

As shown in FIG. 9, the model application unit 310b includes a pre-whitening unit 100 and a first linear prediction coefficient calculator 200, and the pre-whitening unit 100 includes a second linear prediction coefficient calculator 110 and an inverse filtering unit 120. The second linear prediction coefficient calculator 110 includes an autocorrelation coefficient calculator 111, an autocorrelation coefficient averaging unit 112, and an equation calculator 113. The model application unit 310b differs from the model application unit 10b of the first embodiment in that the inverse filtering unit 120 of the model application unit 310b transfers the pre-whitened discrete acoustic signals $x_1'(n)$ to $x_M'(n)$ also to the late reverberation predictor 310c and the frequency domain converter 310d.

<Dereverberation Processing>

Dereverberation processing of the second embodiment will be described next.

Figure 10:
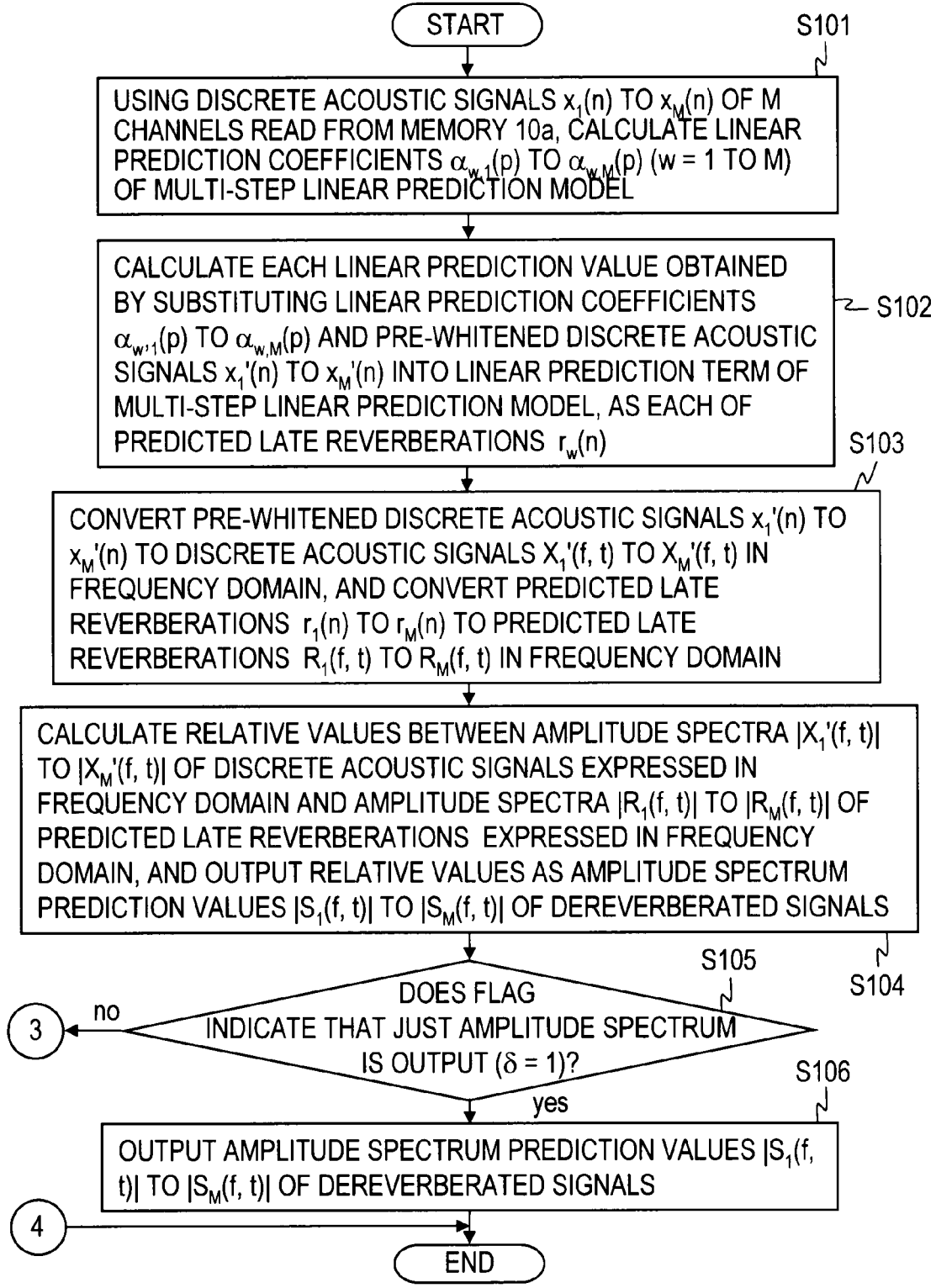
FIG. 10 is a flow chart for explaining the overall dereverberation processing of the second embodiment.
Figure 11:
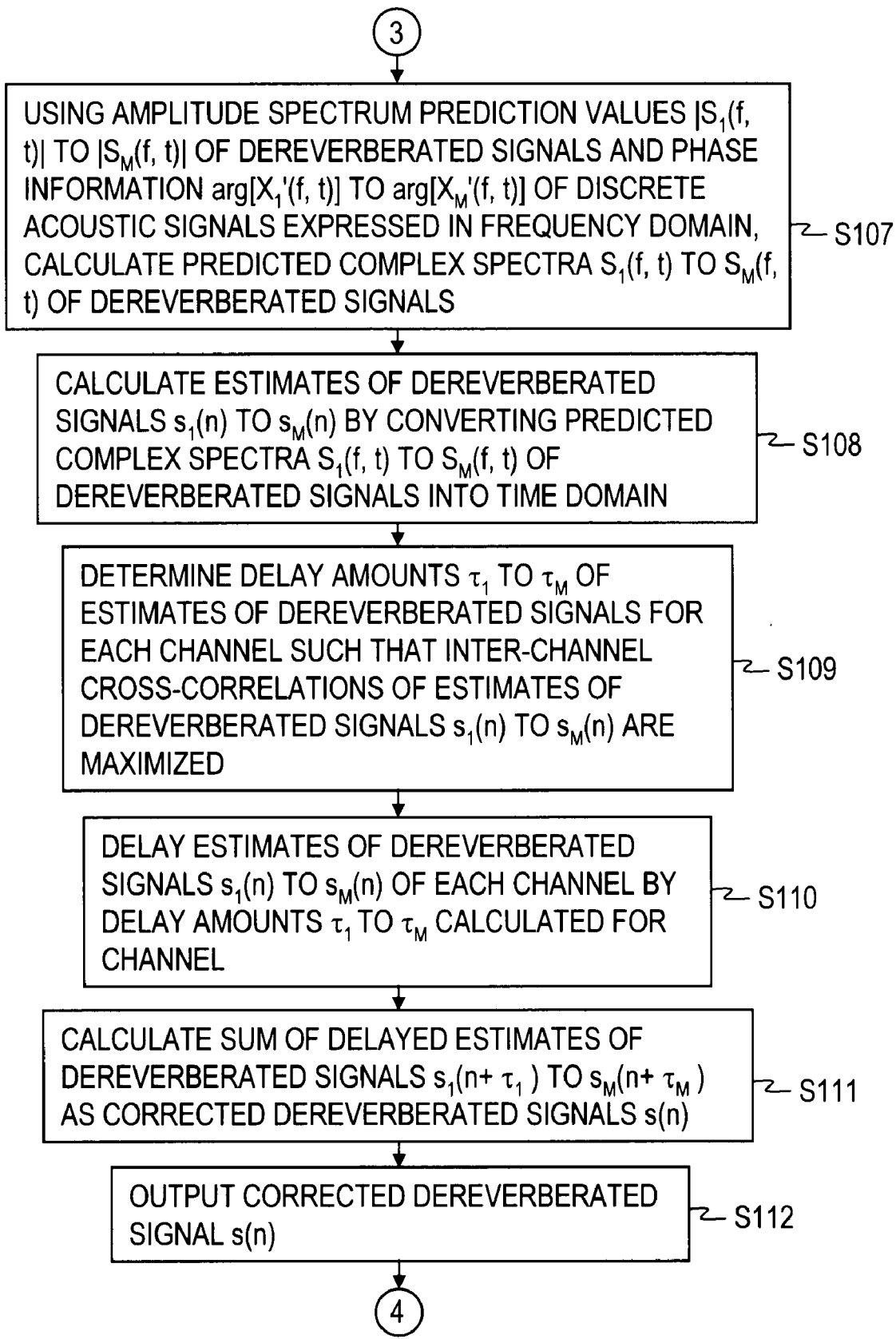
FIG. 11 is a flow chart for explaining the overall dereverberation processing of the second embodiment.

FIGS. 10 and 11 are flow charts for explaining the overall dereverberation processing of the second embodiment. With reference to those figures, the dereverberation processing of the second embodiment will be described below.

[Pre-Processing]

Pre-processing is the same as that in the first embodiment.

[Model Application Process (Step S101)]

In a model application process, the model application unit 310b calculates linear prediction coefficients $\alpha_{w,1}(p)$ to $\alpha_{w,M}(p)$ of the multi-step linear prediction model given by Expression (13), by using the discrete acoustic signals $x_1(n)$ to $x_M(n)$ of M channels in a single analysis frame read from the memory 10a (step S101). This process is the same as the model application process (step S1) of the first embodiment and includes a process of pre-whitening the discrete acoustic signals $x_1(n)$ to $x_M(n)$.

[Late Reverberation Prediction Process (Step S102)]

After the model application process (step S101), the discrete acoustic signals $x_1'(n)$ to $x_M'(n)$ pre-whitened in the model application process (step S101) and the linear prediction coefficients $\alpha_{w,1}(p)$ to $\alpha_{w,M}(p)$ obtained in the model application process (step S101) are input to the late reverberation predictor 310c.

The late reverberation predictor 310c calculates each linear prediction value by substituting the linear prediction coefficients $\alpha_{w,1}(p)$ to $\alpha_{w,M}(p)$ and the pre-whitened discrete acoustic signals $x_1'(n)$ to $x_M'(n)$ into the linear prediction term of the multi-step linear prediction model, and outputs it as each of predicted late reverberations $r_w(n)$ (w=1 to M) (step S102). If the multi-step linear prediction model given by Expression (13) is used, the late reverberation predictor 310c calculates each of the predicted late reverberations $r_w(n)$ as given by Expression (46) below and outputs them.

$$r_w(n) = \sum_{m=1}^{M} \sum_{p=1}^{[N/M]} \alpha_{w,m}(p) \cdot x'_m(n-p-D) \qquad (46)$$

[Frequency Domain Conversion Process (Step S103)]

Then, the discrete acoustic signals $x_1'(n)$ to $x_M'(n)$ pre-whitened in the model application process (step S101) and the predicted late reverberations $r_1(n)$ to $r_M(n)$ obtained in the late reverberation prediction process (step S102) are input to the frequency domain converter 310d. The frequency domain converter 310d converts the input pre-whitened discrete acoustic signals $x_1'(n)$ to $x_M'(n)$ to discrete acoustic signals $X_1'(f, t)$ to $X_M'(f, t)$ in the frequency domain and converts the predicted late reverberations $r_1(n)$ to $r_M(n)$ to predicted late reverberations $R_1(f, t)$ to $R_M(f, t)$ in the frequency domain (step S103). Through these conversions, the frequency domain converter 310d extracts the amplitude spectra $|X_1'(f, t)|$ to $|X_M'(f, t)|$ and the phase information $\arg[X_1'(f, t)]$ to $\arg[X_M'(f, t)]$ of the discrete acoustic signals $X_1'(f, t)$ to $X_M'(f, t)$ in the frequency domain and the amplitude spectra $|R_1(f, t)|$ to $|R_M(f, t)|$ and the phase information $\arg[R_1(f, t)]$ to $\arg[R_M(f, t)]$ of the predicted late reverberations $R_1(f, t)$ to $R_M(f, t)$ in the frequency domain, and outputs them.

[Dereverberation Process (Step S104)]

Next, the amplitude spectra $|X_1'(f, t)|$ to $|X_M'(f, t)|$ of the discrete acoustic signals in the frequency domain and the amplitude spectra $|R_1(f, t)|$ to $|R_M(f, t)|$ of the predicted late reverberations in the frequency domain are input to the late reverberation eliminator 310e. The late reverberation eliminator 310e calculates the relative values of individual sensors, between the amplitude spectra $|X_1'(f, t)|$ to $|X_M'(f, t)|$ of the discrete acoustic signals in the frequency domain and the amplitude spectra $|R_1(f, t)|$ to $|R_M(f, t)|$ of the predicted late reverberations in the frequency domain, and outputs the relative values as predicted amplitude spectra $|S_1(f,t)|$ to $|S_M(f,t)|$ of the dereverberated signals (step S104).

[Flag Assessment Process (Steps S105 and S106)]

After step S104, the controller 10k reads a flag 6 stored in the memory 10j to check whether the flag 6 indicates that just the amplitude spectra is output, that is, whether δ=1 (step S105). If δ=1, the controller 10k outputs the predicted amplitude spectra $|S_1(f, t)|$ to $|S_M(f, t)|$ of the dereverberated signals, generated by the late reverberation eliminator 310e in the dereverberation process (step S104), as the final output information of the dereverberation apparatus 310 (step S106), and ends the processing of the analysis frame. If δ=0, the controller 10k executes the processing of step S107 and subsequent steps, which will be described below.

[Complex Spectrum Generation Process (Step S107)]

In a complex spectrum generation process, the predicted amplitude spectra $|S_1(f, t)|$ to $|S_M(f, t)|$ of the dereverberated signals, output from the late reverberation eliminator 310e (step S104), and the phase information $\arg[X_1'(f, t)]$ to $\arg[X_M'(f, t)]$ of the discrete acoustic signals in the frequency domain, output from the frequency domain converter 10d (step S3), are input to the complex spectrum generator 310f. Using these pieces of information, the complex spectrum generator 310f calculates predicted complex spectra $S_1(f, t)$ to $S_M(f, t)$ of the dereverberated signals in accordance with Expression (47) given below, and outputs them (step S107).

$$S_m(f,t) = |S_m(f,t)| \cdot \exp(j \cdot \arg[X_m'(f,t)]) \qquad (47)$$

[Time Domain Conversion Process (Step S108), Delay Amount Calculation Process (Step S109), Delay Adjustment Process (Steps S110 and S111)]

A time domain conversion process (step S108), a delay amount calculation process (step S109), and a delay adjustment process (steps S110 and S111) are the same as the time domain conversion process (step S8), the delay amount calculation process (step S9), and the delay adjustment process (steps S10 and S11) in the first embodiment.

Third Embodiment

A third embodiment of the present invention will be described next. The third embodiment is a modification of the first or second embodiment.

In the second linear prediction coefficient calculation process (step S31) of the first embodiment, the second linear prediction coefficient calculator 110 calculates the linear prediction coefficients $b(1)$ to $b(q)$ of the short-term linear prediction model, by using the average autocorrelation coefficient $c(i)$ obtained by averaging the autocorrelation coefficients $c_1(i)$ to $c_M(i)$ generated in the individual channels.

In a second linear prediction coefficient calculation process (step S31) of the third embodiment, a second linear prediction coefficient calculator 410 calculates the autocorrelation coefficients of discrete acoustic signals obtained by sampling, at multiple points in time, the acoustic signal observed by one sensor that is the closest to the source of the acoustic signal among the M sensors, and calculates the individual linear prediction coefficients of the short-term linear prediction model by using the autocorrelation coefficients.

The third embodiment differs from the first embodiment in the point described above. The configuration can be applied also to the second embodiment. Described below will be the configuration of the second linear prediction coefficient calculator 410 and the processing in the second linear prediction coefficient calculation process (step S31), which account for the difference from the first and second embodiments, and a description of items common to the third embodiment and the first and second embodiments will be omitted.

Figure 12A:
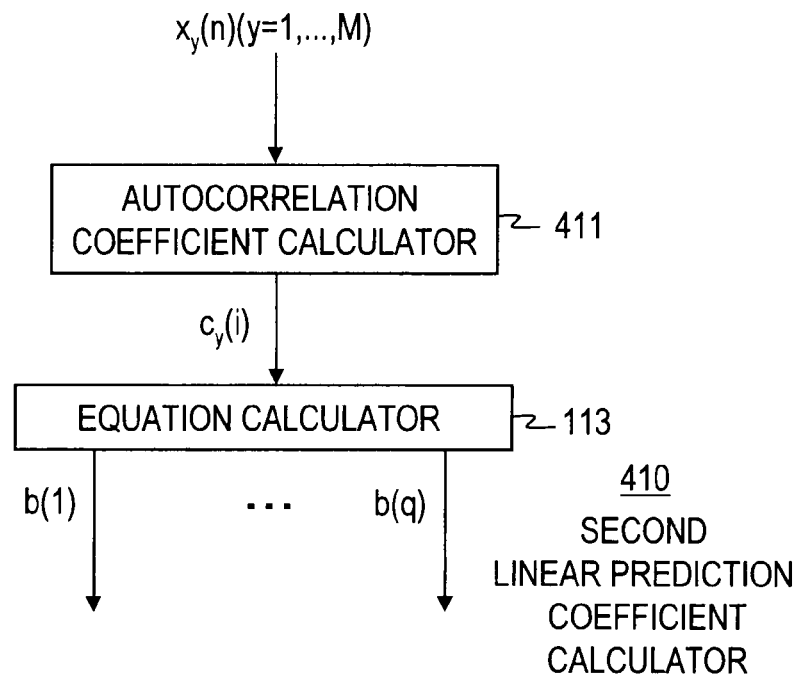
FIG. 12A is a block diagram showing the functional configuration of a second linear prediction coefficient calculator according to a third embodiment.
Figure 12B:
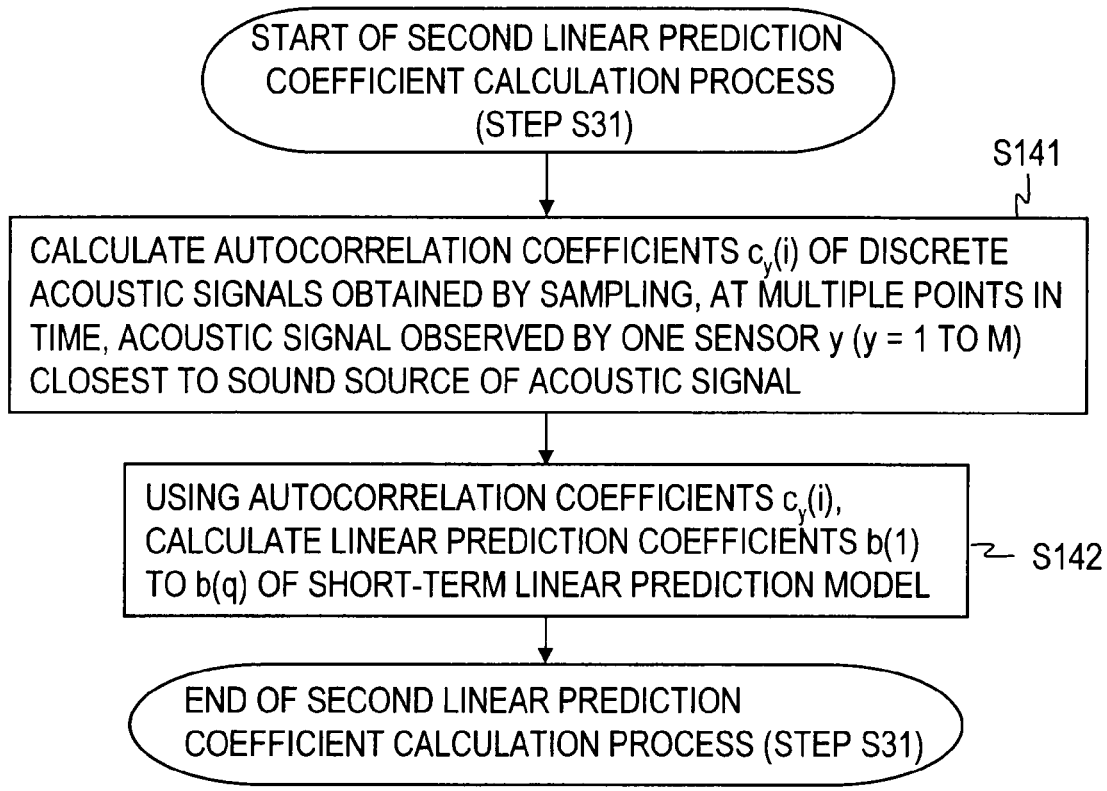
FIG. 12B is a flow chart for explaining a second linear prediction coefficient calculation process (step S31) of the third embodiment.

FIG. 12A is a block diagram showing the functional configuration of the second linear prediction coefficient calculator 410 of the third embodiment. In FIG. 12A, parts that are identical to those in the first embodiment are denoted by the same reference symbols as used in the first embodiment. FIG. 12B is a flow chart for explaining the second linear prediction coefficient calculation process (step S31) of the third embodiment.

As shown in FIG. 12A, the second linear prediction coefficient calculator 410 of the third embodiment includes an autocorrelation coefficient calculator 411 and an equation calculator 113. In the second linear prediction coefficient calculation process of the third embodiment, the autocorrelation coefficient calculator 411 (FIG. 12A) calculates the autocorrelation coefficients $c_y(i)$ ($i=0, 1, \ldots, q$) of discrete acoustic signals $x_y(n)$ obtained by sampling, at multiple points in time, the acoustic signal observed by one sensor y ($y=1, \ldots, M$) that is the closest to the source of the acoustic signal among the M sensors ($M \geq 2$), by using the input discrete acoustic signals $x_1(n)$ to $x_M(n)$ (step S141). Information about the sensory that is the closest to the source of the acoustic signal may be fixed information provided for the autocorrelation coefficient calculator 411 or may be varying information given to the autocorrelation coefficient calculator 411.

The autocorrelation coefficient $c(i)$ obtained as described above is input to the equation calculator 113. By using the autocorrelation coefficient $c(i)$, the equation calculator 113 solves the Yule-Walker equation (normal-equation), thereby calculating the linear prediction coefficients $b(1)$ to $b(q)$ of the short-term linear prediction model and outputting them (equation calculation process, step S142).

As described above, the autocorrelation coefficients of the acoustic signals corresponding to the sensor closest to the sound source of the acoustic signal are used to calculate the linear prediction coefficients $b(1)$ to $b(q)$ in the third embodiment. This improves the accuracy of calculation of the linear prediction coefficients $b(1)$ to $b(q)$, in comparison with the use of the autocorrelation coefficients of the acoustic signals corresponding to any other sensor, and the short-term autocorrelation depending on $d(z)$, provided for the discrete acoustic signals $x_1(n)$ to $x_M(n)$, can be suppressed more effectively. This will improve the accuracy of dereverberation, as described earlier.

Fourth Embodiment

A fourth embodiment of the present invention will be described next. The fourth embodiment is a modification of the first or second embodiment.

In the pre-whitening process (step S21) of the first embodiment, the discrete acoustic signals are pre-whitened by using the short-term linear prediction model.

In contrast, in a pre-whitening process (step S21) of the fourth embodiment, Cepstral Mean Subtraction (CMS) (refer to B. S. Atal, "Effectiveness of linear prediction characteristics of the speech wave for automatic speaker identification and verification," Journal of Acoustical Society of America 55(6), pp. 1304-1312, 1974, for instance) is used to pre-whiten the discrete acoustic signals.

The fourth embodiment differs from the first embodiment in the point described above. The configuration can be applied also to the second embodiment. The configuration of a pre-whitening unit 510 and the processing in the pre-whitening process (step S21), which account for the difference from the first and second embodiments, will be described below, and a description of items common to the fourth embodiment and the first and second embodiments will be omitted.

Figure 13:
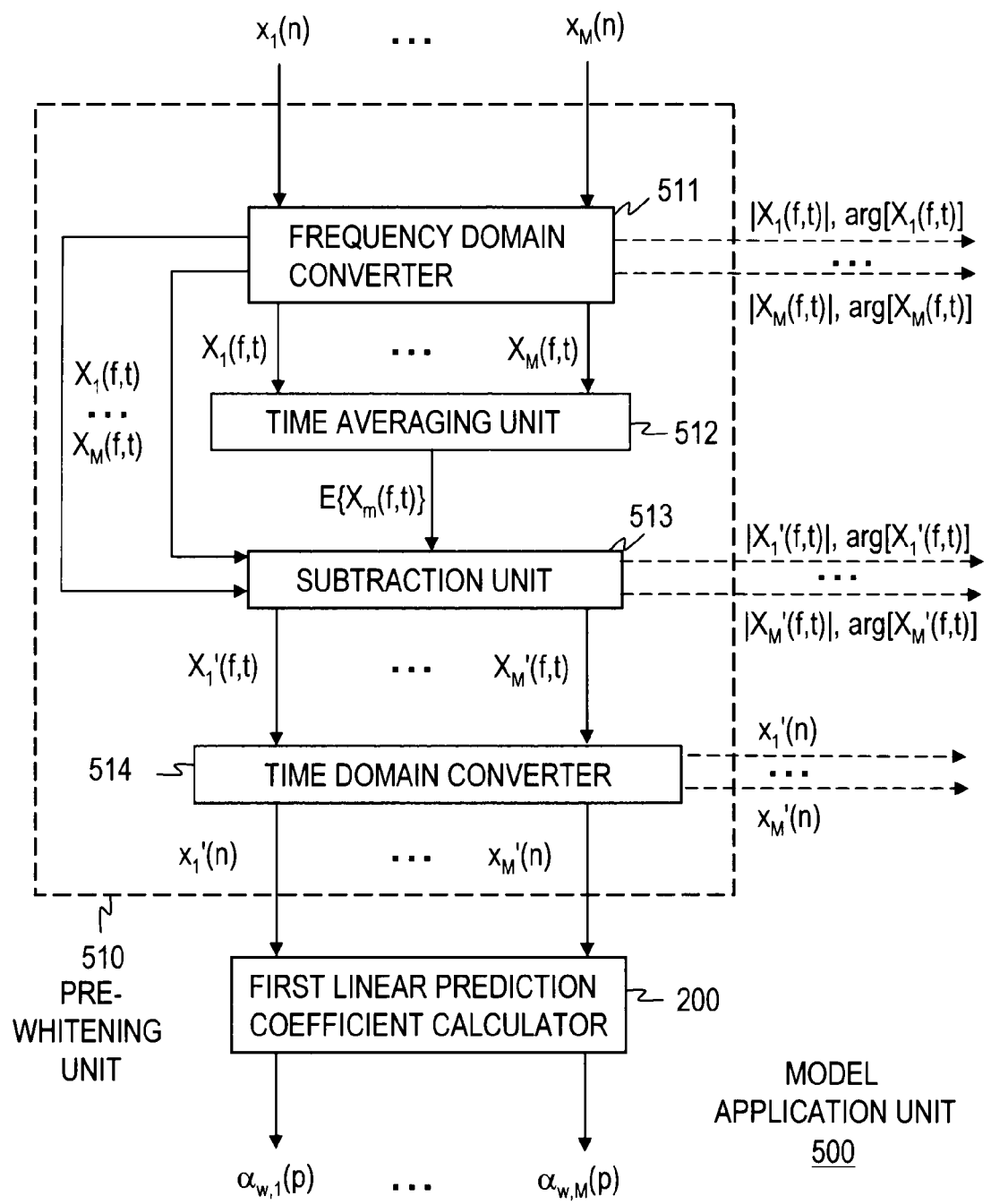
FIG. 13 is a block diagram showing the functional configuration of a model application unit according to a fourth embodiment.

FIG. 13 is a block diagram showing the functional configuration of a model application unit 500 of the fourth embodiment. In FIG. 13, parts that are identical to those in the first embodiment are denoted by the same reference symbols as used in the first embodiment.

As shown in FIG. 13, the model application unit 500 of the fourth embodiment includes the pre-whitening unit 510 and a first linear prediction coefficient calculator 200. The pre-whitening unit 510 includes a frequency domain converter 511, a time averaging unit 512, a subtraction unit 513, and a time domain converter 514.

Figure 14:
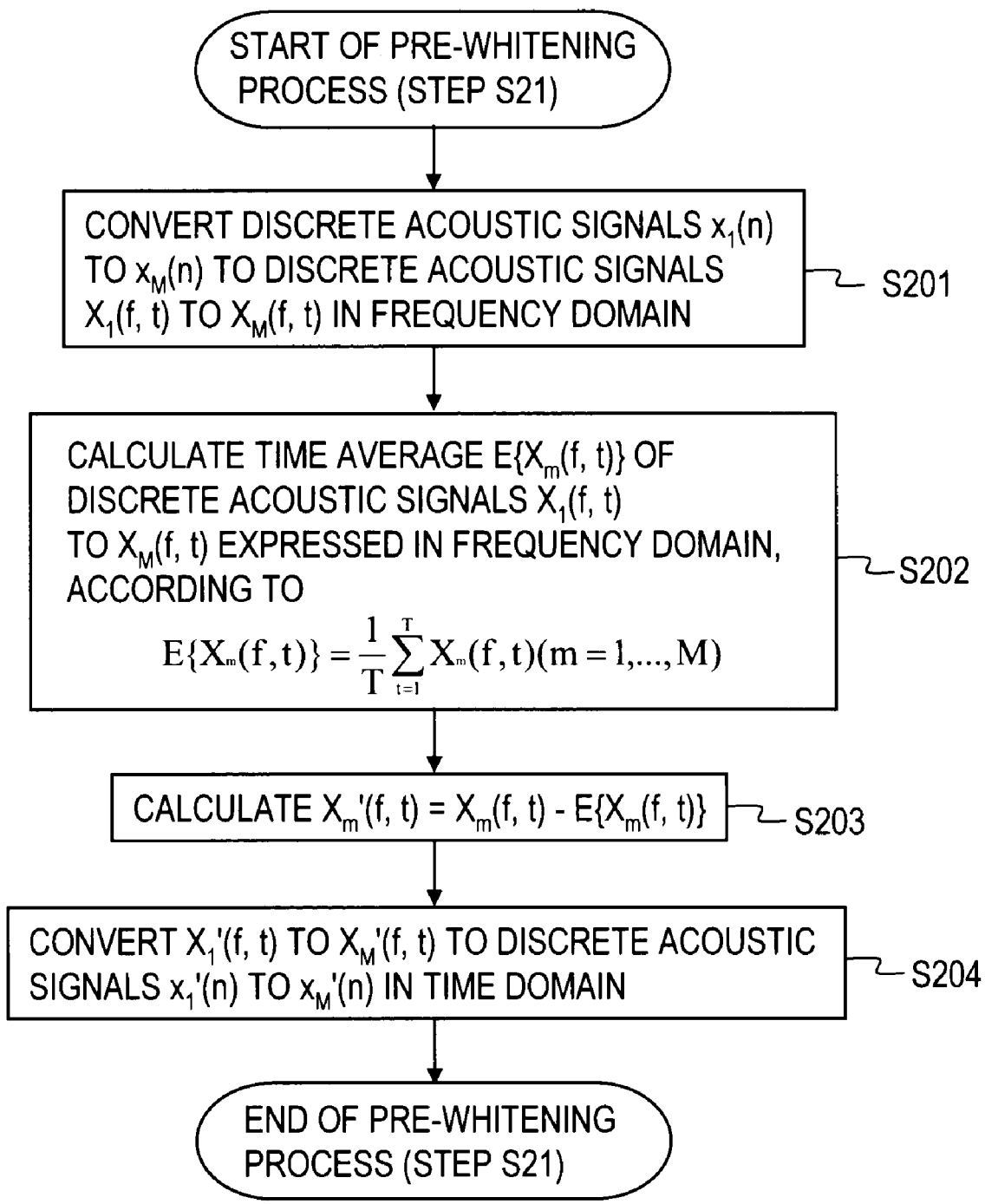
FIG. 14 is a flow chart for explaining a pre-whitening process (step S21) of the fourth embodiment.

FIG. 14 is a flow chart for explaining the pre-whitening process (step S21) of the fourth embodiment. With reference to the figure, the pre-whitening process (step S21) of the fourth embodiment will be described below.

First, the frequency domain converter 511 of the pre-whitening unit 510 reads discrete acoustic signals $x_1(n)$ to $x_M(n)$ of M channels in a single analysis frame of the acoustic signal from a memory 10a. Then, the frequency domain converter 511 converts the discrete acoustic signals $x_1(n)$ to $x_M(n)$ to discrete acoustic signals $X_1(f, t)$ to $X_M(f, t)$ in the frequency domain by a short-term Fourier transform or the like, and outputs them (step S201). When this processing is performed by the short-term Fourier transform, Expression (48) given below is used, for instance. In the expression, $F[\bullet]$ represents the short-term Fourier transform function, and $\text{Log}[\bullet]$ represents a logarithmic function.

$$X_m(f,t) = \text{Log}[F[x_m(n)]] \tag{48}$$

Then, the discrete acoustic signals $X_1(f, t)$ to $X_M(f, t)$ in the frequency domain are read into the time averaging unit 512. In accordance with Expression (49) given below, the time averaging unit 512 calculates the time average $X_m'(f)$ of the discrete acoustic signals $X_1(f, t)$ to $X_M(f, t)$ expressed in the frequency domain and outputs it (step S202).

$$E\{X_m(f,t)\} = \frac{1}{T}\sum_{t=1}^{T} X_m(f,t)(m=1,\ldots,M) \tag{49}$$

Next, the discrete acoustic signals $X_1(f, t)$ to $X_M(f, t)$ in the frequency domain and their time average $E\{X_m(f, t)\}$ are read into the subtraction unit 513. In accordance with Expression (50) given below, the subtraction unit 513 calculates $X_m'(f, t)$ ($m=1$ to M) and outputs it (step S203).

$$X_m'(f,t) = X_m(f,t) - E\{X_m(f,t)\} \tag{50}$$

Then, $X_1'(f, t)$ to $X_M'(f, t)$ are read into the time domain converter 514. The time domain converter 514 converts these values into the time domain values by an inverse Fourier transform or the like, calculates pre-whitened discrete acoustic signals $x_1'(n)$ to $x_M'(n)$, and outputs them (step S204). When this processing is performed by the inverse Fourier transform, Expression (51) given below is used, for instance. In the expression, $\text{invF}[\bullet]$ represents an inverse Fourier transform function, and $\exp[\bullet]$ represents an exponential function having Napier's number as its base.

$$x_m'(n) = \text{invF}[\exp[X_m'(f,t)]] \tag{51}$$

If a window function having a window length of 25 ms is used in the short-term Fourier transform function $F[\bullet]$ or the inverse Fourier transform function $\text{invF}[\bullet]$ described above, an initial reflection component and a short-term correlation of up to 25 ms can be eliminated.

When this configuration is applied to the second embodiment, the pre-whitened discrete acoustic signals $x_1'(n)$ to $x_M'(n)$ generated by the time domain converter 514 are transferred also to the late reverberation predictor 310c and the frequency domain converter 310d (FIG. 8).

Fifth Embodiment

A fifth embodiment of the present invention will be described next. The fifth embodiment is a modification in which the pre-whitening method in the fourth embodiment is applied to the first embodiment.

In the frequency domain conversion process (step S3) of the first embodiment, the discrete acoustic signals $x_1(n)$ to $x_M(n)$ are converted to discrete acoustic signals $X_1(f, t)$ to $X_M(f, t)$ in the frequency domain, and the predicted late reverberations $r_1(n)$ to $r_M(n)$ are converted to predicted late reverberations $R_1(f, t)$ to $R_M(f, t)$ in the frequency domain. However, the discrete acoustic signals $X_1(f, t)$ to $X_M(f, t)$ in the frequency domain are obtained when pre-whitening according to the fourth embodiment is performed (step S201).

The fifth embodiment uses the discrete acoustic signals $X_1(f, t)$ to $X_M(f, t)$ in the frequency domain, obtained in the process of pre-whitening in the fourth embodiment, so that the processing of the frequency domain conversion process is simplified.

In the subsequent part, mainly differences from the embodiments described earlier will be described, and a description of items in common will be omitted.
<Hardware Configuration>

The hardware configuration is the same as that described in the first embodiment.
<Collaboration Between Hardware and Program>

Figure 15:
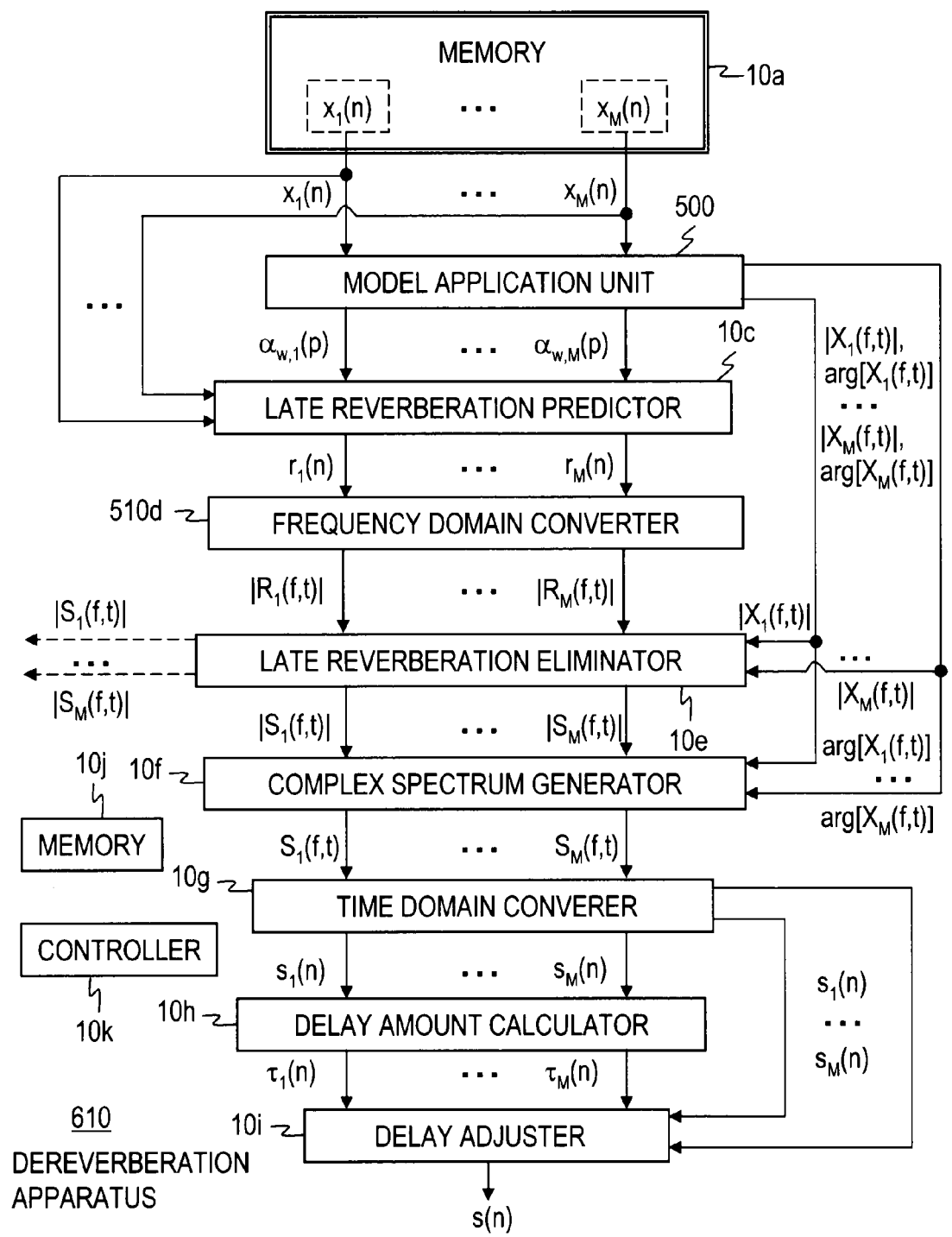
FIG. 15 is a block diagram showing a functional configuration of a dereverberation apparatus according to a fifth embodiment.

A dereverberation apparatus 610 of the fifth embodiment is also implemented when a computer reads and executes a predetermined program. FIG. 15 is a block diagram showing an example functional configuration of the dereverberation apparatus 610 of the fifth embodiment. In FIG. 15, parts identical to those in any embodiments described earlier are denoted by the same reference symbols.

As shown in FIG. 15, the dereverberation apparatus 610 includes a memory 10a, a model application unit 500, a late reverberation predictor 10c, a frequency domain converter 510d, a late reverberation eliminator 10e, a complex spectrum generator 10f, a time domain converter 10g, a delay amount calculator 10h, a delay adjuster 10i, a memory 10j, and a controller 10k.
<Dereverberation Processing>

The dereverberation processing of the fifth embodiment will be described next.

Figure 16:
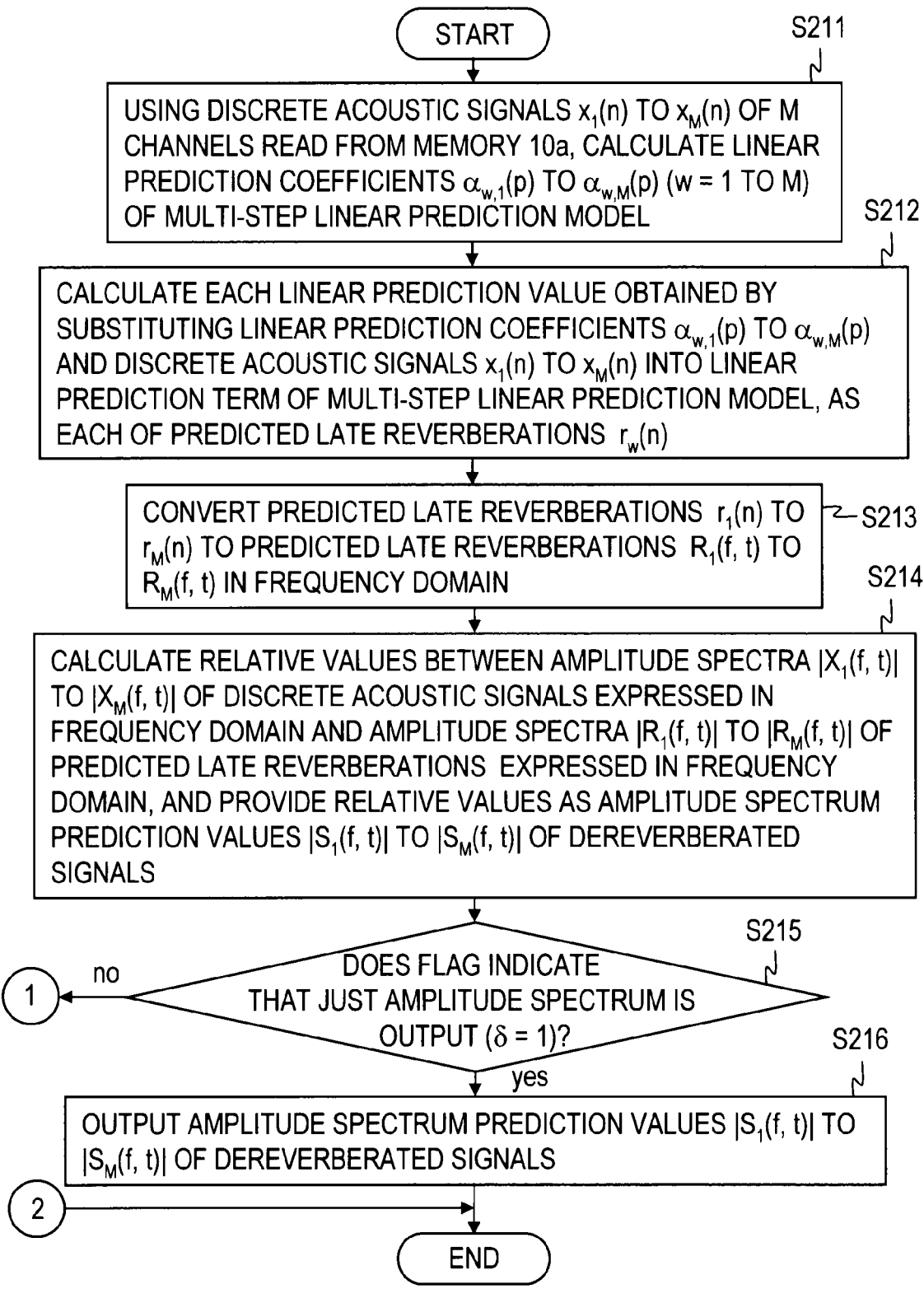
FIG. 16 is a flow chart for explaining the overall dereverberation processing of the fifth embodiment.

FIG. 16 is a flow chart for explaining the overall dereverberation processing of the fifth embodiment. With reference to the figure, the dereverberation processing of the fifth embodiment will be described below.
[Pre-Processing]

Pre-processing is the same as that in the first embodiment.
[Model Application Process (Step S211)]

In a model application process, the model application unit 500 calculates linear prediction coefficients $\alpha_{w,1}(p)$ to $\alpha_{w,M}(p)$ of the multi-step linear prediction model given by Expression (13), by using the discrete acoustic signals $x_1(n)$ to $x_M(n)$ of M channels in a single analysis frame read from the memory 10a (step S211). In this process, pre-whitening processing is the same as that described in the fourth embodiment, and the other processing is the same as that described in the first embodiment.
[Late Reverberation Prediction Process (Step S212)]

After the model application process (step S211), the discrete acoustic signals $x_1(n)$ to $x_M(n)$ read from the memory 10a and the linear prediction coefficients $\alpha_{w,1}(p)$ to $\alpha_{w,M}(p)$ obtained in the model application process (step S211) are input to the late reverberation predictor 10c.

The late reverberation predictor 10c calculates each linear prediction value by substituting the linear prediction coefficients $\alpha_{w,1}(p)$ to $\alpha_{w,M}(p)$ and the discrete acoustic signals $x_1(n)$ to $x_M(n)$ into the linear prediction term of the multi-step linear prediction model and outputs it as each of predicted late reverberations $r_w(n)$ (w=1 to M) (step S212).
[Frequency Domain Conversion Process (Step S213)]

Then, the predicted late reverberations $r_1(n)$ to $r_M(n)$, obtained in the late reverberation prediction process (step S212), are input to the frequency domain converter 510d. The frequency domain converter 510d converts the input predicted late reverberations $r_1(n)$ to $r_M(n)$ to predicted late reverberations $R_1(f, t)$ to $R_M(f, t)$ in the frequency domain (step S213). Through this conversion, the frequency domain converter 510d extracts the amplitude spectra $|R_1(f, t)|$ to $|R_M(f, t)|$ and the phase information $\arg[R_1(f, t)]$ to $\arg[R_M(f, t)]$ of the predicted late reverberations $R_1(f, t)$ to $R_M(f, t)$ expressed in the frequency domain, and outputs them.
[Dereverberation Process (Step S214)]

Next, the amplitude spectra $|X_1'(f, t)|$ to $|X_M'(f, t)|$ of the discrete acoustic signals in the frequency domain, transferred from frequency domain converter 511 (FIG. 13) of pre-whitening unit 510, and the amplitude spectra $|R_1(f, t)|$ to $|R_M(f, t)|$ of the predicted late reverberations in the frequency domain, generated by the frequency domain converter 510d, are input to the late reverberation eliminator 10e. The late reverberation eliminator 10e calculates the relative values of individual sensors, between the amplitude spectra $|X_1'(f, t)|$ to $|X_M'(f, t)|$ of the discrete acoustic signals in the frequency domain and the amplitude spectra $|R_1(f, t)|$ to $|R_M(f, t)|$ of the predicted late reverberations in the frequency domain, and outputs the relative values as the predicted amplitude spectra $|S_1(f, t)|$ to $|S_M(f, t)|$ of dereverberated signals (step S214).
[Flag Assessment Process (Steps S215 and S216)]

A flag assessment process (steps S215 and S216) of the fifth embodiment is the same as the flag assessment process (steps S5 and S6) in the first embodiment.
[Other Processes]

The other processes are the same as those in the first embodiment. A single difference from the first embodiment is that phase information $\arg[X_1(f, t)]$ to $\arg[X_M(f, t)]$ transferred from frequency domain converter 511 (FIG. 13) of pre-whitening unit 510 is used in a complex spectrum generation process (step S7)].

Sixth Embodiment

A sixth embodiment of the present invention will be described next. The sixth embodiment is a modification in which the pre-whitening method of the fourth embodiment is applied to the second embodiment.

In the frequency domain conversion process (step S103) of the second embodiment, the discrete acoustic signals $x_1(n)$ to $x_M(n)$ are converted to discrete acoustic signals $X_1(f, t)$ to $X_M(f, t)$ in the frequency domain, and the predicted late reverberations $r_1(n)$ to $r_M(n)$ are converted to the predicted late reverberations $R_1(f, t)$ to $R_M(f, t)$ in the frequency domain. When pre-whitening of the fourth embodiment is performed, however, the discrete acoustic signals $X_1(f, t)$ to $X_M(f, t)$ in the frequency domain are obtained during that process (step S201).

The sixth embodiment uses the discrete acoustic signals $X_1(f, t)$ to $X_M(f, t)$ expressed in the frequency domain, obtained in the process of pre-whitening in the fourth embodiment, so that the processing of the frequency domain conversion process is simplified.

In the subsequent part, mainly differences from the embodiments described earlier will be described, and a description of common items will be omitted.

<Hardware Configuration>

The hardware configuration is the same as that described in the first embodiment.

<Collaboration Between Hardware and Program>

A dereverberation apparatus 620 of the sixth embodiment is also implemented when a computer reads and executes a predetermined program.

Figure 17:
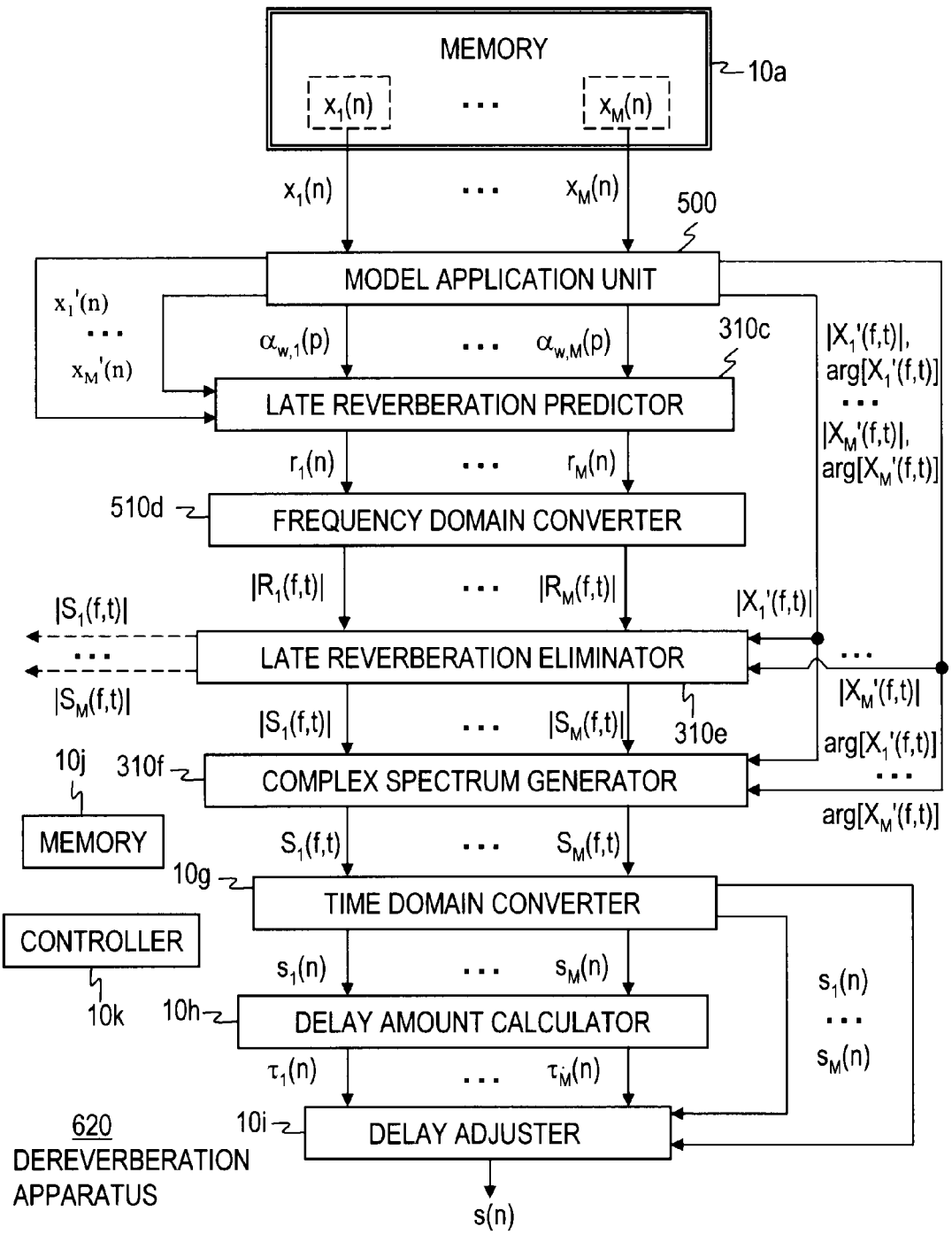
FIG. 17 is a block diagram showing a functional configuration of a dereverberation apparatus according to a sixth embodiment.

FIG. 17 is a block diagram showing an example functional configuration of the dereverberation apparatus 620 of the sixth embodiment. In FIG. 17, parts identical to those in any embodiments described earlier are denoted by the same reference symbols.

As shown in FIG. 17, the dereverberation apparatus 620 includes a memory 10a, a model application unit 500, a late reverberation predictor 310c, a frequency domain converter 510d, a late reverberation eliminator 310e, a complex spectrum generator 310f, a time domain converter 10g, a delay amount calculator 10h, a delay adjuster 10i, a memory 10j, and a controller 10k.

<Dereverberation Processing>

Dereverberation processing of the sixth embodiment will be described next.

Figure 18:
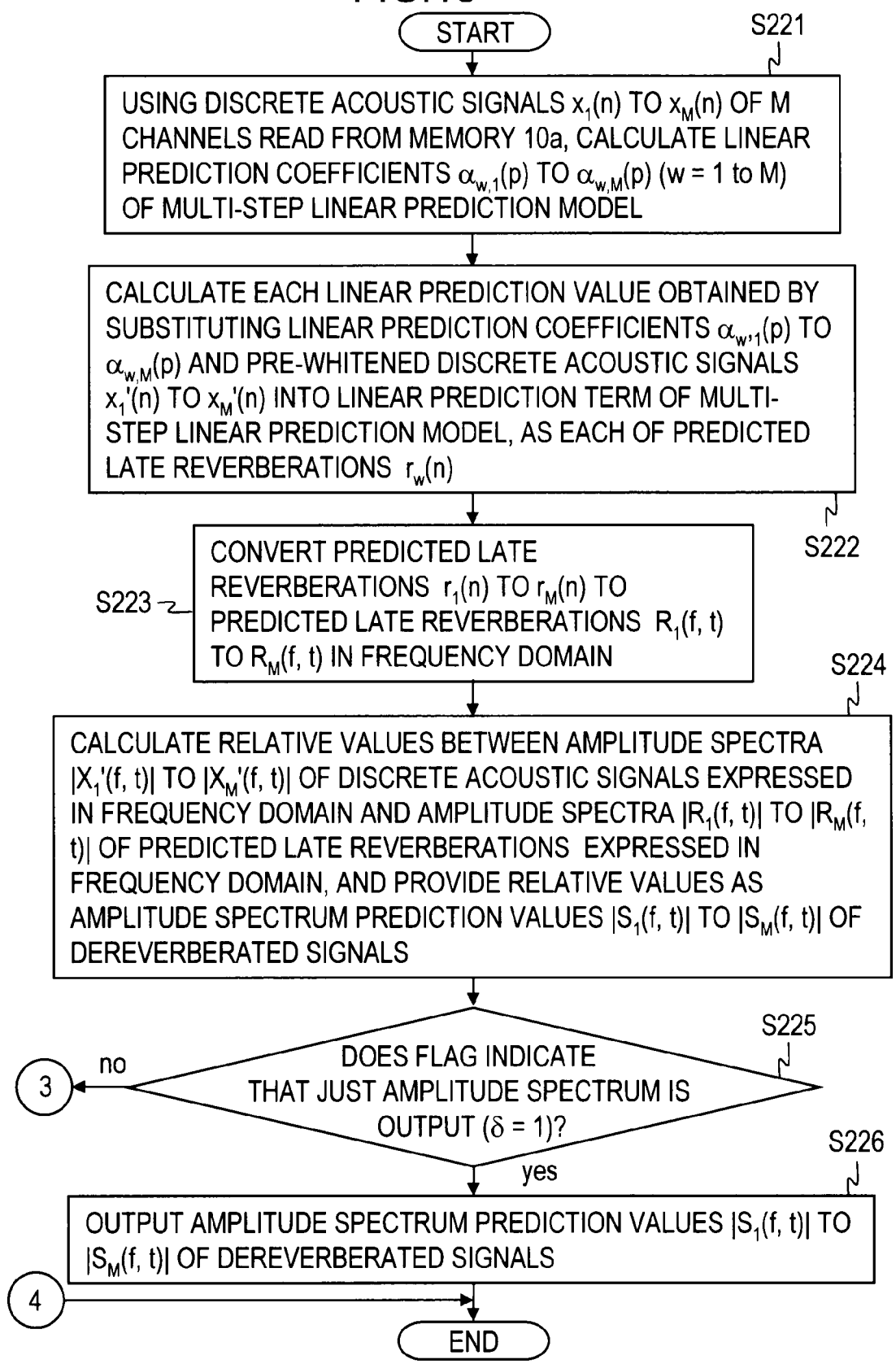
FIG. 18 is a flow chart for explaining the overall dereverberation processing of the sixth embodiment.

FIG. 18 is a flow chart for explaining the overall dereverberation processing of the sixth embodiment. With reference to the figure, the dereverberation processing of the sixth embodiment will now be described.

[Pre-Processing]

Pre-processing is the same as that in the first embodiment.

[Model Application Process (Step S221)]

In a model application process, the model application unit 500 calculates linear prediction coefficients $\alpha_{w,1}(p)$ to $\alpha_{w,M}(p)$ of the multi-step linear prediction model given by Expression (13), by using the discrete acoustic signals $x_1(n)$ to $x_M(n)$ of M channels in a single analysis frame read from the memory 10a (step S221). In this process, pre-whitening processing is the same as that described in the fourth embodiment, and the other processing is the same as that described in the first embodiment.

[Late Reverberation Prediction Process (Step S222)]

After the model application process (step S221), the discrete acoustic signals $x_1'(n)$ to $x_M'(n)$ pre-whitened in the model application process (step S221) and the linear prediction coefficients $\alpha_{w,1}(p)$ to $\alpha_{w,M}(p)$ obtained in the model application process (step S221) are input to the late reverberation predictor 310c.

The late reverberation predictor 310c calculates each linear prediction value by substituting the linear prediction coefficients $\alpha_{w,1}(p)$ to $\alpha_{w,M}(p)$ and the pre-whitened discrete acoustic signals $x_1'(n)$ to $x_M'(n)$ into the linear prediction term of the multi-step linear prediction model and outputs it as each of the predicted late reverberations $r_w(n)$ (w=1 to M) (step S222).

[Frequency Domain Conversion Process (Step S223)]

Then, the predicted late reverberations $r_1(n)$ to $r_M(n)$, obtained in the late reverberation prediction process (step S222), are input to the frequency domain converter 510d. The frequency domain converter 510d converts the input predicted late reverberations $r_1(n)$ to $r_M(n)$ to the predicted late reverberations $R_1(f, t)$ to $R_M(f, t)$ in the frequency domain (step S223). Through this conversion, the frequency domain converter 510d extracts the amplitude spectra $|R_1(f, t)|$ to $|R_M(f, t)|$ and the phase information $\arg[R_1(f, t)]$ to $\arg[R_M(f, t)]$ of the predicted late reverberations $R_1(f, t)$ to $R_M(f, t)$ expressed in the frequency domain, and outputs them.

[Dereverberation Process (Step S224)]

Next, the amplitude spectra $|X_1'(f, t)|$ to $|X_M'(f, t)|$ of the discrete acoustic signals in the frequency domain and the amplitude spectra $|R_1(f, t)|$ to $|R_M(f, t)|$ of the predicted late reverberations in the frequency domain are input to the late reverberation eliminator 310e. The late reverberation eliminator 310e calculates the relative values of individual sensors, between the amplitude spectra $|X_1'(f, t)|$ to $|X_M'(f, t)|$ of the discrete acoustic signals in the frequency domain and the amplitude spectra $|R_1(f, t)|$ to $|R_M(f, t)|$ of the predicted late reverberations in the frequency domain, and outputs the relative values as the predicted amplitude spectra $|S_1(f, t)|$ to $|S_M(f, t)|$ of dereverberated signals (step S224). The amplitude spectra $|X_1'(f, t)|$ to $|X_M'(f, t)|$ of the discrete acoustic signals in the frequency domain, used in this step, are transferred from subtraction unit 513 (FIG. 13) of pre-whitening unit 510.

[Flag Assessment Process (Steps S225 and S226)]

A flag assessment process (steps S225 and S226) of the sixth embodiment is the same as the flag assessment process (steps S5 and S6) in the first embodiment.

[Other Processes]

The other processes are the same as those in the first embodiment. A single difference from the first embodiment is that phase information $\arg[X_1'(f, t)]$ to $\arg[X_M'(f, t)]$ transferred from subtraction unit 513 (FIG. 13) of pre-whitening unit 510 is used in a complex spectrum generation process (step S7)].

Seventh Embodiment

A seventh embodiment of the present invention will be described next. The seventh embodiment is a modification of the first to sixth embodiments, with M set to 1 and the delay amount calculator 10h and the delay adjuster 10i omitted. In a configuration described below as a representative example, M is set to 1; the pre-whitening method of the fourth embodiment is applied to the second embodiment; and the delay amount calculator 10h and the delay adjuster 10i are omitted. The configuration may also be based on any of the first to sixth embodiments or on a combination of them, with M set to 1 and the delay amount calculator 10h and the delay adjuster 10i omitted. The delay amount calculator 10h and the delay adjuster 10i may be included so long as they are configured not to function when M is set to 1.

In the subsequent description, mainly the difference from the embodiments described earlier will be mentioned, and a description of items common to the seventh embodiment and the earlier embodiments will be omitted.

<Hardware Configuration>

The hardware configuration is the same as that described in the first embodiment.

<Collaboration Between Hardware and Program>

Figure 19:
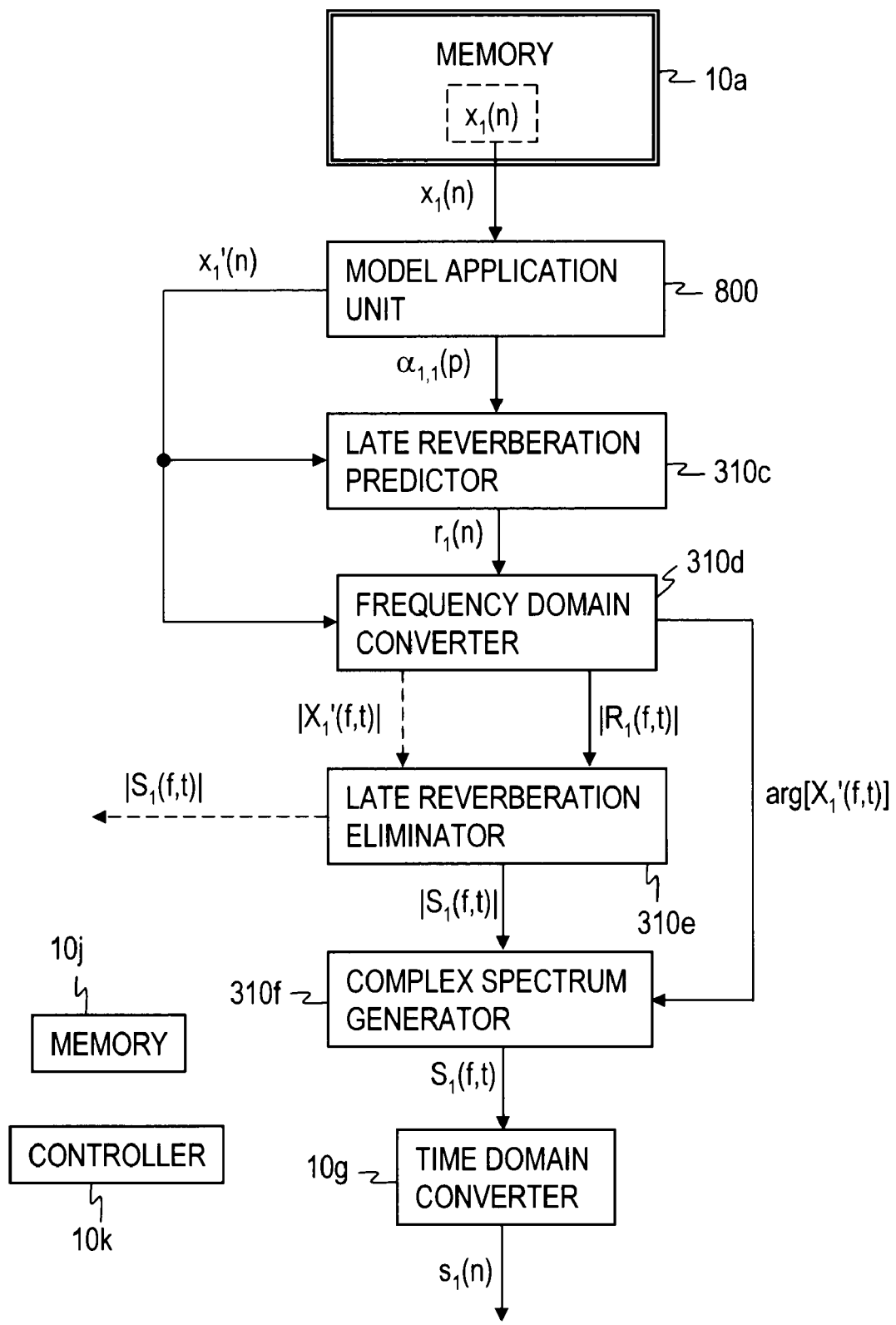
FIG. 19 is a block diagram showing a functional configuration of a dereverberation apparatus according to a seventh embodiment.
Figure 20:
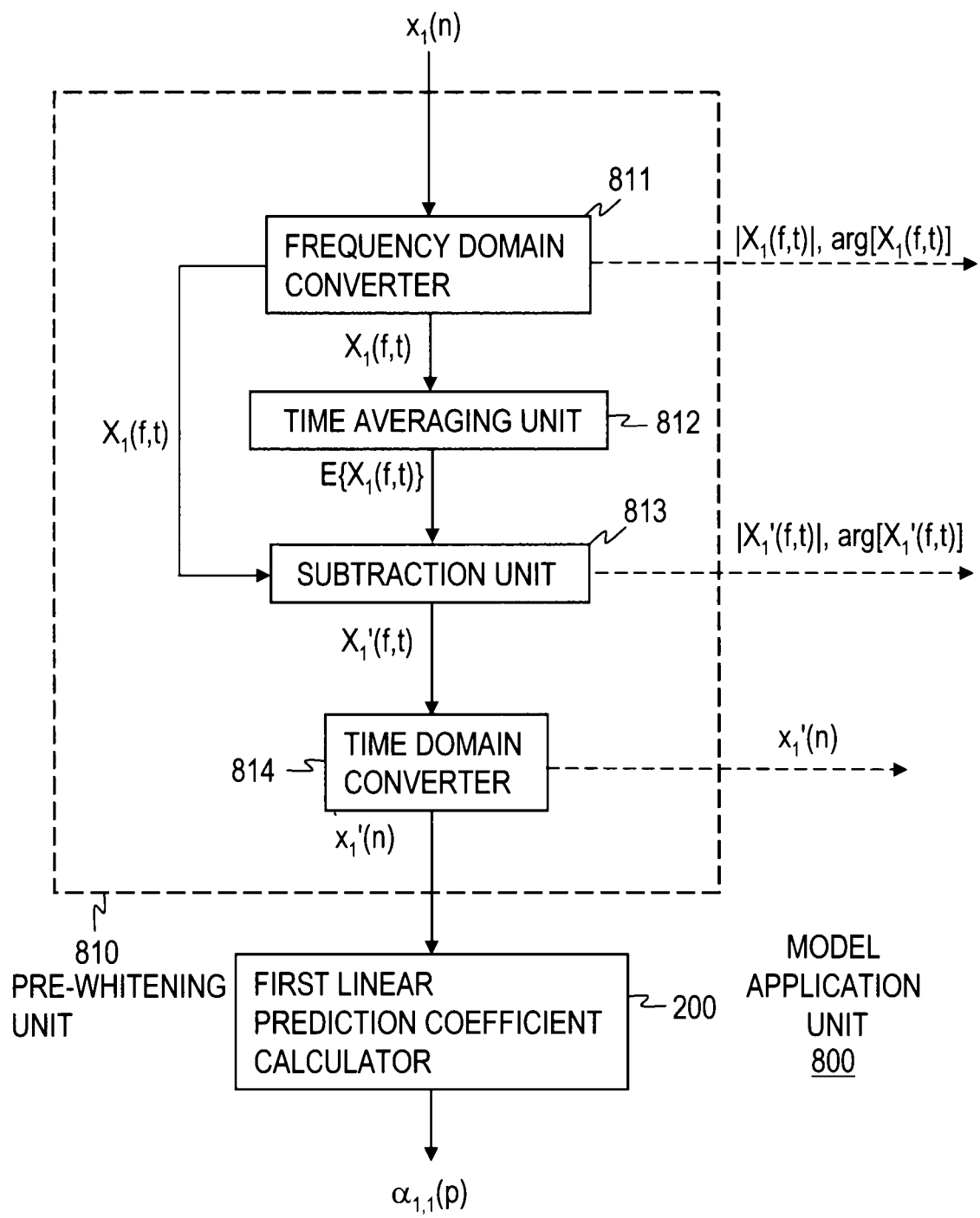
FIG. 20 is a block diagram showing example details of the functional configuration of a model application unit shown in FIG. 19.

A dereverberation apparatus 710 of the seventh embodiment is also implemented when a computer reads and executes a predetermined program. FIG. 19 is a block diagram showing an example functional configuration of the dereverberation apparatus 710 of the seventh embodiment. FIG. 20 is a block diagram showing details of the functional configuration of a model application unit 800 shown in FIG. 19. In FIGS. 19 and 20, components identical to those in any embodiment described earlier are denoted by the same reference symbols as used in that embodiment.

As shown in FIG. 19, the dereverberation apparatus 710 includes a memory 10a, the model application unit 800, a late reverberation predictor 310c, a frequency domain converter 310d, a late reverberation eliminator 310e, a complex spectrum generator 310f, a time domain converter 10g, a memory 10j, and a controller 10k.

The model application unit 800 includes a pre-whitening unit 810 and a first linear prediction coefficient calculator 200. The pre-whitening unit 810 includes a frequency domain converter 811, a time averaging unit 812, a subtraction unit 813, and a time domain converter 814.

<Dereverberation Processing>

Dereverberation processing of the seventh embodiment will be described next.

Figure 22A:
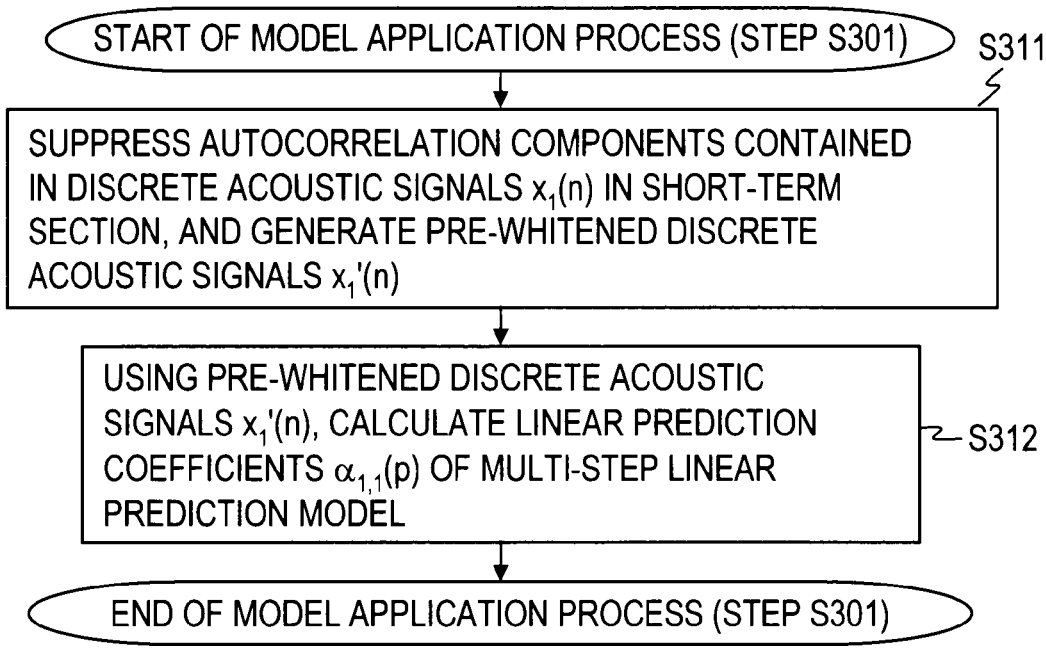
FIG. 22A is a flow chart for explaining details of step S301 (model application process) in FIG. 21.
Figure 22B:
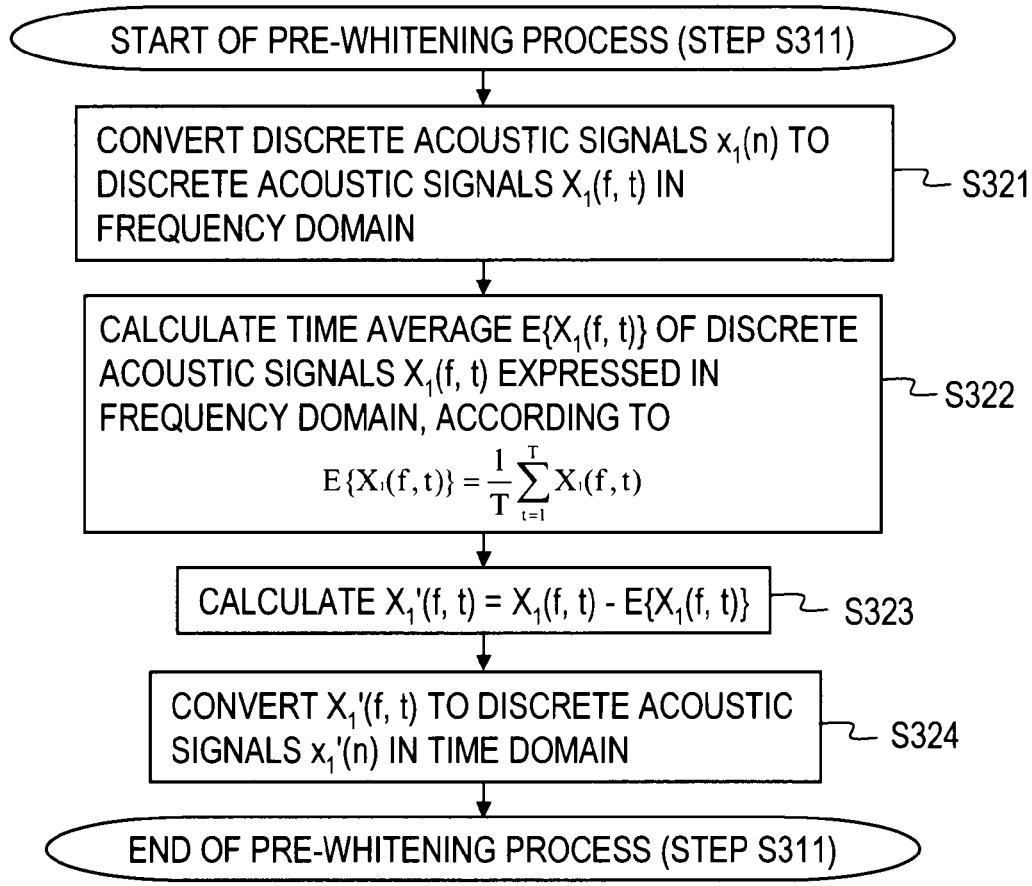
FIG. 22B is a flow chart for explaining details of step S311 (pre-whitening process) in FIG. 22A.

FIG. 21 is a flow chart for explaining the overall dereverberation processing of the seventh embodiment. FIG. 22A is a flow chart for explaining details of step S301 (model application process) in FIG. 21, and FIG. 22B is a flow chart for explaining details of step S311 (pre-whitening process) in FIG. 22A.

The dereverberation processing of the seventh embodiment will be described with reference to those figures.

[Pre-Processing]

First, a signal-channel acoustic signal observed by M sensors (M=1) is sampled at a predetermined sampling frequency to generate discrete acoustic signals $x_1(n)$. The generated discrete acoustic signals $x_1(n)$ of the channel are stored in the memory 10a. In the seventh embodiment, the discrete acoustic signals $x_1(n)$ in all time periods to be dereverberated are obtained in advance and stored in the memory 10a, and the following operations are executed in each analysis frame. However, the following operations may be executed while the discrete acoustic signals $x_1(n)$ are obtained in real time.

Information indicating whether the information finally output by the dereverberation apparatus 710 is just the amplitude spectrum of a dereverberation signal or an acoustic signal containing a phase component is stored in the memory 10j. In the seventh embodiment, a flag (data) δ is stored in the memory 10j as that information. If the output information is just the amplitude spectrum of direct sound, δ is set to 1. If an acoustic signal containing a phase component is output, δ is set to 0.

The dereverberation processing of the seventh embodiment will be described below. The processing in a single analysis frame will be described below, but in reality the same processing is performed in multiple analysis frames.

[Model Application Process (Step S301)]

In a model application process, the model application unit 800 calculates linear prediction coefficients $\alpha_{1,1}(p)$ of the multi-step linear prediction model given by Expression (5), by using the discrete acoustic signals $x_1(n)$ in a single analysis frame read from the memory 10a (step S301). Details of this process will be described below in a hierarchical manner.

[Details of Model Application Process (Step 301) (FIG. 22A)]

As shown in FIG. 22A, in the model application process, the pre-whitening unit 810 (FIG. 20) suppresses autocorrelation components in the short-term period contained in the input discrete acoustic signals $x_1(n)$, generates pre-whitened discrete acoustic signals $x_1'(n)$, and outputs them (pre-whitening process, step S311). In other words, the pre-whitened discrete acoustic signals $x_1'(n)$ are generated from the discrete acoustic signals $x_1(n)$ at discrete time n, by suppressing the autocorrelation components having autocorrelation with the discrete acoustic signals in a short-term period immediately preceding the discrete time n.

Then, the pre-whitened discrete acoustic signals $x_1'(n)$ are input to the first linear prediction coefficient calculator 200 (FIG. 20), and the first linear prediction coefficient calculator 200 calculates the linear prediction coefficients $\alpha_{1,1}(p)$ of the multi-step linear prediction model given by Expression (5), by using the pre-whitened discrete acoustic signals $x_1'(n)$, and outputs them (first linear prediction coefficient calculation process, step S312). For example, the delay D in Expression (5) is set to 25 ms (equivalent to 300 taps at a sampling frequency of 12,000 Hz), and the number N of linear prediction coefficients $\alpha_{1,1}(p)$ is set to around 5000. Methods of calculating the linear prediction coefficients $\alpha_{1,1}(p)$ include the correlation method and the covariance method. This process can also be performed by using MATLAB (registered trademark) or the like.

[Details of Pre-Whitening Process (Step S311) (FIG. 22B)]

Details of the pre-whitening process (step S311) will be described next.

In the seventh embodiment, for instance, Cepstral Mean Subtraction (CMS) is used to pre-whiten the discrete acoustic signals.

First, the frequency domain converter 811 of the pre-whitening unit 810 reads the discrete acoustic signals $x_1(n)$ of a single channel in a single analysis frame of the acoustic signal from the memory 10a. Then, the frequency domain converter 811 converts the discrete acoustic signals $x_1(n)$ to discrete acoustic signals $X_1(f, t)$ in the frequency domain by a short-term Fourier transform or the like and outputs them (step S321). If this conversion is performed by a short-term Fourier transform, Expression (52) given below is used, for instance. In the expression, F[●] represents a short-term Fourier transform function, and Log [●] represents a logarithmic function.

$$X_1(f,t) = \text{Log } [F[x_1(n)]] \tag{52}$$

Then, the discrete acoustic signals $X_1(f, t)$ in the frequency domain are read into the time averaging unit 812. In accordance with Expression (53) given below, the time averaging unit 812 obtains a time average $X_1'(f)$ of the discrete acoustic signals $X_1(f, t)$ in the frequency domain and outputs it (step S322).

$$E\{X_1(f, t)\} = \frac{1}{T}\sum_{t=1}^{T} X_1(f, t) \tag{53}$$

Next, the discrete acoustic signals $X_1(f, t)$ in the frequency domain and their time average $E\{X_1(f, t)\}$ are read into the subtraction unit 813. The subtraction unit 813 obtains $X_1'(f, t)$ in accordance with Expression (54) given below, and outputs it (step S323).

$$X_1'(f,t) = X_1(f,t) - E\{X_1(f,t)\} \tag{54}$$

Then, $X_1'(f, t)$ are read into the time domain converter 814. The time domain converter 814 converts those values into the time domain values by an inverse Fourier transform or the like to obtain pre-whitened discrete acoustic signals $x_1'(n)$ and outputs them (step S324). If this conversion is performed by an inverse Fourier transform, Expression (55) given below is used, for instance. In the expression, invF[●] represents an inverse Fourier transform function.

$$x_1'(n) = \text{inv}F[\exp[X_1'(f,t)]] \tag{55}$$

If a window function having a window length of 25 ms is used in the short-term Fourier transform function F[●] or the inverse Fourier transform function invF[●], short-term correlation components and an initial reflection component of up to 25 ms can be eliminated.

In the seventh embodiment, the pre-whitened discrete acoustic signals $x_1'(n)$ generated by the time domain converter 814 are transferred also to the late reverberation predictor 310c and the frequency domain converter 310d (FIG. 19). (End of description of details of the model application process (step S301))

[Late Reverberation Prediction Process (Step S302)]

After the model application process (step S301), the pre-whitened discrete acoustic signals $x_1'(n)$ generated by the time domain converter 814 and the linear prediction coefficients $\alpha_{1,1}(p)$ obtained in the model application process (step S301) are input to the late reverberation predictor 310c.

The late reverberation predictor 310c calculates each linear prediction value by substituting the linear prediction coefficients $\alpha_{1,1}(p)$ and the pre-whitened discrete acoustic signals $x_1'(n)$ into the linear prediction term of the multi-step linear prediction model, as given by Expression (10) shown earlier, and outputs them as each of predicted late reverberations $r_1(n)$ (step S302). Because the multi-step linear prediction model given by Expression (5) is used in the seventh embodiment, the late reverberation predictor 310c obtains the predicted late reverberations $r_1(n)$ according to Expression (56) below and outputs them.

$$r_1(n) = \sum_{p=1}^{N} \alpha_{1,1}(p) \cdot x_1(n-p-D) \tag{56}$$

[Frequency Domain Conversion Process (Step S303)]

Then, the pre-whitened discrete acoustic signals $x_1'(n)$ generated by the time domain converter 814 (FIG. 20) and the predicted late reverberations $r_1(n)$ obtained in the late reverberation prediction process (step S302) are input to the frequency domain converter 310d. The frequency domain converter 310d converts the input pre-whitened discrete acoustic signals $x_1'(n)$ to discrete acoustic signals $X_1'(f, t)$ in the frequency domain and converts the predicted late reverberations $r_1(n)$ to predicted late reverberations $R_1(f, t)$ in the frequency domain (step S303). In the seventh embodiment, a window function having a finite length, such as a Hanning window having a window length of 25 ms, is used, for instance, and conversion to the frequency domain is performed by a short-term Fourier transform (discrete Fourier transform, DFT) or the like. Through these conversions, the frequency domain converter 310d extracts the amplitude spectra $|X_1'(f, t)|$ and the phase information $\arg[X_1'(f, t)]$ of the discrete acoustic signals $X_1'(f, t)$ expressed in the frequency domain and the amplitude spectra $|R_1(f, t)|$ and the phase information $\arg[R_1(f, t)]$ of the predicted late reverberations $R_1(f, t)$ expressed in the frequency domain, and outputs them.

[Dereverberation Process (Step S304)]

Next, the amplitude spectra $|X_1'(f, t)|$ of the discrete acoustic signals expressed in the frequency domain and the amplitude spectra $|R_1(F, t)|$ of the predicted late reverberations expressed in the frequency domain are input to the late reverberation eliminator 310e. The late reverberation eliminator 310e calculates the relative values between the amplitude spectra $|X_1'(f, t)|$ of the discrete acoustic signals expressed in the frequency domain and the amplitude spectra $|R_1(f, t)|$ of the predicted late reverberations expressed in the frequency domain, and outputs the relative values as the predicted amplitude spectra $|S_1(F, t)|$ of the dereverberated signals (step S304). Details of the process are the same as in the first embodiment.

[Flag Assessment Process (Steps S305 and S306)]

After step S304, the controller 10k reads the flag δ stored in the memory 10j to check whether the flag δ indicates that just the amplitude spectra are output, that is, whether δ is 1 (step S305). If δ is 1, the controller 10k outputs the predicted amplitude spectra $|S_1(f, t)|$ of the dereverberated signals generated by the late reverberation eliminator 310e in the dereverberation process (step S304) as the final output information of the dereverberation apparatus 710 (step S306) and ends the processing in the analysis frame. The output predicted amplitude spectra $|S_1(f, t)|$ are passed to an application following the dereverberation apparatus 710, such as a speech recognition system, for instance, where they are converted to feature quantities.

If δ is 0, the controller 10k executes the processing of step S307 and on, which will be described below.

[Complex Spectrum Generation Process (Step S307)]

In a complex spectrum generation process, the amplitude spectrum predicted amplitude spectra $|S_1(f, t)|$ of the dereverberated signals, output from the late reverberation eliminator 310e (step S304), and the phase information $\arg[X_1'(f, t)]$ of the discrete acoustic signals expressed in the frequency domain, output from the frequency domain converter 310d (step S303), are input to the complex spectrum generator 310f. Using these pieces of information, the complex spectrum generator 310f calculates predicted complex spectra $S_1(f, t)$ of the dereverberated signals in accordance with Expression (57) given below, and outputs them (step S307).

$$S_1(f,t) = |S_1(f,t)| \cdot \exp(j \cdot \arg[X_1(f,t)]) \tag{57}$$

[Time Domain Conversion Process (Step S308)]

After step S307, the predicted complex spectra $S_1(f, t)$ of the dereverberated signals are input to the time domain converter 10g. Then, the time domain converter 10g calculates estimates of dereverberated signals $s_1(n)$ by converting the predicted complex spectra $S_1(f, t)$ of the dereverberated signals into the time domain signals, and outputs them (step S308). Conversion to the time domain is performed by an inverse Fourier transform, for instance.

[Simulation Results]

Simulation results will be shown next to indicate the effects of the present invention at M=1. The simulation was performed with a configuration in which the pre-whitening method of the fourth embodiment is applied to the second embodiment.

This simulation used fifty utterances of men and fifty utterances of women, taken from a continuous utterance data set, and simulated a reverberation environment generated by convoluting a 3000-taps impulse response into the utterances. The step size (delay) D of the multi-step linear prediction model of Expression (5) was set to 25 ms, and the number N of linear prediction coefficients $\alpha_{1,1}(p)$ was set to 5000. A short-term Fourier transform with a window length of 25 ms was used for conversion from the time domain to the frequency domain.

FIG. 24 shows the simulation results. FIGS. 24A and 24B show the amplitude spectrum value and the speech waveform before dereverberation, respectively. FIGS. 24C and 24D show the amplitude spectrum value and the speech waveform after dereverberation according to the present invention (M=1), respectively. In FIGS. 24A and 24C, the vertical axis indicates the amplitude spectrum value, and the horizontal axis indicates time (s). In FIGS. 24B and 24D, the vertical axis indicates frequency (Hz), and the horizontal axis indicates time (s). These Figures indicate that late reverberation is accurately suppressed by the present invention.

Next, simulation results will be shown in which the effects of the present invention are evaluated in terms of speech recognition. This simulation used an acoustic model obtained by clean training. Table 1 lists word error rates of different recognition targets. The error rates of reverberant speech and dereverberated speech are labeled as "Rev." and "Derev." respectively. The table indicates that the present invention significantly improves the recognition rate even though the acoustic model has been obtained by clean training.

TABLE 1

| Clean | Rev. | Derev. (invented) |
|---|---|---|
| 20.1 | 78.9 | 37.2 |

[Experimental Results]

Next, experimental results will be shown to indicate the effects of the present invention. In the experiment, speech recognition rates were measured when late reverberation was not eliminated (no processing); when the pre-whitening method of the fourth embodiment was applied to the second embodiment, with M set to 1 (seventh embodiment); when the estimates of dereverberated signals obtained in a single channel (m=1) were used without adjusting the delay in the first embodiment ($M \geq 2$) (first embodiment, without delay adjustment); and when the delay was adjusted and late reverberation was eliminated in the first embodiment ($M \geq 2$) (first embodiment, with delay adjustment).

Figure 25A:
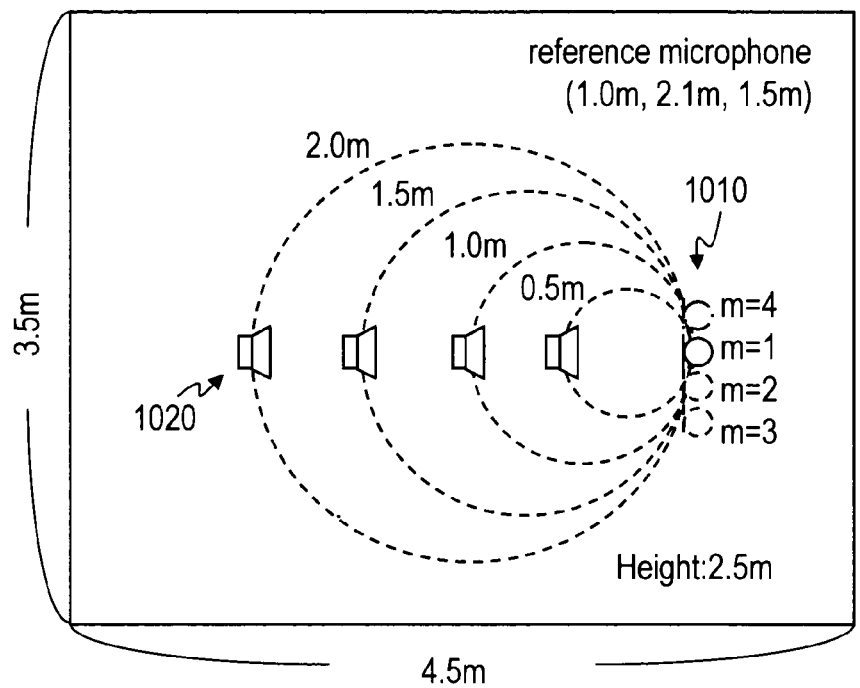
FIG. 25A is a view showing experimental conditions.

FIG. 25A shows experimental conditions. In this experiment, it was assumed that four microphones 1010 (M=4) were placed in a line in a room 3.5 meters long, 4.5 meters wide, and 2.5 meters high, and four speakers 1020 were placed in a line at distances of 0.5 m, 1.0 m, 1.5 m, and 2.0 m from a microphone 1010 (m=1) (indicated by a solid line). One hundred utterances of men and one hundred utterances of women were taken from a continuous utterance data set, and a 3000-taps impulse response simulated was convoluted into the utterances to generate late reverberation sound. In the speech recognition, the Cepstral Mean Subtraction (B. S. Atal, "Effectiveness of linear prediction characteristics of the speech wave for automatic speaker identification and verification," Journal of the Acoustical Society of America, vol. 55(6), pp. 1304-1312, June 1974) was used as the processing in acoustic model adaptation. Here, the microphone 1010 (m=1) was used when M was set to 1 and the pre-whitening method according to the fourth embodiment was applied to the second embodiment (seventh embodiment).

Figure 25B:
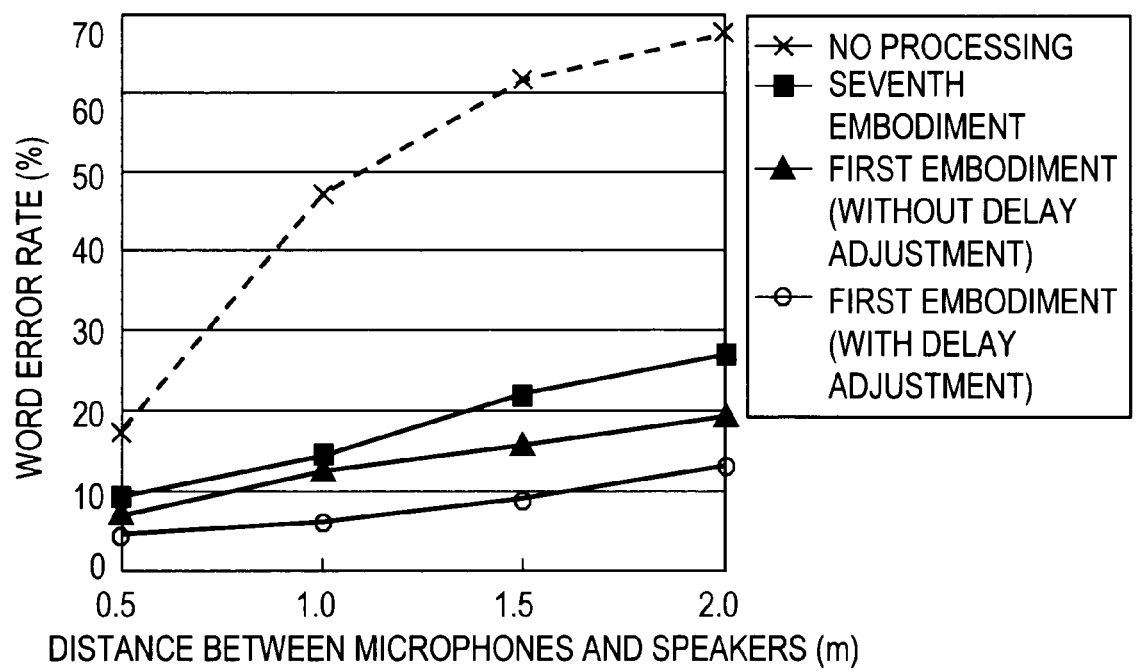
FIG. 25B is a graph showing speech recognition results (word error rates).

FIG. 25B is a graph showing speech recognition results (word error rates) in the four cases given above (no processing, seventh embodiment, first embodiment without delay adjustment, first embodiment with delay adjustment). In FIG. 25B, the horizontal axis indicates the distance (m) between the microphone 1010 (m=1) and the speakers 1020, and the vertical axis indicates the word error rate (%).

As shown in FIG. 25B, when the distance between the microphone 1010 (m=1) and the speakers 1020 is comparatively short, the amount of improvement in the word error rate in the first embodiment ($M \geq 2$) without delay adjustment and the first embodiment ($M \geq 2$) with delay adjustment are not so large in comparison with the seventh embodiment (M=1). As the distance between the microphone 1010 (m=1) and the speakers 1020 increases, since the number of maximum phase components (zeros) in the transfer function increases, the amount of improvement in the word error rate significantly increases in the first embodiment ($M \geq 2$) without delay adjustment, in comparison with the seventh embodiment (M=1). In the first embodiment ($M \geq 2$) with delay adjustment, the word error rate can be improved further.

[Modifications]

The present invention is not limited to the embodiments described above. In the embodiments described above, the late reverberation eliminator executes the processing by converting data into the frequency domain by a short-term Fourier transform or the like. However, if the dereverberation apparatus is required to output just the amplitude spectrum of direct sound, the late reverberation eliminator may perform z transform of the data and perform the processing in the z domain.

In the embodiments described above, the processing is executed after the short-term correlation components are eliminated from the discrete acoustic signals by the pre-whitening unit. However, the processing may be executed by using discrete acoustic signals with short-term correlation components left in them.

All of the processing described above may be executed time-sequentially, as described above, or may also be executed individually or in parallel, depending on the situation or the capability of an apparatus that executes the processing. Two or more embodiments may also be combined. Needless to say, any modifications are possible within the scope of the present invention.

If the configuration described above is implemented by a computer, the processing of the functions to be provided by each device is described in a program. By executing the program on a computer, the corresponding processing functions are implemented on the computer.

The program, which has described the processing, can be recorded in computer-readable recording media. Such computer-readable recording media include, for example, magnetic recording devices, optical disks, magneto-optical recording media, and semiconductor memories. Specifically, for example, the magnetic recording devices include hard disk units, flexible disks, and magnetic tape; the optical disks include DVDs (digital versatile discs), DVD-RAMs (random access memories), CD-ROMs (compact disc read only memories), CD-Rs (recordables)/RWs (ReWritables); the magneto-optical recording media include MOs (magneto-optical discs); and the semiconductor memories include EEPROMs (Electronically Erasable and Programmable Read Only Memories).

The program is distributed, for example, by selling, transferring, or lending a portable recording medium that has the programs recorded thereon, such as a DVD or a CD-ROM. The program may be distributed such that the program is stored in a storage unit of a server computer and is transmitted from the server computer to another computer through a network.

A computer which executes the program, for example, temporarily stores the program recorded in a portable recording medium or the program transmitted from the server computer in its storage unit, reads the program stored in its storage unit when executing the processing, and executes the processing according to the read program. In another execution form of the program, the computer may read the program directly from the portable recording medium and execute the processing according to the read program. Further, every time the computer receives the program from the server computer, the computer may sequentially execute the processing according to the received program. The above-described processing may be executed by a so-called ASP (application service provider) service, where the server computer does not transfer the program to the computer but the processing function is implemented only by instructing program execution and acquiring the results. The program in the present embodiment includes information that is used in processes executed by a computer and is equivalent to programs (such as data that is not a direct instruction to the computer but specifies a computer process).

In this embodiment, the apparatus is configured when the predetermined program is executed by the computer. At least a part of the processing may be implemented in hardware.

INDUSTRIAL APPLICABILITY

By using the present invention as a technological element of various types of acoustic signal processing systems, the overall performance of the systems can be improved. The present invention can be applied to acoustic signal processing systems such as those listed below. Speech recorded in an environment always contains reverberation (reflected sound), and the following examples are assumed to be used in that environment:

- Speech recognition systems in reverberant environments
- Music information processing systems for storing songs or tunes sung by people, played on instruments, or played by speakers after dereverberating them, searching through the songs or tunes stored in memory, and transcribing those songs or tunes in musical notation
- Machine-human interaction apparatuses and machine control interfaces that pass a command to a machine in response to sound made by a person
- Hearing aids that improve ease of hearing by eliminating reverberation in a reverberant environment
- Communication systems that improve the articulation of speech through dereverberation, such as videoconferencing systems

What is claimed is:

1. A dereverberation apparatus for eliminating late reverberation from an acoustic signal having the late reverberation, the dereverberation apparatus comprising:

a memory that stores, for each of M channels, multiple discrete acoustic signals, the discrete acoustic signals of each channel m obtained by sampling, at multiple points in time, of the acoustic signal as observed by a respective one of M sensors, where m=1 to M, M≧1;

a model application unit that calculates, by using the discrete acoustic signals, linear prediction coefficients $\alpha_{w,m}(1), \ldots, \alpha_{w,m}([N/M])$ of a multi-step linear prediction model $$x_w(n) = \sum_{m=1}^{M} \sum_{p=1}^{[N/M]} \alpha_{w,m}(p) \cdot x_m(n-p-D) + e_w(n)$$

where $x_w(n)$ is a discrete acoustic signal of a channel w at the discrete time n, w=1 to M, $x_m(n)$ is the discrete acoustic signal of the channel m at the discrete time n, m=1 to M, $e_w(n)$ is a prediction error of the channel w at the discrete time n, N is a positive integer, ● is a Floor function, $\alpha_{w,m}(p)$ is a p-th linear prediction coefficient in a case the linear prediction target is $x_w(n)$, and D is a constant representing a step size; and a late reverberation predictor that outputs a linear prediction value as predicted late reverberation, $r_w(n)$, of the channel w at discrete times n, the linear prediction value is obtained by substituting the linear prediction coefficients $\alpha_{w,m}(1), \ldots, \alpha_{w,m}([N/M])$ and the discrete acoustic signals $x_m(n-P-D)$ into a linear prediction equation $$r_w(n) = \sum_{m=1}^{M} \sum_{p=1}^{[N/M]} \alpha_{w,m}(p) \cdot x_m(n-p-D)$$

of the multi-step linear prediction model.

2. The dereverberation apparatus according to claim 1, wherein the model application unit comprises:

a pre-whitening unit that generates pre-whitened discrete acoustic signals by suppressing autocorrelation components in the discrete acoustic signals at each discrete time, the autocorrelation components having autocorrelation with the discrete acoustic signals in a short-term period immediately preceding the discrete time; and a first linear prediction coefficient calculator that calculates the linear prediction coefficients of the multi-step linear prediction model by using the pre-whitened discrete acoustic signals.

3. The dereverberation apparatus according to claim 2, wherein the pre-whitening unit comprises:

a second linear prediction coefficient calculator that calculates, by using the discrete acoustic signals, linear prediction coefficients $b(1), \ldots, b(q)$ of a short-term linear prediction model $$x_m(n) = \sum_{i=1}^{q} b(i) \cdot x_m(n-i) + x'_m(n)$$

where b(i) is an i-th linear prediction coefficient, and $x_m'(n)$ is a prediction error term of the channel m at the discrete time n; and an inverse filtering unit that substitutes the discrete acoustic signals of the channel m into an inverse filter $$x'_m(n) = x_m(n) - \sum_{i=1}^{q} b(i) \cdot x_m(n-i)$$

where $b(1), \ldots, b(q)$ are the linear prediction coefficients calculated by the second linear prediction coefficient calculator, and q is an order of linear prediction, and outputs a value of the prediction error term $x_m'(n)$ thereby obtained, as each of the pre-whitened discrete acoustic signals of channel m.

4. The dereverberation apparatus according to claim 3, wherein M≧2; and the second linear prediction coefficient calculator comprises:

an autocorrelation coefficient calculator that calculates autocorrelation coefficients $c_m(i)$ of the discrete acoustic signals of each channel m by $$c_m(i) = \sum_{n=0}^{T-1-i} x_m(n) \cdot x_m(n+i)$$

where T is a natural number greater than q;

an autocorrelation coefficient averaging unit that calculates average autocorrelation coefficients $$c(i) = \frac{1}{M} \sum_{m=1}^{M} c_m(i); \text{ and}$$

an equation calculator that calculates the linear prediction coefficients $b(1), \ldots, b(q)$ by $$\begin{pmatrix} b(1) \\ b(2) \\ \vdots \\ b(q) \end{pmatrix} = \begin{pmatrix} c(0) & c(1) & \ldots & & c(q-1) \\ c(1) & c(0) & & & \\ \vdots & & \ddots & & \\ & & & & c(1) \\ c(q-1) & & \ldots & c(1) & c(0) \end{pmatrix}^{-1} \begin{pmatrix} c(1) \\ c(2) \\ \vdots \\ \vdots \\ c(q) \end{pmatrix}$$

where the average autocorrelation coefficients c(i) are obtained by the autocorrelation coefficient averaging unit.

5. The dereverberation apparatus according to claim 3, wherein M≧2, and
the second linear prediction coefficient calculator comprises:
an autocorrelation coefficient calculator that calculates autocorrelation coefficients c(i) of discrete acoustic signals obtained by sampling, at multiple points in time, an acoustic signal observed by one of the M sensors that is closest to a sound source of the acoustic signal; and
an equation calculator that calculates the linear prediction coefficients b(1), . . . , b(q) of the short-term linear prediction model by $$\begin{pmatrix} b(1) \\ b(2) \\ \vdots \\ b(q) \end{pmatrix} = \begin{pmatrix} c(0) & c(1) & \ldots & & c(q-1) \\ c(1) & c(0) & & & \\ \vdots & & \ddots & & \\ & & & & c(1) \\ c(q-1) & & \ldots & c(1) & c(0) \end{pmatrix}^{-1} \begin{pmatrix} c(1) \\ c(2) \\ \vdots \\ \vdots \\ c(q) \end{pmatrix}$$

where the autocorrelation coefficients c(i) are obtained by the autocorrelation coefficient calculator.

6. The dereverberation apparatus according to claim 1, further comprising:
a frequency domain converter that converts the discrete acoustic signals to discrete acoustic signals in the frequency domain for each channel, and the predicted late reverberations of each channel to predicted late reverberations in the frequency domain; and
a late reverberation eliminator that calculates relative values of each channel, between amplitude spectra of the discrete acoustic signals expressed in the frequency domain and amplitude spectra of the predicted late reverberations expressed in the frequency domain, and outputting the relative values as predicted amplitude spectra of dereverberated signals of each channel.

7. The dereverberation apparatus according to claim 6, wherein the late reverberation predictor calculates the predicted late reverberations of channel w at the discrete times n, each of the predicted late reverberations of channel w at the discrete times n being a linear prediction value obtained by substituting the linear prediction coefficients calculated in the model application unit and pre-whitened discrete acoustic signals into the linear prediction term; and
the frequency domain converter converts the pre-whitened discrete acoustic signals of each channel to the discrete acoustic signals in the frequency domain.

8. The dereverberation apparatus according to claim 6, further comprising:
a complex spectrum generator that calculates predicted complex spectra of the dereverberated signals of channel w, by using the predicted amplitude spectra of the dereverberated signals of channel w and phase information of the discrete acoustic signals of channel w expressed in the frequency domain; and
a time domain converter that calculates estimates of dereverberated signals of channel w, by converting the predicted complex spectra of the dereverberated signals of channel w into the time domain signals.

9. The dereverberation apparatus according to claim 8, further comprising a delay amount calculator that determines a delay amount of each channel such that, when the estimates of dereverberated signals of each channel are delayed by the delay amount, inter-channel correlation among the estimates of dereverberated signals of the channels is maximized after the delay,
wherein M≧2;
the model application unit calculates the linear prediction coefficients for each of the channels;
the late reverberation predictor calculates the predicted late reverberations for each of the channels;
the late reverberation eliminator calculates the predicted amplitude spectra of the dereverberated signals for each of the channels;
the complex spectrum generator calculates the predicted complex spectra of the dereverberated signals for each of the channels; and
the time domain converter calculates the estimates of dereverberated signals for each of the channels.

10. The dereverberation apparatus according to claim 9, further comprising:
a delay unit that delays the estimate of dereverberated signal of each channel at discrete time n by the delay amount calculated for the channel; and
a delay corrector that calculates the sum of estimates of dereverberated signals at discrete time n delayed in the delay unit, as a corrected dereverberated signal.

11. The dereverberation apparatus according to claim 1, wherein M≧2.

12. A dereverberation method for eliminating late reverberation from an acoustic signal having the late reverberation, the dereverberation method comprising:
a discrete acoustic signal storage step of storing in a memory, for each of M channels, multiple discrete acoustic signals, the discrete acoustic signals of each channel m obtained by sampling, at multiple points in time, of the acoustic signal as observed by a respective one of M sensors, where m=1 to M, M≧1;
a model application step of calculating, by using the discrete acoustic signals, linear prediction coefficients $\alpha_{w,m}(1), \ldots, \alpha_{w,m}([N/M])$ of a multi-step linear prediction model $$x_w(n) = \sum_{m=1}^{M} \sum_{p=1}^{[N/M]} \alpha_{w,m}(p) \cdot x_m(n-p-D) + e_w(n)$$

where $x_w(n)$ is the discrete acoustic signal of a channel w at the discrete time n, w=1 to M, $x_m(n)$ is the discrete acoustic signal of the channel m at the discrete time n, m=1 to M, $e_w(n)$ is a prediction error of the channel w at the discrete time n, N is a positive integer, ● is a Floor function, $\alpha_{w,m}(p)$ is a p-th linear prediction coefficient in a case the linear prediction target is $x_w(n)$, and D is a constant representing a step size; and
a late reverberation prediction step of outputting a linear prediction value as predicted late reverberation, $r_w(n)$, of the channel w at discrete times n, the linear prediction value is obtained by substituting the linear prediction coefficients $\alpha_{w,m}(1), \ldots, \alpha_{w,m}(N/M)$ and the discrete acoustic signals $x_m(n-P-D)$ into a linear prediction equation $$r_w(n) = \sum_{m=1}^{M} \sum_{p=1}^{[N/M]} \alpha_{w,m}(p) \cdot x_m(n-p-D)$$

of the multi-step linear prediction model.

13. The dereverberation method according to claim 12, wherein the model application step comprises:
- a pre-whitening step of generating pre-whitened discrete acoustic signals by suppressing autocorrelation components in the discrete acoustic signals at each discrete time, the autocorrelation components having autocorrelation with the discrete acoustic signals in a short-term period immediately preceding the discrete time; and
- a first linear prediction coefficient calculation step of calculating the linear prediction coefficients of the multi-step linear prediction model by using the pre-whitened discrete acoustic signals.

14. The dereverberation method according to claim 13, wherein the pre-whitening step comprises:
- a second linear prediction coefficient calculation step of calculating, by using the discrete acoustic signals, linear prediction coefficients $b(1), \ldots, b(q)$ of a short-term linear prediction model $$x_m(n) = \sum_{i=1}^{q} b(i) \cdot x_m(n-i) + x'_m(n)$$

where $b(i)$ is an i-th linear prediction coefficient, and $x_m'(n)$ is a prediction error term of the channel w at the discrete time n; and
- an inverse filtering step of substituting the discrete acoustic signals of channel m into an inverse filter $$x'_m(n) = x_m(n) - \sum_{i=1}^{q} b(i) \cdot x_m(n-i)$$

where $b(1), \ldots, b(q)$ are the linear prediction coefficients calculated in the second linear prediction coefficient calculation step and q is an order of linear prediction, and outputting a value of the prediction error term $x_m'(n)$ thereby obtained, as each of the pre-whitened discrete acoustic signals of channel m.

15. The dereverberation method according to claim 14, wherein M≧2; and
the second linear prediction coefficient calculation step comprises:
an autocorrelation coefficient calculation step of calculating autocorrelation coefficients $c_m(i)$ of the discrete acoustic signals of each channel m by $$c_m(i) = \sum_{n=0}^{T-1-i} x_m(n) \cdot x_m(n+i)$$

where T is a natural number greater than q;

an autocorrelation coefficient averaging step of calculating average autocorrelation coefficients $$c(i) = \frac{1}{M} \sum_{m=1}^{M} c_m(i); \text{ and}$$

an equation calculation step of calculating the linear prediction coefficients $b(1), \ldots, b(q)$ by $$\begin{pmatrix} b(1) \\ b(2) \\ \vdots \\ b(q) \end{pmatrix} = \begin{pmatrix} c(0) & c(1) & \ldots & c(q-1) \\ c(1) & c(0) & & \\ \vdots & & \ddots & \\ & & & c(1) \\ c(q-1) & & \ldots & c(1) & c(0) \end{pmatrix}^{-1} \begin{pmatrix} c(1) \\ c(2) \\ \vdots \\ \vdots \\ c(q) \end{pmatrix}$$

where the average autocorrelation coefficients $c(i)$ are obtained by the autocorrelation coefficient averaging step.

16. The dereverberation method according to claim 14, wherein M≧2, and
the second linear prediction coefficient calculation step comprises:
an autocorrelation coefficient calculation step of calculating autocorrelation coefficients $c(i)$ of discrete acoustic signals obtained by sampling, at multiple points in time, an acoustic signal observed by one of the M sensors that is closest to a sound source of the acoustic signal; and
an equation calculation step of calculating the linear prediction coefficients $b(1), \ldots, b(q)$ of the short-term linear prediction model by $$\begin{pmatrix} b(1) \\ b(2) \\ \vdots \\ b(q) \end{pmatrix} = \begin{pmatrix} c(0) & c(1) & \ldots & c(q-1) \\ c(1) & c(0) & & \\ \vdots & & \ddots & \\ & & & c(1) \\ c(q-1) & & \ldots & c(1) & c(0) \end{pmatrix}^{-1} \begin{pmatrix} c(1) \\ c(2) \\ \vdots \\ \vdots \\ c(q) \end{pmatrix}$$

where the autocorrelation coefficients $c(i)$ are obtained by the autocorrelation coefficient calculation step.

17. The dereverberation method according to claim 12, further comprising:
a frequency domain conversion step of converting the discrete acoustic signals to discrete acoustic signals in the frequency domain for each channel, and the predicted late reverberations of each channel to predicted late reverberations in the frequency domain; and
a dereverberation step of calculating relative values of each channel, between amplitude spectra of the discrete acoustic signals expressed in the frequency domain and amplitude spectra of the predicted late reverberations expressed in the frequency domain, and outputting the relative values as predicted amplitude spectra of dereverberated signals of each channel.

18. The dereverberation method according to claim 17, wherein the late reverberation prediction step calculates the predicted late reverberations of channel w at the discrete times n, each of the predicted late reverberations of channel w at the discrete times n being a linear prediction value obtained by substituting the linear prediction coefficients calculated in the model application step and pre-whitened discrete acoustic signals into the linear prediction term; and the frequency domain conversion step converts the pre-whitened discrete acoustic signals of each channel to the discrete acoustic signals in the frequency domain.

19. The dereverberation method according to claim 17, further comprising:
  a complex spectrum generation step of calculating predicted complex spectra of the dereverberated signals of channel w, by using the predicted amplitude spectra of the dereverberated signals of channel w and phase information of the discrete acoustic signals of channel w expressed in the frequency domain; and
  a time domain conversion step of calculating estimates of dereverberated signals of channel w, by converting the predicted complex spectra of the dereverberated signals of channel w into the time domain signals.

20. The dereverberation method according to claim 19, further comprising a delay amount calculation step of determining a delay amount of each channel such that, when the estimates of dereverberated signals of each channel are delayed by the delay amount, inter-channel correlation among the estimates of dereverberated signals of the channels is maximized after the delay,
  wherein M≧2;
  the model application step calculates the linear prediction coefficients for each of the channels;
  the late reverberation prediction step calculates the predicted late reverberations for each of the channels;
  the dereverberation step calculates the predicted amplitude spectra of the dereverberated signals for each of the channels;
  the complex spectrum generation step calculates the predicted complex spectra of the dereverberated signals for each of the channels; and
  the time domain conversion step calculates the estimates of dereverberated signals for each of the channels.

21. The dereverberation method according to claim 20, further comprising:
  a delay step of delaying the estimate of dereverberated signal of each channel at discrete time n by the delay amount calculated for the channel; and
  a delay correction step of calculating the sum of estimates of dereverberated signals at discrete time n delayed in the delay step, as a corrected dereverberated signal.

22. The dereverberation method according to claim 12, wherein M≧2.

23. A non-transitory computer-readable recording medium having stored thereon a dereverberation program for causing a computer to execute the steps of the dereverberation method according to claim 12.

* * * * *